United States Patent [19]

Lerdman

[11] 4,169,990
[45] Oct. 2, 1979

[54] ELECTRONICALLY COMMUTATED MOTOR

[75] Inventor: David M. Lerdman, Fort Wayne, Ind.

[73] Assignee: General Electric Company, Fort Wayne, Ind.

[21] Appl. No.: 802,484

[22] Filed: Jun. 1, 1977

Related U.S. Application Data

[63] Continuation-in-part of Ser. No. 729,761, Oct. 5, 1976, abandoned, which is a continuation-in-part of Ser. No. 482,409, Jun. 14, 1974, Pat. No. 4,005,347.

[51] Int. Cl.$^2$ .................................. H02K 29/00
[52] U.S. Cl. ............................... 318/138; 318/254
[58] Field of Search ............... 318/138, 254, 331, 439

[56] References Cited

U.S. PATENT DOCUMENTS

| | | | |
|---|---|---|---|
| 3,274,471 | 9/1964 | Moczala | 318/138 |
| 3,304,481 | 2/1967 | Saussele | 318/138 |
| 3,329,852 | 7/1967 | Saussele et al. | 318/138 |
| 3,353,076 | 11/1967 | Haines | 318/138 |
| 3,359,474 | 12/1967 | Welch et al. | 318/138 |
| 3,475,668 | 10/1969 | Mieslinger | 318/138 |
| 3,488,566 | 1/1970 | Fukuda | 318/138 |
| 3,531,702 | 9/1970 | Hill | 318/138 |
| 3,577,053 | 5/1971 | McGee | 318/254 |
| 3,581,173 | 5/1971 | Hood | 318/254 |
| 3,603,161 | 9/1971 | Schwarz | 74/5.6 |
| 3,611,081 | 10/1971 | Watson | 318/138 |
| 3,633,084 | 1/1972 | Rakes | 318/254 |
| 3,634,873 | 1/1972 | Nishimura | 318/254 |
| 3,663,878 | 5/1972 | Miyasaka | 318/254 |
| 3,780,363 | 12/1973 | Doemen et al. | 318/254 |
| 3,783,357 | 1/1974 | Ichiyanage | 318/138 |
| 3,794,895 | 2/1974 | Coupin et al. | 318/254 |
| 3,806,785 | 4/1974 | DeValroger et al. | 318/254 |
| 3,829,749 | 8/1974 | Richt | 318/331 |
| 3,906,320 | 9/1975 | Doemen | 318/331 |
| 3,932,793 | 1/1976 | Muller | 318/138 |
| 3,938,014 | 2/1976 | Nakajima | 318/138 |
| 3,942,083 | 3/1976 | Takahashi et al. | 318/138 |
| 3,986,086 | 10/1976 | Müller | 318/138 |
| 4,004,202 | 1/1977 | Davis | 318/138 |
| 4,025,835 | 5/1977 | Wada | 318/254 |
| 4,027,215 | 5/1977 | Knight et al. | 318/341 |
| 4,030,005 | 6/1977 | Doemen | 318/138 |

FOREIGN PATENT DOCUMENTS

| | | |
|---|---|---|
| 2164685 | 7/1972 | Fed. Rep. of Germany . |
| 1374991 | 9/1964 | France . |
| 1405208 | 5/1965 | France . |
| 7414197 | 5/1975 | Netherlands . |

*Primary Examiner*—Gene Z. Rubinson
*Attorney, Agent, or Firm*—Ralph E. Krisher, Jr.; A. Burgess Lowe

[57] ABSTRACT

A brushless DC motor is constructed with photosensitive device for detecting rotor shaft position. Arcuate permanent magnets on the rotor provide a DC flux field while distributed stationary armature windings, each spanning a fixed number of slots in the armature assembly, provide mutually perpendicular magnetic fields. A logic circuit comprising NOR gates and transistor switches and drivers activated in response to signals from the shaft position sensors are utilized to control current switching in the armature windings of the motor. A light interrupting shutter mounted to the rotor cooperates with the light sensitive devices which are mounted to a supporting bracket fixed to the stationary armature assembly in a manner to selectively preset advancement of commutation of the armature windings. Variations on permanent magnet rotor construction and novel applications of a brushless DC motor are also disclosed as is a novel approach for dispensing with the mechanism for detecting the shaft position. In this last respect a commutating circuit is disclosed for a brushless DC motor, including a detecting circuit responsive to the electromotive force (emf) of the brushless DC motor to provide a simulated signal indicative of the rotation of the motor's shaft and a logic circuit responds to the output of the shaft position detecting circuit to control the application of driving signals through the armature windings of the DC brushless motor.

44 Claims, 43 Drawing Figures

ELECTRONICALLY COMMUTATED MOTOR

CROSS REFERENCE TO RELATED APPLICATION

This application is a continuation-in-part of my co-pending application Ser. No. 729,761, filed Oct. 5, 1976 now abandoned which was a continuation-in-part of my then co-pending application Ser. No. 482,409, filed June 24, 1974 which issued as U.S. Pat. No. 4,005,347 for "Electronically Commutated Motor and Method of Making Same" assigned to the assignee of the present invention. This application is related to the commonly assigned application of Floyd H. Wright, Ser. No. 729,804, which was filed on Oct. 5, 1976. The entire disclosures of the last mentioned application and my application Ser. No. 729,761, my application Ser. No. 482,409, as well as my application Ser. No. 482,407 of June 24, 1974 which issued as U.S. Pat. No. 4,015,182 are incorporated herein by reference.

BACKGROUND OF THE INVENTION

1. Field of the Invention

This invention relates generally to rotating dynamo-electric machines and, more particularly, to such machines that receive power from a direct current or rectified alternating current power supply and that utilize electronic commutation means.

In conventional direct current rotating machines, commutation is essentially a mechanical switching operation to control the currents through the armature winding sections. This operation is accomplished in conventional machines with brushes and segmented commutators. In such constructions, the brushes wear and require frequent replacement. Sparking and its attendant generation of RF noise is also unavoidably present.

These disadvantages frequently prohibit use of DC motors in critical applications even though the use of such motors might otherwise be favored. Early attempts to provide brushless DC motors were mostly limited to: DC to AC inversion and, essentially, AC induction motor operation; use of rotor velocity for switching control but such control then was not effective at all rotor positions under different load conditions, or at starting; or use of circuits having a larger number of switching devices with the result that the circuits for such devices were both complicated and expensive.

It have now devised simpler and less expensive DC motors and have recognized that different restrictions apply to electronically commutated motors than those that apply to mechanically commutated motors. Improved motor performance over the already good performance of conventional motor designs may be obtained by using a rotor position sensing system in conjunction with electronic switching, and a permanent magnet rotor in combination with a selected unconventional stationary armature core and winding arrangement for a direct current motor.

Motors embodying selected features of my invention are readily adapted for applications where space requirements are at a minimum. For example, such motors are readily adapted to drive the compressor of a recreational vehicle or automobile air conditioning system from the output of an alternator, or battery source. In such arrangements, an electronically commutated motor and compressor may both be sealed in a hermetic enclosure. In sealed arrangements, carbon pollution products are objectionable and use of brushless motors in such arrangements provides a distinct advantage over mechanical commutation. However, since the units are hermetically sealed, the reliability of the motor must be very good, and all parts of the motor must be such that refrigerant will neither damage the motor nor be damaged by motor components or the materials from which said components are made.

Conventionally, motor manufacturers have a first type of specialized equipment, processes, tools and dies, etc., for AC induction motors and a second type of the same for DC motors. To a great extent, such AC motor making, e.g., tools, etc., are not usable for present DC motor production. In accordance with another feature of the invention, DC stationary armatures embodying the invention may be wound using conventional AC winding machinery.

Thus, another important advantage of the subject inventionis the cost saving achieved both in manufacture and operation.

Electronic commutation may be achieved by either a full bridge or half bridge (also called star in my previous and above-referenced applications) circuit arrangement. The former improves copper winding utilization, while the latter offers the advantage of simplified electronics. By judicious selection of winding parameters, magnet size and electronics which control the commutation cycle, there may be obtained a reliable, highly efficient brushless DC motor having a desired speed-torque relationship which may be fabricated at a reasonable cost.

SUMMARY OF THE INVENTION

Accordingly, a primary object of the present invention is to provide a new and improved brushless DC motor which is reliable and efficient in operation.

Another object of the present invention is to provide a new and improved brushless DC motor which may be economically fabricated; may be constructed in a very compact package; or may be provided with shaft position sensors disposed within an armature winding end turn envelope.

Another object of the present invention is to provide new and improved circuitry responsive to internal voltage condition of armature windings for detecting rotor shaft position and simulating signals indicative thereof, whereby commutation of winding energizing signals may be efficiently effected.

Still another object of the present invention is to provide a new and improved brushless DC motor wherein the advancement of commutation of the stator windings is controlled by the position of optical light coupling sensors.

Yet another object of the present invention is to provide a minimized number of position sensors in an electronically commutated motor and, more specifically, to provide a minimum number of position sensors.

A further object of the present invention is to provide an improved motor to be energized from a direct current or rectified alternating current source wherein the armature windings are of the distributed winding type.

Another further object of the present invention is to provide a new and improved electronically commucated motor that utilizes bifilar windings in the armature.

A still further object of the present invention is to provide a new and improved electronically commutated motor of a minimized physical size.

A still further object of the present invention is to provide a new and improved electronically commucated motor that includes means for protecting output stage solid state devices in a particular manner to provide energy recovery or conservation so as to increase the overall efficiency of an electronically commutated motor and the electronic means that provide commutation for such motor.

A still further object of the present invention is to provide new and improved circuitry for detecting low speed of an electronically commucated motor and interrupting motor operation for a predetermined period of time.

A still further object of the present invention is to provide new and improved circuitry for detecting a low voltage condition of an electronically commutated motor.

A still further object of the present invention is to provide new and improved circuitry for detecting a high voltage condition of an electronically commucated motor.

Yet a still further object of the present invention is to provide an electronically commutated motor wherein commutation is preselectively advanced and maintained by electronically simulating the rotor position relative to the stationary armature and maintaining a predetermined angle of advancement.

In carrying out the present invention in one form thereof, there is disclosed an improved two stage, brushless DC motor having distributed armature windings which may be wound and connected, as desired, in either full bridge or half bridge configuration. The rotor has positioned therein a pair of arcuate magnets each having a preferred minimum arc length per pole of at least about seventy to ninety electrical degrees, assuming that relatively high efficiencies are desired. Windings are disposed in the slots of an armature member and preferably connected to produce angularly spaced apart magnetic fields when energized. Commutation of the windings may be achieved by means of a solid state circuit controlled by sensing means including a pair of sensors spaced from each other by an arcuate distance of approximately ninety electrical degrees and which are preset relative to the armature assembly for a given rotor assembly.

Another embodiment of the present invention, includes an improved electronic commutating circuit that includes circuit means for reliably simulating the relative position of the rotor and armature even under varying speed or shaft load conditions. In one form, this circuit includes circuit means that are responsive to flux condition of the armature windings for providing informative signals indicative of the relative shaft to armature position. In turn, these informative signals are used to control an armature energizing circuit to commutate and apply driving signals or currents to the armature windings in a predetermined order, whereby the armature windings are efficiently energized.

Thus, it will be realized that another object and advantage of the present invention is the provision of electronically controlled commutation of a brushless DC motor that relies on flux condition and thus is not disabled by speed or shaft load variations and also does not require mechanically coupled rotor shaft position detectors.

In accordance with one form of the invention utilizing physical position sensors, a minimum number of sensors are utilized, with this minimum number being equal to the number of binary digits needed to describe the number of switching positions, minus one, for the motor. For example, if the motor winding is to be switched four times per 360 electrical degrees of rotation, one would select the number of binary digits needed to describe the decimal number 3. As will be understood, two binary digits [i.e., 11] describe the number 3. Accordingly, only two sensors would need to be used. Since the number of sensors is related to the switching positions per 360 electrical degrees of rotation, two sensors may be used for two pole, four pole, six pole, etc., motors.

On the other hand, if there are to be six switching positions per 360 electrical degrees of rotation of the motor, the number that would need to be described in binary digits would be six minus one, or five. Since the number five is identified, in binary notation, as the number 101, it will be understood that three binary digits are involved and, accordingly, a minimum of three sensors would be utilized. At this point, it should be further noted and further understood that three binary digits can represent a number as great as 111 in binary notation (which is equal to the number 7 in decimal notation). Thus, three sensors may be utilized when as many as eight switching positions per 360 electrical degrees of rotation of the motor is desired.

In some embodiments of the invention illustrated herein, optical sensors are utilized in conjunction with one or more rotor mounted shutters. Whether optical or other types of sensors are utilized, the sensors are preset relative to the armature assembly (for a given rotor assembly) so that the switching point is advanced (i.e., so as to advance the commutation of the windings) such that a winding is energized before the rotor reaches its maximum torque per unit current producing position in order to aid the build-up of current in the winding being energized. This can yield higher torques, higher efficiencies, and higher speeds. The preferred amount of optimum advance, for a given motor design and desired end use, is primarily a function of intended nominal motor operating speed, all as discussed in more detail hereinafter.

In one actual motor illustrated herein, light coupling sensors were used and were supported by a bracket that was slotted so as to permit adjustable attachment to a stator. Thus, adjustable advancement of commutation could be made to obtain either peak efficiencies or maximum speeds. When the sensors are to be permanently attached to the stator, the amount of commutation advancement will be a fixed, present amount for a given motor design. Of course, however, whether fixed or adjustable advancement is provided, it is preferred to provide an arm on a bracket that will be shaped to reach over the stator end turns and support the optical light sensors within the end turns, and thereby provide minimum overall motor dimensions.

In some embodiments of the invention, protection circuits are utilized to detect and interrupt motor operation upon occurrence of either a low speed, low voltage or high voltage condition. A low speed protection circuit is responsive to the output signals of a position determining circuit for generating a signal representative of motor speed and is operable to compare the representative speed signal against a predetermined signal representative of a minimum allowable speed and to generate an output signal for interrupting motor operation for a predetered period of time when the motor speed is less than the minimum allowable speed. In order to assure that the motor is provided with a supply voltage that is within an acceptable range, low voltage and high voltage protection circuits are provided which compare the voltage being supplied to the motor from a power source against predetermined minimum and maximum acceptable voltages and which generate signals to interrupt motor operations if the motor supply voltage is less than the minimum acceptable voltage or greater than the maximum acceptable voltage.

BRIEF DESCRIPTION OF THE DRAWINGS

Other objects of the present invention and their attendant advantages will become readily apparent from the following description taken in conjunction with the accompanying figures in which like reference characters are used to describe like parts throughout the several views.

DESCRIPTION OF THE PREFERRED EMBODIMENTS

Figure 1:
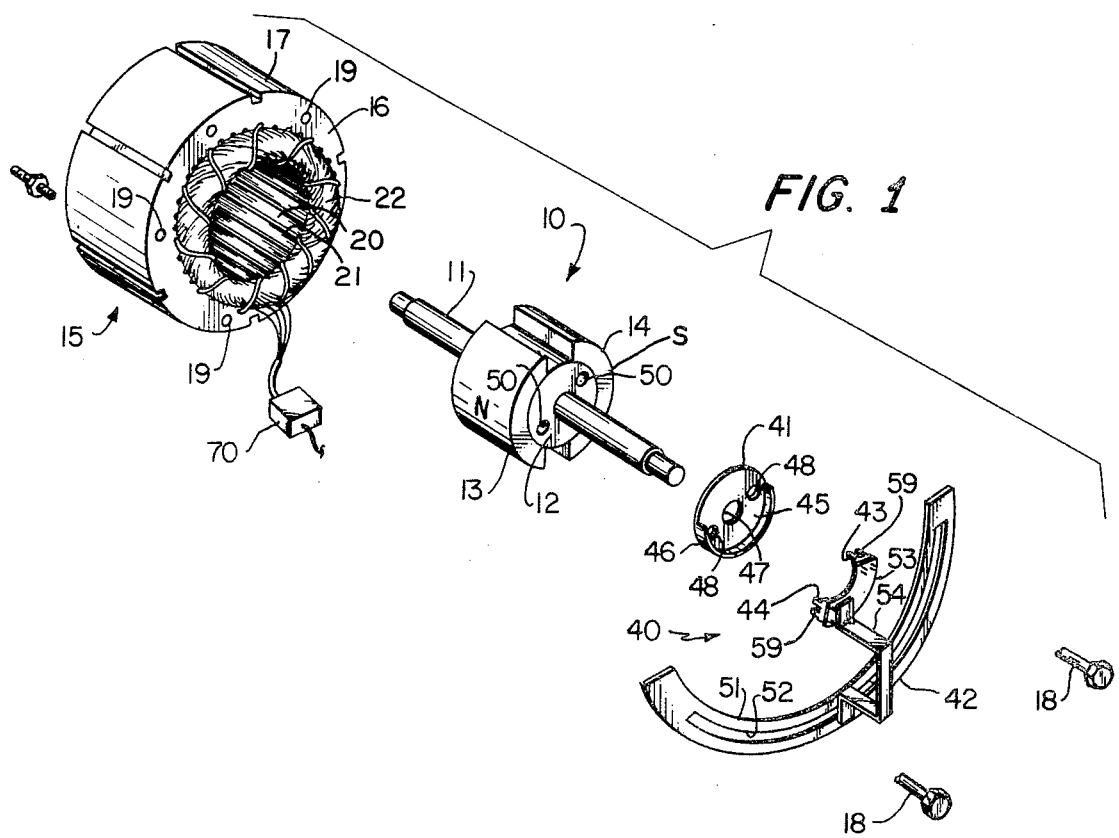
FIG. 1 is an exploded, perspective view of the main elements of a brushless DC motor embodying teachings of the present invention in one form thereof.

Referring to FIG. 1, there is illustrated the component parts of a brushless DC motor of one type that may embody features of the present invention in one preferred form. The motor is provided with two winding stages, two poles and a permanent magnet rotor 10 mounted on a shaft 11 which is rotatably supported by conventional not shown bearing means within any desired not shown housing. The rotor 10 is magnetized across its diameter in a manner known to the art. In the illustrated embodiment, the rotor 10 comprises a solid magnetic steel core 12 and a pair of arcuate magnets 13 and 14 disposed on the periphery of the core in diametrically opposed relationship. The magnets 13 and 14 were ceramic magnets, but it will be understood that they could be cobalt samarium, Alnico, or any other available type of magnet material. The primary selection criteria are expense and physical size of the motor. The arc length of each ceramic magnet is preferably between 135 electrical degrees and 160 electrical degrees, but could be as much as 180 electrical degrees and as low as approximately 90 electrical degrees. Arc lengths of less than 120 electrical degrees would generally result in poor efficiency with the winding arrangement specifically shown in FIG. 2, and are thus not preferred with such arrangement.

The optimum magnet arc length set forth above generally remains the same for motors with multiple stages and/or pole arrangements although the number of permanent magnets and the physical or mechanical arc length of the magnets will vary in accordance with the number of electrical poles (or pole pairs) created by the windings. For example, a three stage, four pole motor would be provided with four permanent magnets each having an arc length preferably between 135 electrical degrees and 160 electrical degrees as set forth above, that is, betweeen 67½ and 80 in terms of mechanical degrees. Likewise, a four stage, 6 pole motor would have six permanent magnets with an arc length, preferably between 135 electrical degrees and 160 electrical degrees, that is, between 45 and 53⅓ mechanical degrees. The magnet arc length will also vary in accordance with the concentration of windings within the stationary armature.

When the arc lengths are on the order of 90 electrical degrees, the windings would be made relatively more concentrated. For example, in a 24 slot stationary armature used for two stage, two pole operation, the outer coils of each coil group preferably would span about 10 slots. In addition, each coil group (2 one-half sets) preferably would include three coils per one-half coil set spanning 9, 7 and 5 teeth, respectively. This type of arrangement would provide optimized efficiency characteristics of such motor.

On the other hand, for some applications, very concentrated windings would be provided that occupied only one pair of slots, in which case the spread of the winding would approach zero electrical degrees and mechanically equal only the width of one slot, yet have a span of 180° electrical.

The stationary armature assembly 15 includes a relatively low reluctance magnetic number 16 which is formed of a plurality of like armature laminations 17 assembled in juxtaposed relationship. The laminations may be held together by a plurality of armature through-bolts 18, only two of which are fragmentarily shown, that pass through coaxially positioned through-bolt holes 19 in the stator laminations. Alternatively, the core laminations may be welded, keyed, adhesively bonded together, or merely held together by the windings, all as will be understood by perons skilled in the art.

Each lamination includes a plurality of teeth 20 along its interior bore such that the assembled laminations provide a plurality of axially extending slots 21 within which the armature windings 22 are disposed.

Windings 22 may be wound by means of conventional induction motor winding machinery. Thus, the winding turns may be wound directly on coil injection tooling for disposition in the core slots; or the windings may be wound into a coil receiver, transferred to coil injection tooling and subsequently be axially inserted into the core slots, for example, with equipment of the type shown and described in U.S. Pat. Nos. 3,522,650; 3,324,536; 3,797,105 or 3,732,897, the disclosures of which are incorporated herein by reference.

Preferably, in a two stage, two pole motor, each winding has a spread of approximately 90 electrical degrees across the armature slots so as to generate mutually perpendicular magnetic fields when energized, assuming that the windings are not required to share slots and that all slots of the stationary armature are utilized. The winding end turns extend beyond the core end faces, and the winding ends or leads are brought out and connected separately to the control circuit and the associated switching means.

Figure 2:
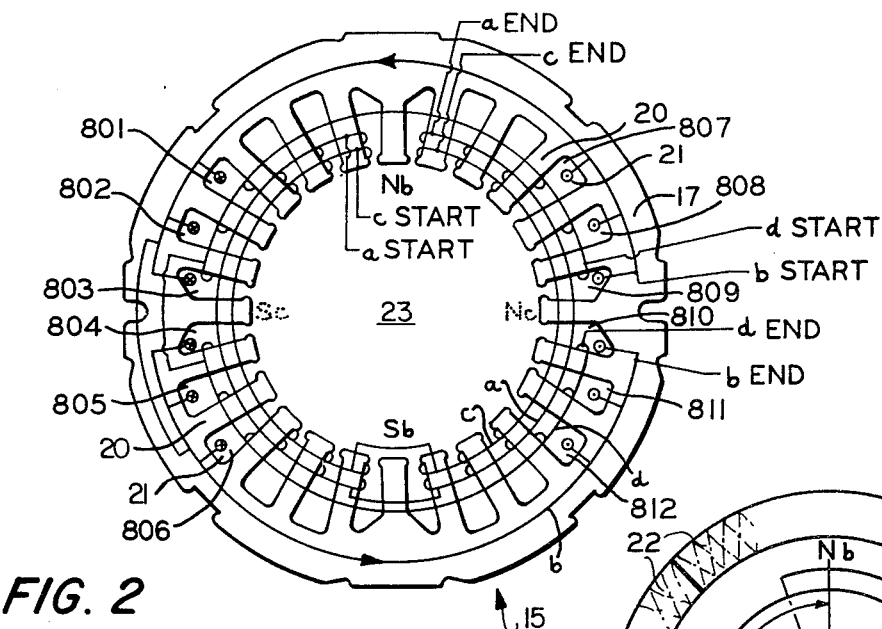
FIG. 2 is a diagrammatic front elevational view of the armature core of FIG. 1, diagrammatically illustrating a selected winding arrangement for the motor of FIG. 1.

Referring to FIG. 2, there is illustrated an exemplary winding arrangement for a one twentieth horsepower, 3000 rpm electronically commutated DC motor embodying principles of my invention. The selected lamination or punching includes twenty-four slots, and further, each winding is provided with fifty-four bifilar turns. With the opposite disposed pairs of windings would bifilarly, I provide four windings a, b, c, d. Windings a and c are bifilar wound and occupy the six uppermost and six lowermost slots 21, as viewed in the drawing, and are shown as being included by the dash lines. Winding b and d are bifilar wound, and occupy the six left-hand and six right-hand slots, as viewed in FIG. 2. The armature 17 is wound with a winding turn distribution of 10 turns, 10 turns, 7 turns, from outermost to innermost coil, respectively, for each coil group shown in FIG. 2. Each winding is shown as including two coil sets, of course. The particular number of turns in a slot for each winding and the resultant distribution could be varied according to the desired motor characteristics to be obtained. For example, the outermost coils of each coil group could be maximized in number while the innermost coil turns are minimized so as to concentrate the winding. When the winding is so concentrated, a higher average torque will result (assuming armature core, rotor constrution winding resistance, and total turn count is held constant), but the switching point will be more critical and the amount of advancement may have to be changed. Also, dips in torque (during running and standstill) would be generally of greater amplitude, but of less duration.

As shown in FIG. 2, the turns of each winding are concentrically disposed in a given pair of slots with the desired number of turns in each slot. The winding of course continues in the next pair of slots, and the desired number of slots or teeth are spanned which in the illustrated embodiment is eleven teeth and providing a spread of, for example, 90 electrical degrees for each winding and enabling the windings to sequentially generate mutually perpendicular magnetic fields when sequentially energized. By using bifilar strands, two windings are wound simultaneously and one end of each strand may then be conveniently grounded to provide a half-bridge (star of WYE) winding connection configuration. It is again noted that the arrangement is readily adapted for winding and placement by conventional winding machinery used for winding AC motors.

It will be noted that in FIG. 2, the winding b has been illustrated somewhat differently than windings a, c, and d. Winding b has been shown to illustrate the direction of current flow therein during at least one communication period and arrows have been used to indicate the direction of current flow in the end turn portions of winding b. On the other hand, dots and crosses (enclosed within circles) have been used to illustrate the direction of current flow in the respective turns of winding b that are disposed within the magnetic core slots. With the notation used in FIG. 2, a dot would indicate that current is flowing upwardly out of the plane of the drawing, and crosses indicate current flowing downwardly relative to the plane of the drawing. With the current flow as indicated by the dots and crosses in FIG. 2, winding b would establish north and south poles oriented as represented by the letters $N_b$ and $S_b$ in FIG. 2.

Figure 3:
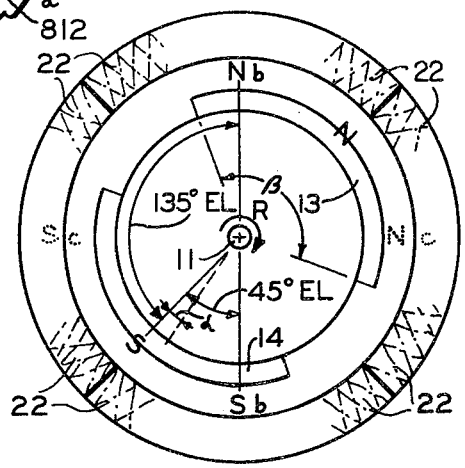
FIG. 3 is a diagrammatic representation of parts of the motor of FIG. 1 showing the position of the rotor magnets relative to the armature windings at the instant of turn-on of one of the windings, with a zero electrical degree advance setting.

The stationary armature assembly has an axial bore 23 within which is received the rotor 10. The arcuate magnets 13 and 14 are disposed (e.g., by an adhesive such as an epoxy resin) on the outer surfaces of the low reluctance core 12 (which may be laminated but does not need to be) to establish constant magnetic polarity regions with North-South polarizations as indicated in FIG. 3. Magnetization is in the radial direction with radial thickness selected to produce the desired magnetomotive force (for a given magnet material) or to assure that no irreversible demagnetization occurs from the fields produced by the current in the armature windings during stalled conditions.

It will be understood that although magnets 13 and 14 have been described as being adhesively bonded to the outer peripheral surface of the core 12, it is important only that fields of opposite polarity be established by the rotor assembly. Thus, bar type magnets A(or magnets of any other desired shape) may be utilized in the fabrication of rotor assemblies for motors embodying the present invention. The magnets (when permanent magnets are used) may be disposed within a magnetic iron cage structure or fabricated in any other desired manner. In fact, an excited rotor wherein the north and south poles are established by current carrying conductors may also be utilized. In the latter case, of course, slip rings or any other suitable means would be used to interconnect the rotor windings with a source of excitation current. The axial length of the magnets is dependent on the total flux desired. The instantaneous torque curves and the net torque output is dependent on the winding distribution within the slots of the stationary armature and on the magnet arc or arc length beta ($\beta$) of the magnet which, as hereinbefore noted, should be preferably constrained within 135 electrical degrees and 160 electrical degrees, for greatest efficiencyl where the windings are not required to share slots and all slots are utilized.

As shown in FIG. 1, adjacent one end of the rotor is positioned a shaft position sensor assembly 40 comprising a shutter 41 and bracket 42 for supporting a pair of optical interrupter modules, i.e., optical light coupling sensors 43 and 44. Shutter 41 may be formed of any optically opaque (at the pertinet wave length) material or coated material such as, for example, aluminum (brass, steel, etc.), and includes a flat disc shape element 45 having a shutter flange 46 extending along the periphery of the disc element for an arcuate distance of approximately 180 electrical degrees. The disc element includes a central opening 47 slightly larger in diameter than the diameter of the rotor shaft 11 so that it may be conveniently passed over the rotor shaft and mounted flush with the end face of the solid steel core 12. To this end, a pair of bolt receiving openings 48 are provided for receiving mounting bolts (not shown) adapted to be threaded into pre-threaded openings 50 provided in the core 12. Of course, as should be readily apparent, other suitable arrangements could be utilized for mounting the shutter to the rotor, so long as flange 46 extends outwardly from the rotor and is cooperatively associated with sensors 43 and 44 to effect generation of rotor position reference signals in response to the position of the rotor relative to the stator.

Figure 4:
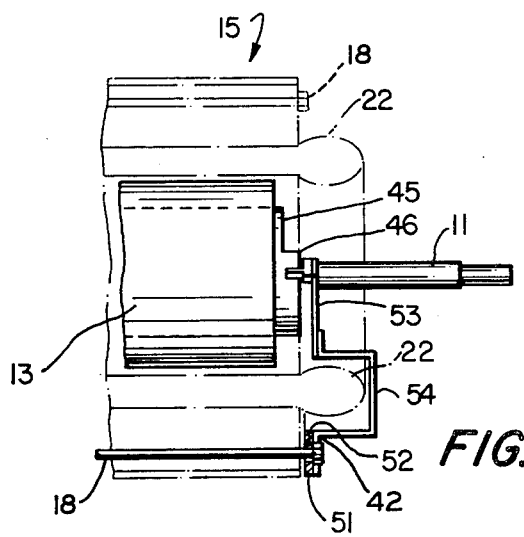
FIG. 4 is a fragmentary, side elevational view, partly in cross-section, better showing the physical interrelationship of the support bracket assembly in the motor assembly of FIG. 1.

As shown in FIGS. 1 and 4, bracket 42 comprises a first arcuate shaped segment 51 having an elongated slot 52 along its length. Slot 52 permits the bracket to be adjustably attached to the stator or stationary armature laminations 17 by means of the armature through-bolts. A second arcuate shaped segment 53 is supported radially inward of the first segment by means of an interconnecting U-shaped strap or arm member 54. As more clearly shown in FIG. 4, strap 54 is shaped to pass over the end turns and support the sensors 43 and 44 with a 90° spatial orientation for the two stage motor within the end turns of the armature windings and in cooperative relationship with the outward extending shutter flange 46. It should be noted that the sensors are supported within the outermost axial dimension of the winding end turns as well as within the radial dimension thus minimizing the axial length of the motor, the dimension of the strap adding very little to the overall axial length.

Figure 5A:
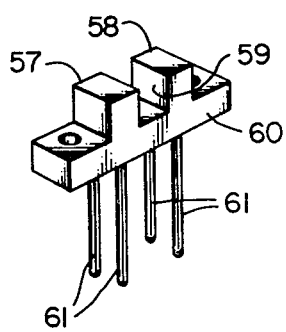
FIGS. 5A and 5B illustrate the construction and equivalent electrical circuit, respectively, of a light sensitive element used as a shaft position sensing element in the assembly of FIG. 1.
Figure 5B:
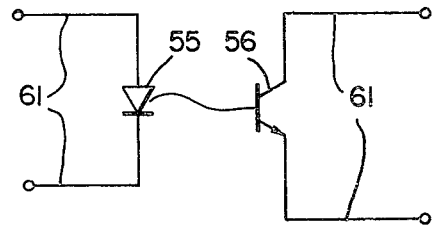

Referring to FIGS. 5A and 5B, there is illustrated a typical mechanical and electrical configuration of an optical sensor. Such sensors are conventional commercial devices and may be, for example, General Electric H13A2 optical couplers. As shown, the coupler includes a source of light energy 55 which may be a light diode and a light sensor 56 which may be a light sensitive phototransistor in light coupling relationship with the light emitting diode. Diode 55 and phototransistor 56 are formed in separate blocks 57 and 58, respectively, separated by a channel 59 and mounted to a supporting base 60. Base 60 of each sensor is secured at opposite ends of supporting segment 53 such that the sensors are spaced from each other by an arcuate distance of 90 electrical degrees. Convenient openings are provided in the segment to allow the terminal conductors 61 of the sensors to pass freely therethrough.

Commutation of the stationary armature windings is achieved by means of a solid state control circuit 70 comprising NOR gates and transistor switches and drivers activated in response to signals from the shaft position sensors. Bridge circuit arrangements which hereafter shall be used to denote either a half-bridge (unidirectional) circuit arrangement or a full-bridge (bidirectional) circuit arrangement are employed to effect commutation. The circuit may be of the type illustrated in FIGS. 6 and 7 where a half-bridge configuration is employed or of the type illustrated in FIGS. 9 and 10 where a full-bridge arrangement is employed.

In either case, current switching in the armature windings is preselectively set by the relative positioning of the sensor so that communication of the stationary armature winding is advanced as is hereinafter explained.

Briefly summarizing operation of the circuit, it will be apparent from the several schematic figures that the control circuit receives the output of the light sensitive shaft position sensor assembly 40 to derive switching signals for commutation of the stationary armature windings. To this end, the outputs of the sensors 43 and 44 produce two position signals indicative of the position of rotor 10 with respect to the fixed position of the stationary armature windings. The two position signals are applied to a first signal conditioning circuit 70' in FIG. 6 which develops four control signals which correspond to those positions of the rotor while (1) shutter flange 46 is passing through channel 59 of sensor 43 thereby blocking its photosensor; (2) shutter flange 46 is passing through channel 59 of both sensors 43 and 44 thereby blocking both photosensors; (3) shutter flange 46 is passing through channel 59 of sensor 44 and blocks the photosensor of sensor 44 but has unblocked the photosensor of sensor 43; and (4) shutter flange 46 is clear of both sensors. In this manner, the shutter operates to block or intercept the light from the source of light energy of each optical coupler during one half of each revolution of the rotor, while permitting passage of light energy from each source of light to its associated photosensor during the remaining half of the rotor revolution. However, by supporting the sensors in a 90° spatial relationship, the on-off combination of the sensor provides four position control signals, while the adjustable bracket assembly provides a convenient means for preselectively advancing the commutation of the windings and aid the build-up of current in the winding being commutated and obtain a desired speed-torque relationship with greater efficiency.

Figure 7:
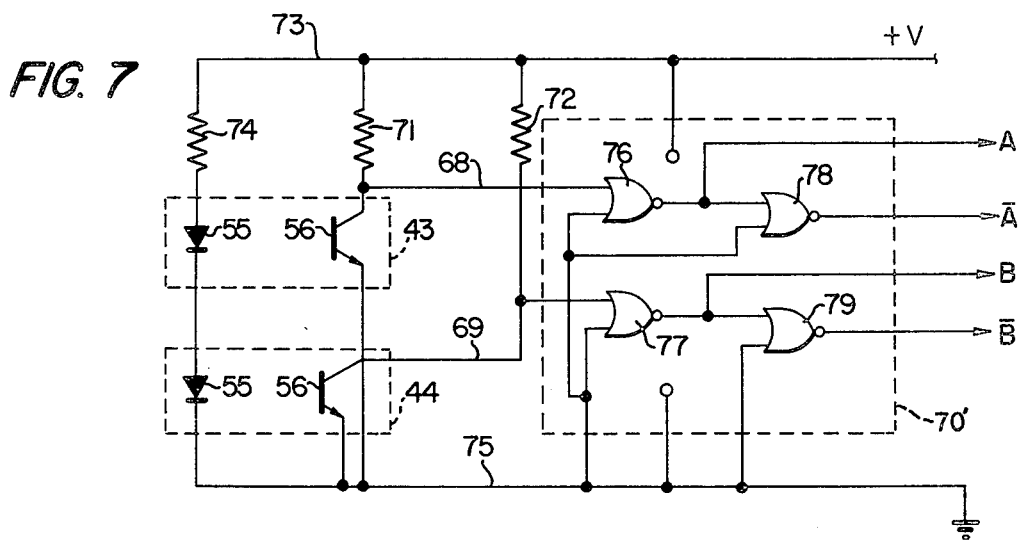
FIG. 7 is a schematic diagram of the signal conditioning circuit, shown in block form in FIG. 6, for producing position control signals indicative of the rotational position of the rotor of FIG. 1.

Referring to FIG. 7, it will be understood that the output of each coupler 43, 44 is high when the energy received from the LED 55 is prevented from exciting the associated phototransistor 56, i.e., when shutter flange 46 passes between the LED and the phototransistor. As will be understood from considering FIG. 7, a first position signal occurs whenever the coupler 43 is blocked and this signal appears on line 68. A second position signal occurs whenever coupler 44 is blocked and this signal appears on line 69.

As hereinbefore noted, each coupler consists of an LED 55 and a phototransistor 56. The collector of each phototransistor is independently connected through an associated resistor 71 or 72 to a positive bus line 73. Diodes 55 are connected in series and in turn through biasing resistor 74 to the positive bus 73. The emitters of the phototransistors and the series connected diodes are returned to a common ground line 75.

The first signal conditioning circuit 70' includes four NOR gates arranged to develop the four position control signals A, $\overline{A}$, (not A), B, and B (not $\overline{B}$) which are indicative of the rotational position of the rotor 10 (within a ninety degree region) and which are utilized to control current switching in the stationary armature windings. To this end, one input of each NOR gate 76 and 77 is connected to lines 68 and 69, respectively, and the other inputs of each NOR gate 76 and 77 are returned to ground line 75. The outputs of NOR gates 76 and 77 establish the A and B position control signals applied to the second signal conditioning circuit. The A and B control signals are also applied respectively, to one of the input terminals of NOR gates 78 and 79, the output of which comprises the $\overline{A}$ (logic complement not A) and $\overline{B}$ (logic complement not B) position control signal. The other input of each NOR gate 78 and 79 is grounded. The duration and sequence of the signals A, $\overline{A}$, B, $\overline{B}$, are schematically depicted in the upper portion of FIG. 8.

Figure 6:
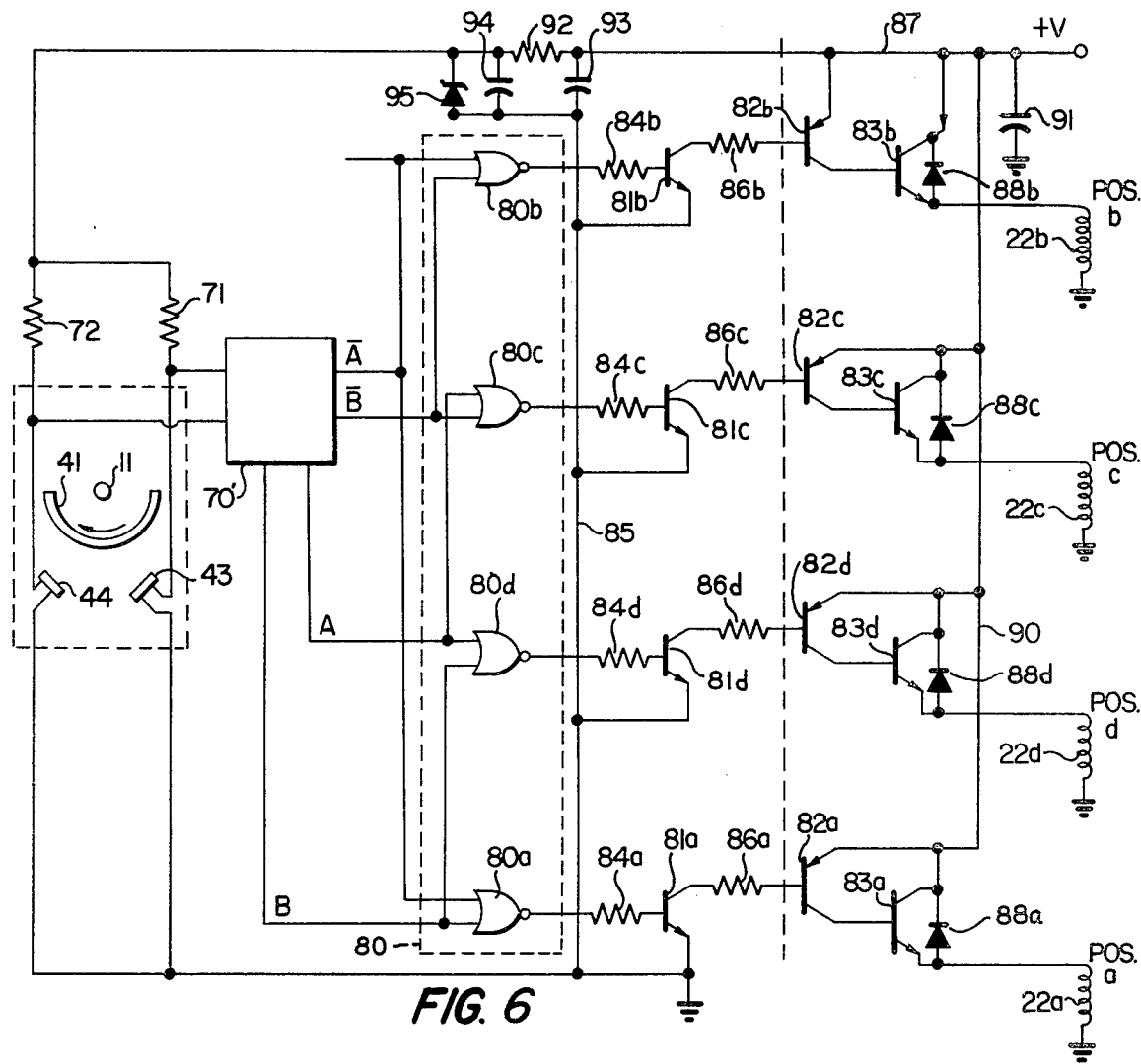
FIG. 6 is a schematic diagram of a solid state commutating circuit embodying features of the present invention and arranged for switching the windings of the motor of FIG. 1 when such windings are connected in half-bridge configuration.

The four position control signals A, $\overline{A}$, B, and $\overline{B}$ are applied to the second signal conditioning circuit 80 shown in detail in FIG. 6. The function of the second signal conditioning circuit is to produce four switching signals for sequentially switching the associated stationary armature windings 22a, 22b, 22c and 22d. To this end, each winding is associated with a separate signal channel including its own NOR gate 80, transistor 81 and driving stage comprising transistors 82 and 83. Operation of each channel is identical and to avoid duplication, the description will be limited to the operation of a single channel. The channel for the "A" winding is referred to as the "a" channel and the associated components in that channel have each numerical reference character followed by the letter "a" to signify its association with that channel. Thus, the "a" channel controls switching of winding "a", the "b" channel controls switching of winding "b", and so forth.

Channel "a" is shown as the lowermost channel of the second signal conditioning circuit in FIG. 6. NOR gate 80a has its two inputs connected to receive the $\overline{A}$ and B inputs from NOR gates 78 and 77. Likewise, each of the other channels are arranged to receive two position control signals from the first signal conditioning circuit 70 such that the four channels produce four successive switching pulses for each revolution of the rotor, as best understood by referring to the lower half of FIG. 8. In this portion of FIG. 8, the duration and sequence of the signals A+B, $\overline{A}$+B, $\overline{A}$+$\overline{B}$, and A+$\overline{B}$ are schematically depicted.

Logic is performed with two inputs for each gate. The gates are connected in such a way that when the output of one NOR gate is a 1, the outputs of the other NOR gates are at zero. Gate 80a, for example, has a 1 output when the A and B inputs are both at zero. This occurs just once in a revolution of the shutter 41. Similarly, for gate 80b, its output is 1 when the $\overline{A}$ and $\overline{B}$ inputs are at zero. This, again, is a singular combination in each revolution. Gates 80c and 80d are in like manner connected to A, $\overline{B}$ and A, B inputs, respectively.

The switching signals from each NOR gate 80 are amplified by an associated transistor 81 to which the switching signal is applied through a base resistor 84. The output of each transistor 81 is directed to the base circuits of a power switch set comprising transistors 82 and 83 which are switched to effect energization of the armature windings 22a–22d in a predetermined timed relation. Transistor 81 comprises an NPN transistor, the emitter of which is grounded through line 85. The collector of each transistor 81 is connected through a resistor 86 to the base of a PNP transistor 82. The collector and emitter of each transistor 82 are connected, respectively, to the base and collector of the associated transistor 83 forming a conventional modified Darlington configuration. For larger motors, larger power transistors 83 or the paralleling of two or more transistors may be desired.

Each stationary armature winding is connected through the collector-emitter junction of its associated transistor 83 to the positive bus 87. A protective diode 88 is connected across the emitter-collector of each transistor 83 to provide a current path from the associated winding to the positive bus line 87. To this end, the anode of each diode is connected to the ungrounded side of the associated winding 22 and the emitter of transistor 83 to insure that the polarity of the diode is such as to allow the return of energy released by the decaying magnetic field of a winding when it is deenergized. The back current generated by the decaying magnetic field is shunted past the transistor 83 through line 90 causing the charging of capacitor 91 which is connected across the positive bus line and ground. The energy stored in capacitor 91 will be returned to the system upon discharge of the capacitor when the next winding is turned on resulting in an overall increase in efficiency of the motor. This improvement in efficiency may be as high as 10%.

The protective circuit formed by each diode 88 and capacitor 91 is equally effective for rectified AC and battery supplies. It should be noted that for a rectified AC line, the diodes associated with the supply source are switched in such direction as to allow current to flow through the motor, but not back to the line. Thus, the capacitor 91 serves to store energy from the switched windings. Capacitor 91 could be replaced by a zener diode which would absorb and dissipate the recovered energy as heat. While such an arrangement could provide protection to the transistors 83a, b, c, d, it would not provide for improved efficiency because the energy would be dissipated rather than being returned to the system.

Resistor 92 connected in positive bus line 87, together with capacitors 93, 94 and a 15-volt zener diode 95 (for a nominal applied average voltage of 12 volts) provides a protective filter network for the circuit components against the possibility of line 87 being raised to a voltage great enough to destroy the solid state components which could occur, for example, if the motor is run off a battery charger that could supply more than eighteen volt peaks.

Stationary armature windings 22a–22d of FIG. 6 are wound bifilarly and are arranged in a half-bridge configuration with one end of each winding tied to a common ground. This provides an efficient arrangement which enables windings to be switched on and off individually with a minimum of electronics and which enables the inductive energy of a switched winding to be recovered. In this connection, when winding 22a is turned off, for example, the decaying magnetic field induces a current in the companion conductor of winding 22c due to the bifilar winding arrangement and the resultant transformer action. The feedback diodes 88 around each switching transistor provide a path for current associated with trapped inductive energy and protect the transistor, while capacitor 91 enables this energy to be recovered. This arrangement provides for relative utilization of the windings in a slot of only 50%. To provide for full utilization of the windings, providing for even more efficient utilization of winding material, resort may be made to the full bridge circuit arrangement of FIGS. 9 and 10.

Figure 9:
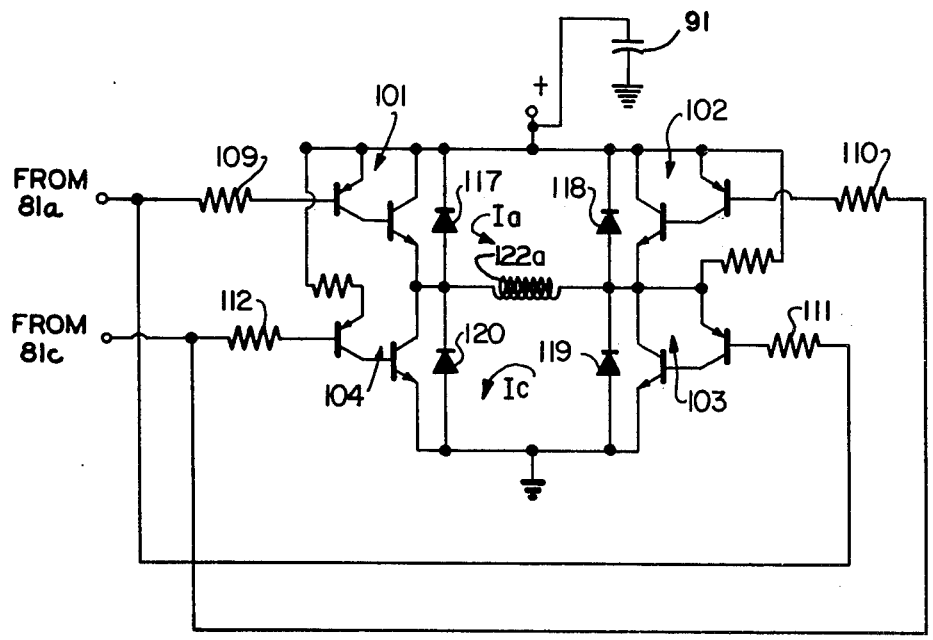
FIGS. 9 and 10 are schematic diagrams of a solid state commutating circuit embodying features of the present invention, and arraged for switching the windings of the motor of FIG. 1 when such windings are connected in a full bridge configuration.
Figure 10:
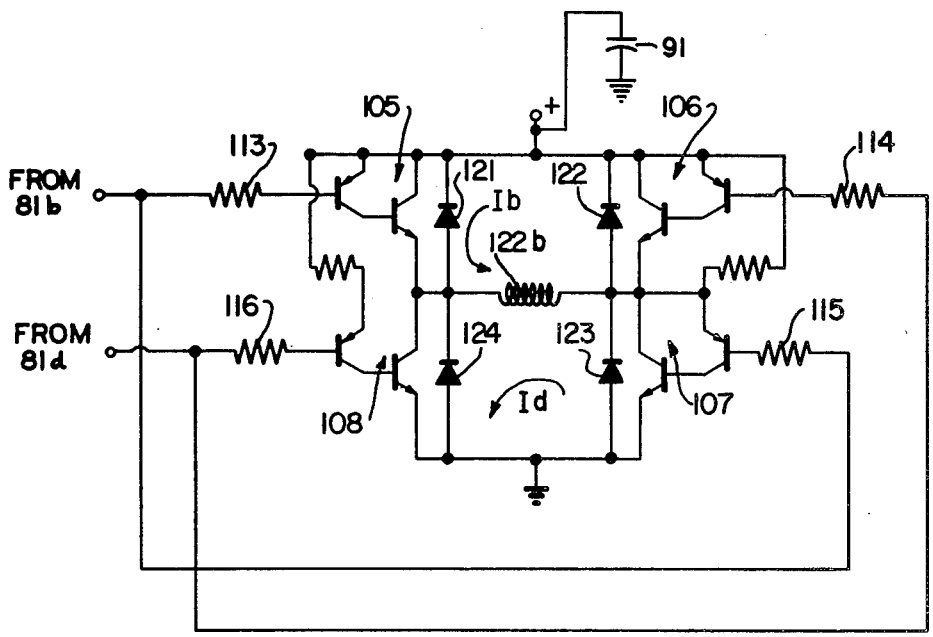

In accordance with the arrangement shown in FIGS. 9 and 10, the stationary armature windings 122a and 122b are wound in the same manner as the stationary armature windings 22a and 22b of the half-bridge configuration of FIG. 6. Thus, instead of using bifilar strands as was done with windings 22a, 22c, only single strands are employed and a particular winding is switched in by switching a pair of transistors. To this end, four power switch sets 101–108 are provided for each pair of windings. Each power set comprises a pair of transistors arranged in a Darlington configuration. The base of the input transistor of each power set is connected through its associated base resistor 109–116 to the output of a transistor amplifier 81 of one of the channels in a manner shown, for example, in FIG. 6. The "a" channel output of transistor 81a is connected to the input of power switch set 101 and 103, the "b" channel to sets 105 and 107, the "c" channel to sets 102 and 104 and the "d" channel to sets 106 and 108. Winding 122a is energized when current $I_a$ flows with the power sets 101 and 103 turned on. Winding 122a, in effect, acts like winding 22c of FIGS. 2 and 6 when power sets 102 and 104 are turned on and current $I_c$ flows. The full bridge circuit for switching in winding 122b operates in a like manner when currents $I_b$ and $I_d$ flow. Each transistor is provided with a protective diode 117–124 connected across the emitter-collector terminals and poled to provide a path for the current associated with stored inductive energy which is released when the transistors are turned off.

The aforementioned circuit arrangements provide a relatively simple, but highly efficient and economical means for controlling the commutation of a motor embodying the present invention.

Advanced timing angle (or advancement of commutation) is defined in accordance with FIG. 3. Zero advance would exist if a winding was turned on when the magnetic center of a rotor magnet was moving theretoward and at the instant that the magnetic center of the rotor was 135 electrical degrees from alignment with the axis of the magnetic pole established thereby. This would be the theoretical optimum. However, switching of the winding 10 electrical degrees before this theoretical optimum position is reached, constitutes a 10 degree advancement of commutation. The preferred amount of advancement of the timing angle is associated with the L/R time constant of the winding. At 0 electrical degrees advance, the current in the winding builds up too slowly to achieve maximum possible torque throughout its full "on" time. Advancing the commutation angle, however, takes advantage of the fact that the generated back emf is less during incomplete coupling, i.e., when the polar axes of the rotor and winding are not in exact alignment, and current build-up time and torque development can, therefore, be improved. Too great an advance incites current overshoots with consequent adverse effects on efficiency, but the optimum setting of the advance depends to some extent on the desired speed and torque operating points of the particular motor. Timing angle is preselectively adjusted by peripheral rotation of bracket 42, which positions the light coupling sensors 43 and 44 with relation to shutter flange 46.

With continued reference to FIG. 3, the center of the north and south magnetic poles established by winding 22b of FIG. 2 have been indicated by the reference notation Nb and Sb, respectively. The general location of the polar axes or centers of magnets 13, 14, on the other hand, are represented by the notation N, S. It is to be understood that north and south poles Nb, Sb, are established by winding 22b when it is energized as indicated in FIG. 2.

During motor operation, windings 22a, 22b, 22c, and 22d are commutated in sequence; and as the poles Nb, Sb (associated with winding 22b) disappear; the poles Nc, Sc (associated with winding 22c) appear. It will be noted from FIG. 3 that the center of magnetic poles S of magnet 14 is positioned 45 electrical degrees past pole Sb. In theory, winding 22b should be switched on at this instant to establish poles Nb, Sb; and winding 22b should remain energized for ninety electrical degrees. Then, winding 22b would be switched off and winding 22c would be switched on, assuming clockwise rotation of the rotor as indicated by arrow R in FIG. 3.

I have found that better performance results when I effect commutation of the windings in advance of the theoretically desirable switching point or angle by a predetermined angle alpha ($\alpha$) (in electrical degrees).

For the embodiment having a winding arrangement as described hereinabove, the angle alpha equaled about twenty electrical degrees. Thus, winding 22a was deenergized, and winding 22b was energized to establish poles Nb, Sb when the axis of poles Sb of magnet 14 was about 135 plus 20 or 155 electrical degrees therefrom. Ninety electrical degrees later, winding 22b was deenergized and winding 22c was energized so as to establish poles Nc, Sc. This then continues of course for the four windings 22a, b, c, d, as will be understood.

Figure 11A:
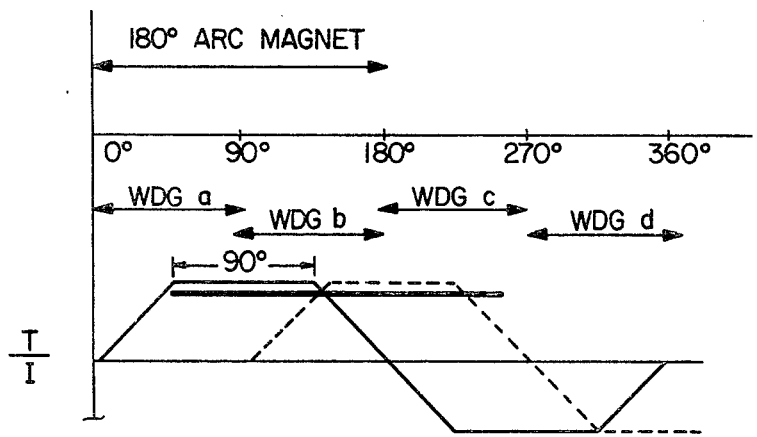
FIGS. 11A–C are graphical representations of torque per ampere as a function of rotor position, magnet arc length and distribution of turns for magnet arc lengths of 180 electrical degrees, 160 electrical degrees, and 135 electrical degrees, respectively; and schematically illustrate different arc lengths of rotor magnet arc lengths.
Figure 11A:
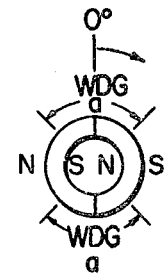

Although oppositely located winding sections can be coupled simultaneously by opposing magnets of the rotor, all turns of a given winding may not be fully coupled due to the distributed nature of the windings and foreshortening of the rotor magnets. Because of this, the output torque per ampere input to the armature winding (T/I) is a function of rotor position, magnet arch length, the number of winding turns, and the placement of the turns in the armature. FIGS. 11A, B, C reveal the effect on the ratio of T/I when magnets of different arc lengths (in electrical degrees) are used with a given two-stage armature configuration. In a multi-stage motor, the flat portion of the torque per ampere (T/I) curve for each winding will be reduced to the same number of electrical degrees as for a two-stage motor by a reduction in magnet arc length although the "on" time for each winding will vary from that shown for a two-stage motor in FIGS. 11A-C.

FIG. 11A represents a plot of T/I when the magnet arc length is 180 electrical degrees and the two-stage windings 22a, b, c, d have the same number of turns in each slot. The solid trapezoidal curve shows instantaneous torque per ampere for a constant value of current flowing in winding 22a if that winding is energized or left "on" for a full revolution of the rotor. The dashed trapezoidal curve is similarly drawn for winding 22b to represent its instantaneous torque per ampere contribution. The heavy solid curve displays a net effect of winding 22a being "on" for 90 electrical degrees only, and winding 22b being "on" for 90 electrical degrees and so on for windings 22c and 22d. The heavy solid curve is displaced from the other curves for illustration convenience.

Figure 11B:
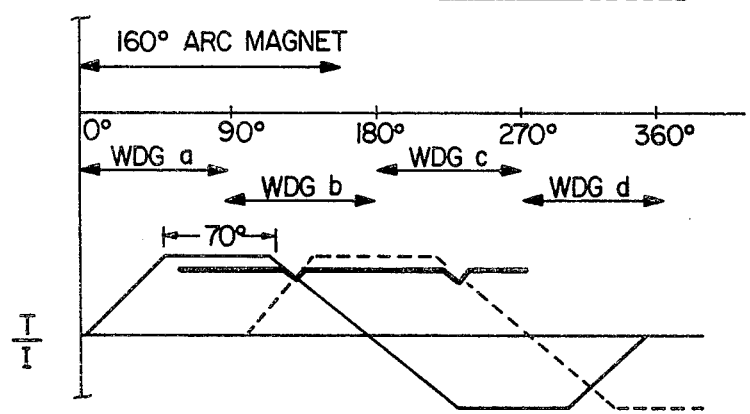
Figure 11B:
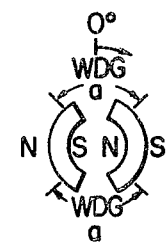
Figure 11C:
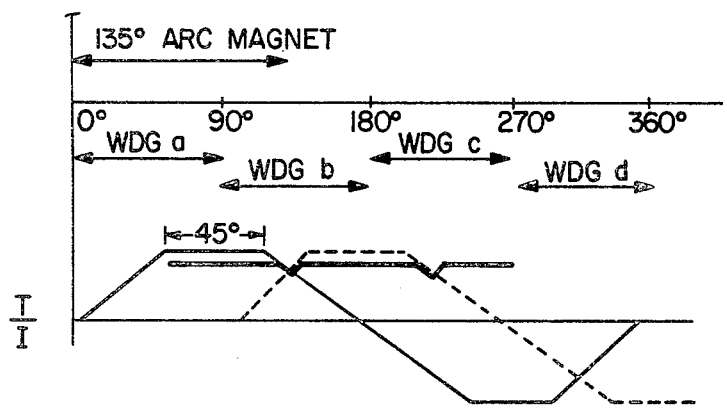
Figure 11C:
Figure 12:
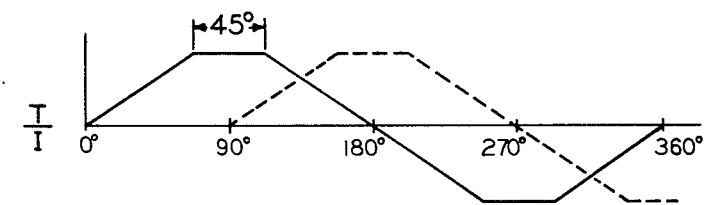
FIGS. 12–15 are plots of torque per ampere as a function of rotor position (in electrical degrees) for different amounts or extents of spread (or relative concentration) of stationary armature windings.
Figure 13:
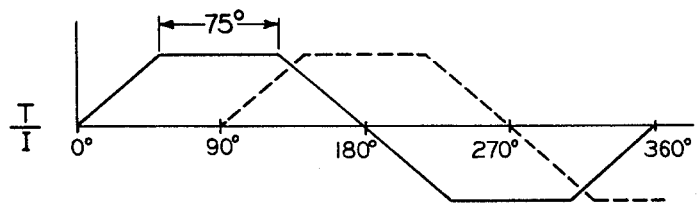
Figure 14:
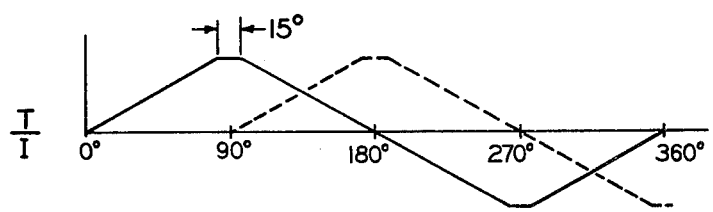
Figure 15:
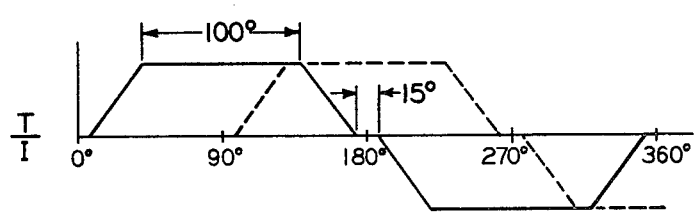

Winding 22a is turned on at approximately 45 electrical degrees after the polar axes of the rotor magnets have passed the center of the poles to be established by winding 22a. The distributed windings are thus seen to introduce a trapezoidal shape to the instantaneous torque in contrast to the theoretical ideal square shape which would otherwise be obtained for an ideal case utilizing concentrated windings. It is to be noted that each of FIGS. 11A-C schematically depict the arcuate length of various rotor magnets as well as the "spread" of the winding conductors of winding 22a. "Spread" is used to indicate the angular expense of adjacent core slots that carry the conductors of a given winding which instantaneously conduct current in the same axial direction along the core. For example, in FIG. 2, winding 22b has two sets of conductors with one set being disposed in slots 801 through 806 and with the other set being disposed in slots 807 through 812. The conductors of one set contained in slots 801 through 806 instantaneously conduct current in the same axial direction along the core as illustrated by the "x's"; thus, the winding 22b has a spread of ninety electrical degrees. The spread is preferably less than 120 electrical degrees, but it may approach zero for a fully concentrated one coil winding occupying only two slots. Concentration of the windings, that is, reduction of the "spread" permits a reduction in magnet arc length.

FIG. 11B illustrates the torque per ampere for a two-stage motor developed as a function of rotor position, utilizing an arc magnet having an arc length of 160 electrical degrees. The windings are again assumed to be uniformly distributed and winding current to be at a constant value. The instantaneous torqur per ampere as a function of rotor position curve retains its trapezoidal shape, as in FIG. 11A, but the build-up is slower and the time at maximum torque is shorter. The net or average torque, however, is only slightly reduced. These effects are emphasized still further for a magnet having an arc length of 135 electrical degrees as revealed by FIG. 11C.

In taking into account winding inductance and rotor speed of motors constructed as taught herein, optimum torque at rated load should occur when the windings are energized in advance by approximately 20 electrical degrees. Because of this, magnet arc length can be reduced from 180 electrical degrees to 160 electrical degrees with essentially no loss in motor performance. Moreover, magnets having arc lengths as low as 120 electrical degrees can be utilized without substantially sacrificing motor performance and efficiency. In preferred embodiments that have been constructed and tested however, the arc length of the magnets have been between 135 and 160 electrical degrees.

The curves of FIG. 11 are ideal representations of torque per ampere. They depart from the ideal when winding inductance, core slot configuration, rotor speed and advance timing angle are taken into account. Inductance slows the rate of current rise, so that the L/R time constant of the windings becomes an increasingly important factor as higher rated speeds are selected. As a general rule, the advance timing angle is greater for higher speeds, but optimum performance is achieved when winding turn off or commutation occurs nearly on a flat portion of the torque curves of FIGS.

11A-C, and turn on occurs on a rising portion of these same torque curves.

FIGS. 12-15 are similar to FIGS. 11A-C at least to the extend that the former are idealized plots of the ratio T/I (torque per ampere) for a motor such as the one of FIG. 1 as a function of rotor position for different amounts or extents of stationary armature winding spread. In FIGS. 12-15, the solid trapezoidal curves show instantaneous torque per ampere that would result if one winding (e.g., winding 22a) were left "on" for a full revolution of a rotor. The dashed trapezoidal curves are similarly drawn for another winding (e.g., winding 22b). The data for curves 12-15 are based on an assumption that a single two pole rotor having magnet arcs of 135 electrical degrees is used with stationary armatures having different winding spans or concentrations. The curves of FIGS. 12-15 would result, respectively, with winding set side turn spreads of 90, 60, 120, and 30 electrical degrees, respectively. The duration or extent, in electrical degrees, of the flat portions of the curves in FIGS. 12-15 have been denoted in the drawing figures. It will be noted that the duration of such flat portions decrease with increasing coil side turn spreads. Stated conversely, increasing coil side turn concentrations cause increased flat portion (maximum T/I) duration.

The curves of FIGS. 12-15 are based on winding distributions that are assumed to provide an equal number of turn segments per slot. As will be appreciated from FIGS. 1 and 2, windings 22 include end turn portions disposed along the end faces of the stationary armature core, and side turn portions that are disposed along the axially extending armature core slots.

Taking winding 22b as exemplary, and referring to FIG. 2, winding b is formed of two sections or coil groups. Each of these groups has three concentric coils, with each coil comprised of a plurality of turns and with side turn portions of such coils in a stator slot. The peripheral extension distance or arcuate expanse of the outermost coil of each coil group determines the span of each coil group. However, the "spread" or "concentration" of winding 22b is determined by the collective arcuate expanse of one-half of the side turn portions of both coil groups. With a maximum concentrated winding, only one coil would be used, however, and all conductors for such winding would occupy only a total of two slots.

Thus, all of the conductors of winding 22b that carry current into the plane of FIG. 2 (or out of the plane of the drawing) collectively establish a "spread" of ninety electrical degrees. If the winding 22b consisted of two coil groups each having only one coil and these coils shared the same slot, then maximum "concentration" or minimum "spread" would be achieved.

It will be understood from a comparison of FIGS. 11A-C and 12-15 that maximum values of T/I will be of longer duration if the winding "spread" is minimized and the rotor magnet arc length is maximized.

The above-described FIGS. 11A-C and 12-15 illustrate the interrelationship between magnet arc length, winding spread and the T/I contribution of a winding. Although shown for a two-stage motor, this interrelationship may apply to motors with multiple stages. As the number of stages are increased, the spread of a winding is generally reduced to provide an increase in the flat portion of the T/I curve for each winding allowing an overlap in "on" times between the windings assuming the magnet arc length remains the same. This overlap in winding "on" times may be desirable to achieve greater winding utilization, increased motor efficiency and increased motor torque output. However, just as with the previously described two-stage motor, reductions in magnet arc length of 20 electrical degrees (180 to 160) and of 45 electrical degrees (180 to 135) causes reductions of 20° and 45° respectively in the flat portions of the T/I curves for each winding in a multi-stage motor. When winding inductance and rotor speed are taken into account, the optimum torque at rated load should occur when the windings are energized in advance by approximately 20 electrical degrees. Because of this, magnet arc length can be reduced from 180 electrical degrees to 160 electrical degrees with essentially no loss in motor performance.

When maximum torque over a full rotor revolution is desired, the wave forms of FIGS. 11A-C and 12-15 should be kept "flat" as long as possible. However, if the duration of maximum T/I were a theoretical maximum of 180 electrical degrees, a square wave would result. In other words, the leading part of the wave form would become infinitely steep. However, with steeper wave forms, there is more possibility of starting problems. Therefore, I prefer that the leading part of the wave form be as steep as possible without causing objectionable starting problems. In this connection it should also be noted that running requirements may require more winding turns, and therefore a greater winding "spread". This in turn results in a less "steep" wave form, which in turn would cause a need for a greater advancement of commutation for optimized running efficiency.

Figure 19:
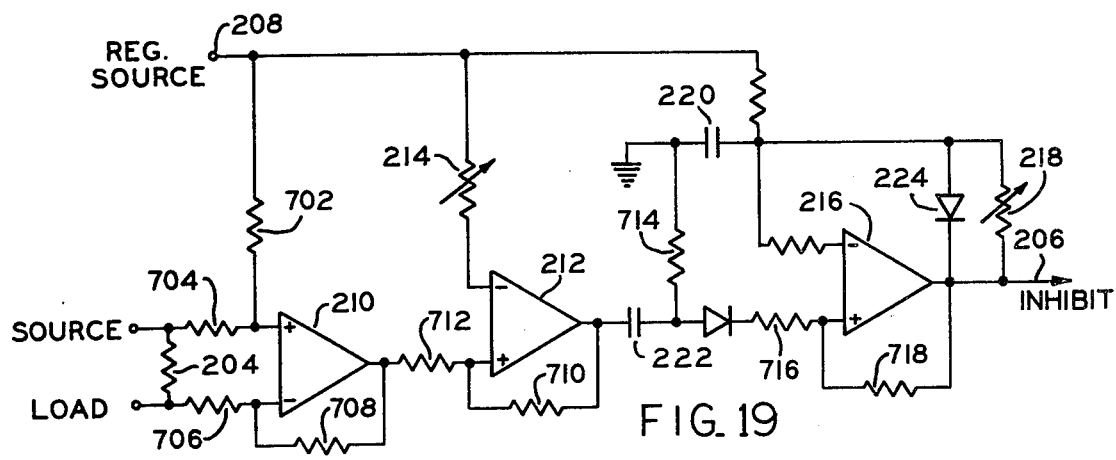
FIG. 19 is a schematic diagram of a circuit for sensing stator winding current and for interrupting that current for a short, predetermined time interval when the sensed current exceeds a prescribed value.

While NOR gates have been employed in FIG. 6, a wide variety of combinations of AND, OR, NAND, and NOR gates may be used to accomplish the desired logical combinations. As a further variation on the circuit of FIG. 6, provision may be made for sensing the current in one or more stationary armature windings and for limiting the currents supplied to the stationary armature windings when the sensed current exceeds a prescribed value. FIG. 19 illustrates an inhibiting circuit which will sense armature current and interrupt that current for a short predetermined time interval each time that the sensed current exceeds a prescribed value. The circuit of FIG. 19 is operative primarily during motor start-up and the predetermined time interval is less than the time interval during which a specified stationary armature winding is enabled. The inhibit feature of FIG. 19 may be incorporated into the system depicted in FIG. 6, for example, by inserting the relatively small resistance 204 in series between the voltage source and the several armature windings, for example, by placing it in the upper right-hand line of FIG. 6 which connects to the plus V source. To adapt the logic circuitry of FIG. 6, for an inhibit function, the several gates 80 may be three input NOR gates with that additional input (not illustrated in FIG. 6) for each gate connected together and to the inhibit output line 206 of FIG. 19. Clearly, numerous other implementations of the inhibit function are possible.

In FIG. 19, the resistance 204 will be in series with a stationary armature and the circuitry of FIG. 19 will respond to the voltage across resistance 204 to disable the armature winding for a short time interval when that resistance voltage exceeds a predetermined value. For comparison purposes, a regulated, for example, ten volt, direct current source, is applied to terminal 208 which, while not shown, may comprise a conventional center tapped transformer or bridge rectifier zener regulated direct current source. The inhibit signal is, for example, of 300 microseconds duration after which the NOR gate of FIG. 6 or other transistor circuitry will be allowed to reenergize the particular winding.

In FIG. 19, an operational amplifier 210 amplifies the voltage sensed across resistor 204 and supplies that amplified voltage to one input of amplifier 212. Amplifier 212 is connected as a comparator and receives as its other input a reference voltage as scaled by the setting of potentiometer 214. The output of amplifier 212 is differentiated and employed to enable amplifier 216. The amplifier 216 is connected as a "one shot" and remains on for a time duration determined by the time constant of the potentiometer 218 and capacitor 220. The one shot amplifier 216 provides a high signal on line 206 for the exemplary 300 microsecond time period to disable the motor winding when, for example, the instantaneous winding current exceeds 10 amperes.

The three illustrated amplifiers in FIG. 19 are integrated circuit operational amplifiers, for example, type MC3301B. The capacitor 222 between the output of amplifier 212 and the input of amplifier 216 performs the differentiation function. The output of amplifier 216 goes high to inhibit the winding which level charges capacitor 220 by way of the variable resistor 218 and when the charge on capacitor 220 becomes sufficiently large, the difference between the two input signals to amplifier 216 is low enough to force the amplifier output back to its low level and capacitor 220 discharges by way of diode 224.

Figure 20:
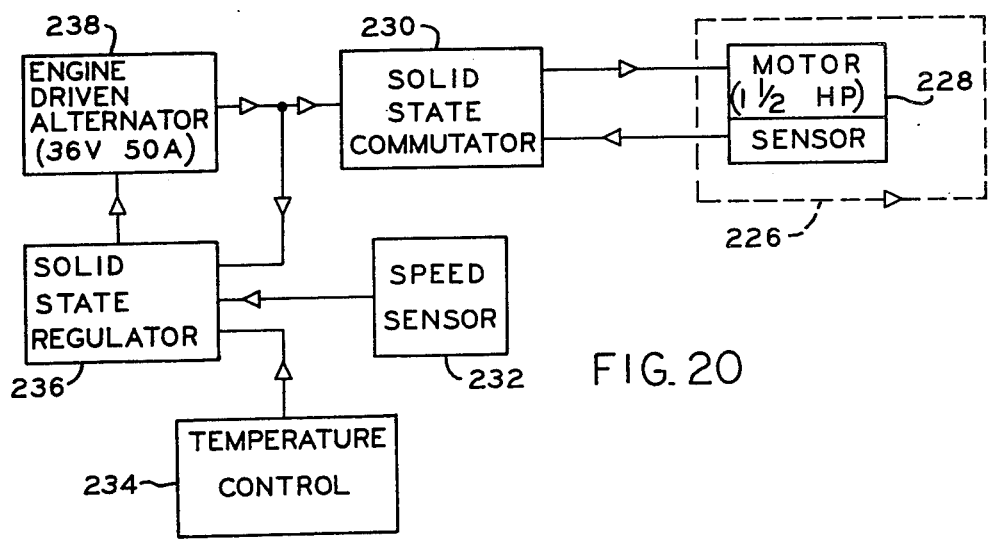
FIG. 20 is a block diagram of a vehicular air conditioner system, hermetically sealed and employing one embodiment of the present invention.

The block diagram of FIG. 20 illustrates one hermetic environment in which the brushless DC motor of the present invention finds particular utility. A hermetically sealed refrigeration system 226 includes a conventional compressor (not illustrated) driven by the brushless DC motor 228 which may, for example, be of the type illustrated in FIG. 1. The motor 228 receives armature energizing current from the solid state commutating circuit 230 and provides thereto position signals, for example, from the optical position indicators discussed earlier. A speed sensing circuit 232 as well as a temperature control, such as a conventional thermostat 234 provides an input signal to a solid state field current regulating circuit 236. The field current regulating circuit 236 controls the vehicle engine-driven generator or alternator 238 which in turn supplies energy to the motor 228 by way of the commutating circuit 230. By controlling the field current to the alternator or generator 238, the power supplied to the motor is readily controlled to in turn control the resulting temperature from the air conditioning system. The system outlined in FIG. 20, eliminates the more conventional belt-driven compressor arrangement typically found in vehicle air-conditioning systems and provides instead a system which may be adapted to either energization from the alternator 238 or when the vehicle is parked from a standard alternating current outlet. The commutating circuit 230 may be of the same general configuration as the circuit of FIG. 6 and, in the event that optional operation from a standard alternating current outlet or use of an alternator rather than a DC generator is desired, suitable bridge or other rectifying circuitry would be incorporated in the FIG. 6 circuit or in the alternate solid state commutator circuits 230 as illustrated in FIG. 21 with the corresponding speed sensing circuit 232 illustrated in FIG. 22.

Figure 21:
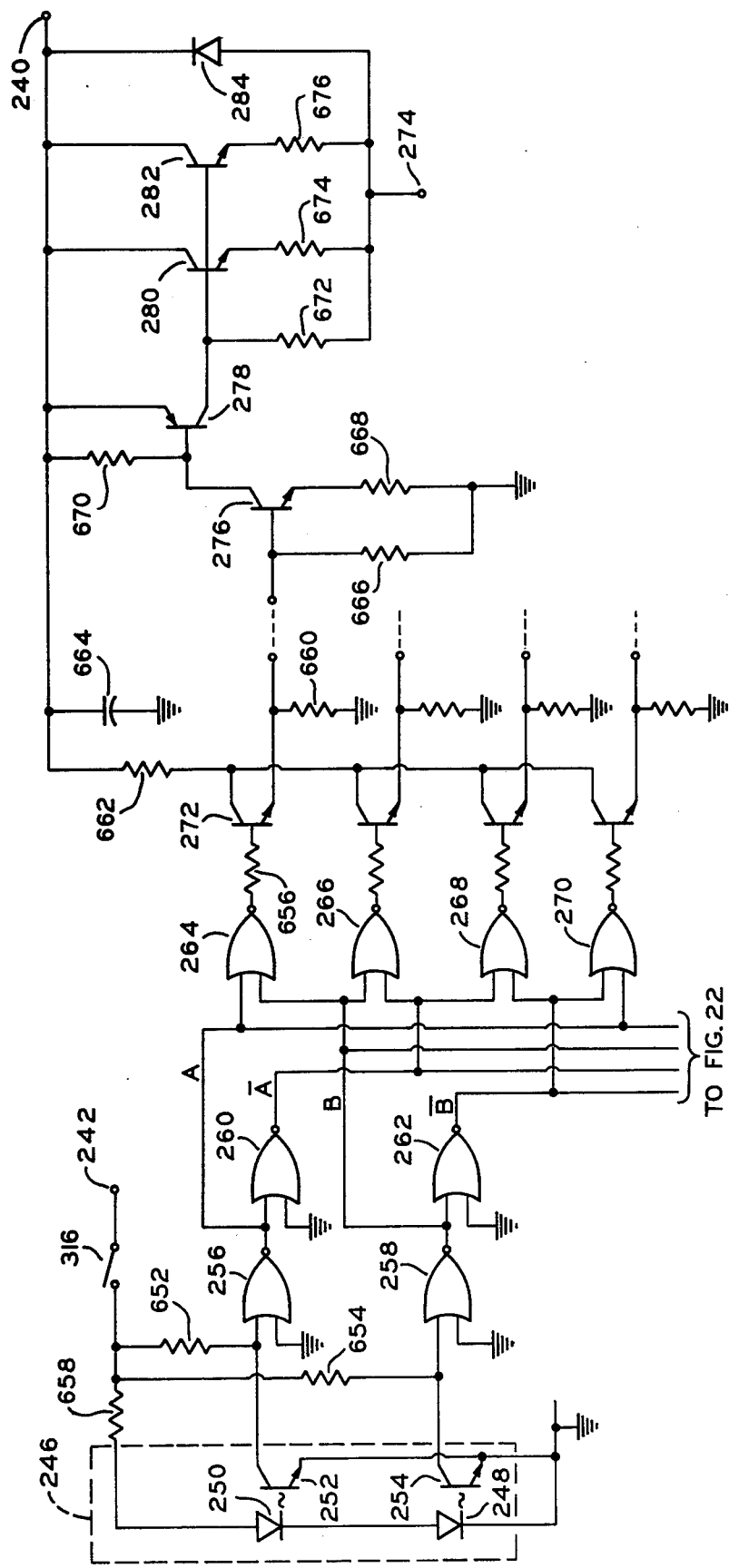
FIG. 21 is a schematic diagram of the solid state commutator circuit of FIG. 20.
Figure 22:
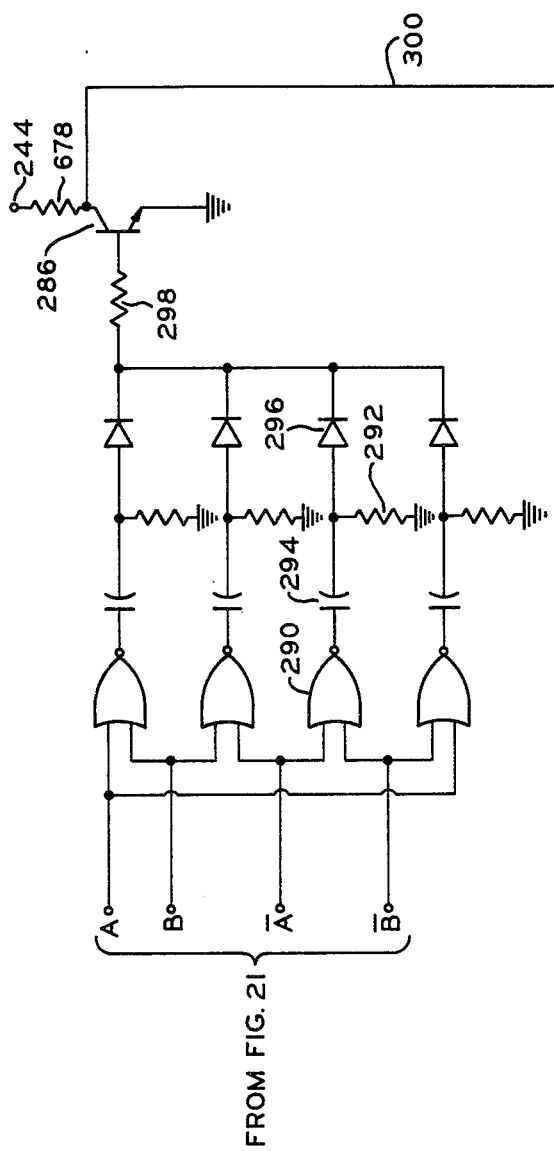
FIG. 22 is a schematic diagram of the speed sensor of FIG. 20.
Figure 22:
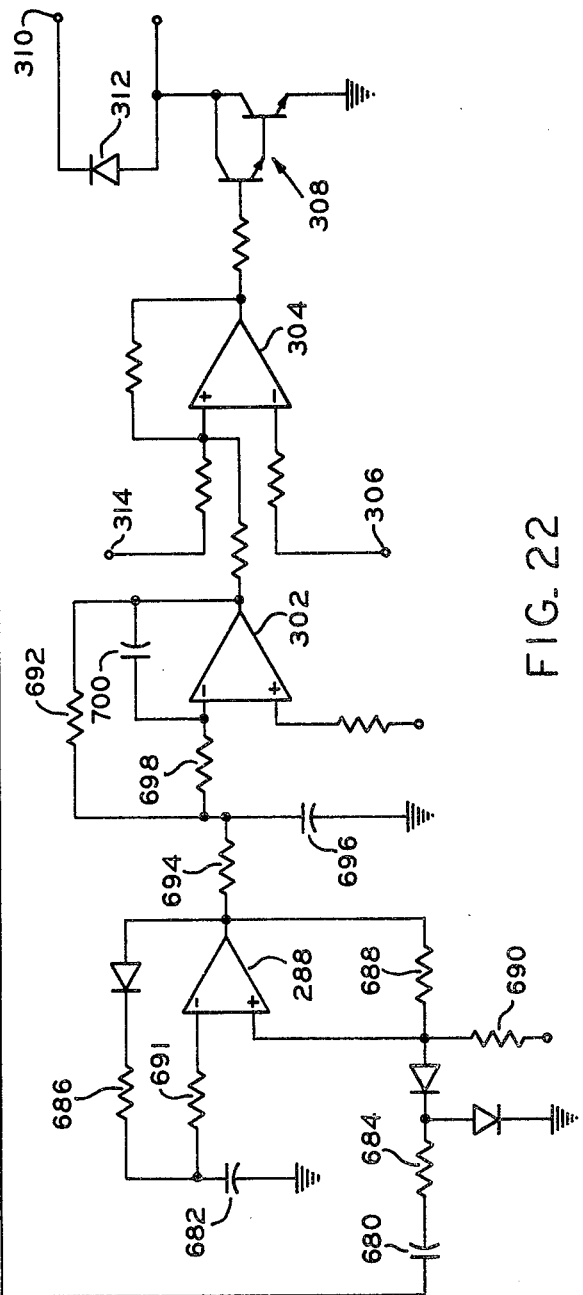

In the specific implementation illustrated in FIGS. 21 and 22 the voltage output from the engine-driven alternator 238 is applied to terminal 240 while the twelve volt direct current vehicle battery source is applied at terminal 242 and a zener regulated battery voltage of twelve volts is applied at terminal 244. In FIG. 21, position sensors 246 operate much as before in conjunction with a shaft mounted light shutter so that the respective light emitting diodes 248 and 250 will cause either one or both of the light sensitive transistors 252 and 254 to be conducting. The conducting or non-conducting indications or signals are inverted by NOR gates 256 and 258 which in conjunction with NOR gates 260 and 262 may by a type CD-4001 integrated circuit and function as a primary decoder to form the A, B, not A and not B signals as before. These signals are supplied to the corresponding inputs in FIG. 22 as indicated and further are logically combined by NOR gates 264, 266, 268, and 270 in the manner already described in conjunction with FIG. 6 to provide the four winding enabling signals, only one of which occurs over every ninety degrees of shaft rotation. As before, the four sequential winding energizing signals are then applied to four corresponding transistors such as 272 for amplification to in turn be supplied to four winding enabling power modules, only one of which is illustrated in FIG. 21. Each power module is connected to one of the four illustrated transistor emitters, and to the alternator source at 240 and to supply that alternator voltage to its respective motor winding at terminal 274. Conventional alternator output rectification may be employed but is not illustrated in FIG. 21.

Transistors 272, 276 and 278 function as amplifiers to provide sufficient base drive current to a pair of parallel connected type 2N6258 power transistors 280 and 282. Diode 284 is, as before, a discharge path for the inductive energy which is present in a winding when that winding is abruptly turned off. In operation, when the output of one of the four NOR gates such as 264 goes high, transistor 272 is enabled to conduct in turn enabling transistors 276 and 278 to their conducting state to supply a base drive current to the pair of parallel transistors 280 and 282, the conduction of which supplies the direct current voltage at terminal 242 to one terminal 274 of a motor winding the other terminal of which would typically be grounded.

Figure 8:
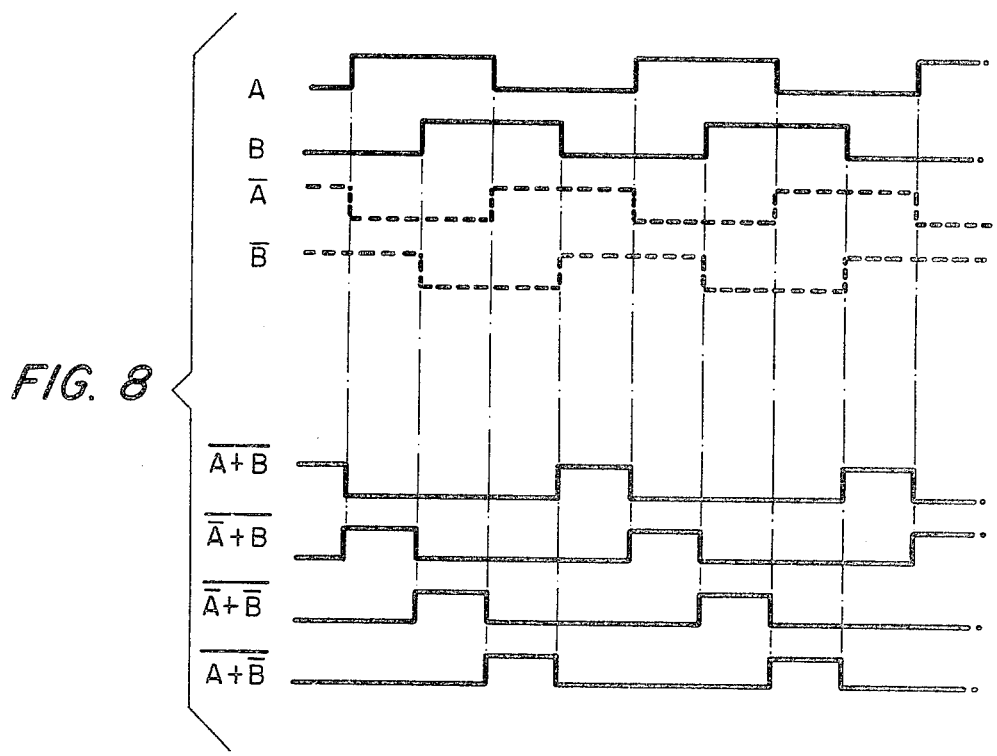
FIG. 8 illustrates the relative relationship between the angular position of the rotor and the outputs of two light sensitive elements, A and B, and the switching pulses produced as a result of rotor rotation.

The A and B signals, as well as their complements are also supplied as inputs to the speed sensing circuitry of FIG. 22 and are logically combined by four NOR gates again of a type CD-4001 in a manner such that exactly one of those NOR gate outputs is high at any given instant and each remains high for ninety degrees of shaft rotation thereafter going low and the next NOR gate output going high. These NOR gate outputs are of a rectangular wave form and are differentiated and applied to a transistor 286 for amplification and the resulting sequence of short voltage pulses provided as inputs to an integrated circuit amplifier 288. For example, during the time interval that both the A and B signals are high, NOR gate 290 will just as illustrated in FIG. 8 provide a high output pulse and an exponentially decaying spike of voltage will appear across resistor 292 due to the initial short circuit and subsequent blocking effect of the charge accumulating on capacitor 294. This spike is delivered by way of diodes 296 and resistor 298 to the base of transistor 286 and that transistor 28 will conduct for a short time interval to effectively ground the line 300. The periodic grounding of line 300 occurs at the beginning of each rectangular pulse from the gate 290 since the beginning of a pulse provides a positive going spike while the termination of that pulse provides a negative going spike which is prevented from passing to the base of the transistor 286 by diode 296. This periodic grounding of line 300 triggers amplifier 288 which is an operational amplifier in a "one shot" configuration, the output of which is a sequence of square waves of uniform height and duration. This square wave train is supplied to a second amplifier 302 which functions as a filter and provides as an output the speed signal to be supplied to yet another amplifier 304 which is again an operational amplifier, this time connected to a comparator. The output amplifier 302 is compared to the alternator voltage as applied to terminal 306 and the amplifier 304 output is either high or low, depending upon whether the speed indicative signal exceeds of is less than the voltage applied to terminal 106. If the signal exceeds the alternator output voltage, the output of amplifier 304 is high, turning on the Darlington configured transistor pair 308, coupling the one alternator field terminal to ground, thereby increasing the voltage output of the alternator. Alternator field terminal 310 is coupled to a battery voltage source and a diode 312 is connected across the alternator field terminals and that diode, in conjunction with the inductance of the alternator field, functions to smooth out the otherwise pulsed field current due to the turning on and the turning off of the transistor pair 308. The width of a single pulse output from the one shot amplifier 288 is constant whereas the frequency of occurrence of those pulses is directly proportional to the frequency of grounding the line 300 which in turn is indicative of rotor speed. Thus, when the rotor speed increases more such pulses are provided to the filter 302 during a given time interval and the output signal (the average of the voltage input level) from that filter is of a higher level. This higher voltage supplied to the positive input of amplifier 304 causes that amplifier output to go high (presuming the alternator output voltage has not changed) to thus cause transistor pair 308 to conduct and to increase the alternator voltage output. A voltage such as the vehicle battery voltage is also applied to terminal 314 to assure some alternator voltage when the motor is at a standstill. Thermostatic control may be implemented as a simple single switch 316 of FIG. 21 or more sophisticated control techniques may be employed, for example, by changing the threshold voltage of comparator 304 or other techniques such as discussed in conjunction with FIG. 24.

Figure 23:
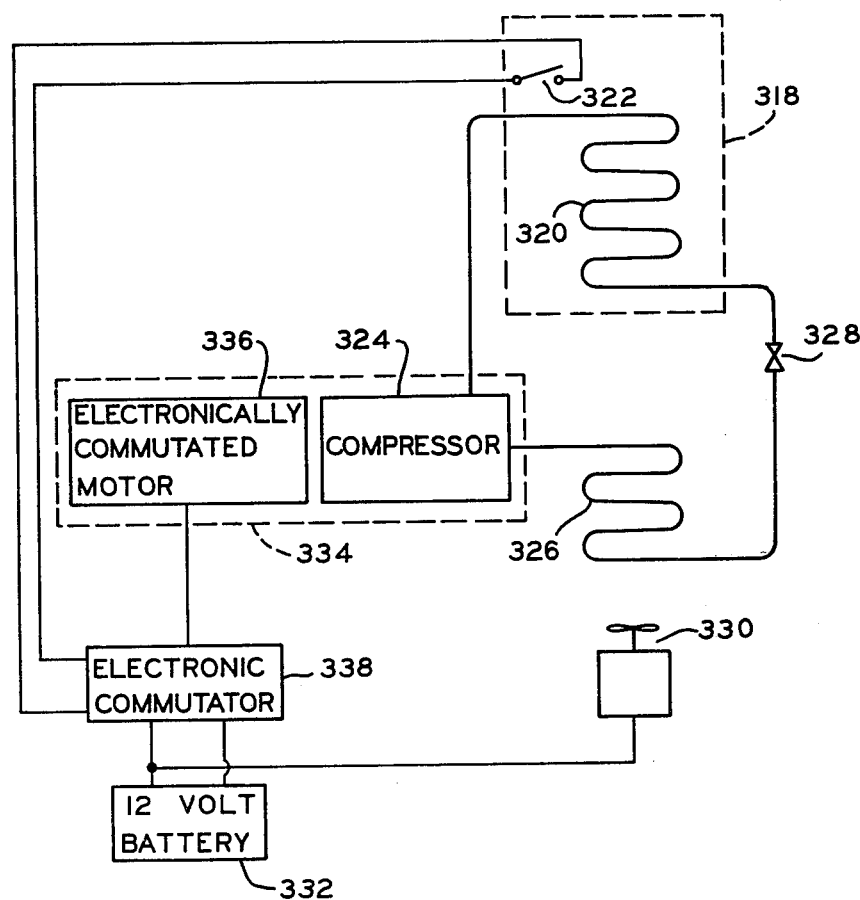
FIG. 23 is a block diagram of another hermetic environment illustrating use of the invention in one form thereof.

Another exemplary hermetic environment in which the present novel brushless direct current motor finds particular utility is illustrated in FIG. 23 where a conventional refrigerator enclosure 318 contains an evaporator coil 320 and a pair of thermostatically controlled contacts 322 which close to actuate the refrigeration system when the enclosure temperature exceeds some preferred value. A compressor 324 pumps refrigerant to a condensor coil 326 where excess heat is extracted and the refrigerant then moves on to an expansion valve or capillary 328 and into the evaporator coil 320. The refrigerant circuit and the cooling of the condensor coil 326 by a fan 330 are conventional; however, the block diagram of FIG. 23 is unique in that the system is deployed in a portable or mobile environment and is powered, for example, from a vehicle twelve volt battery 332 and has a hermetic enclosure 334 enclosing the compressor 324 and motor 336 rather than employ the conventional engine driven compressor arrangement typically found in vehicle environments. The electronic commutator 338 may be of the type illustrated in FIG. 6 or FIG. 21 and a thermostatic control thereof may be implemented as before or as illustrated in FIG. 24.

Figure 24:
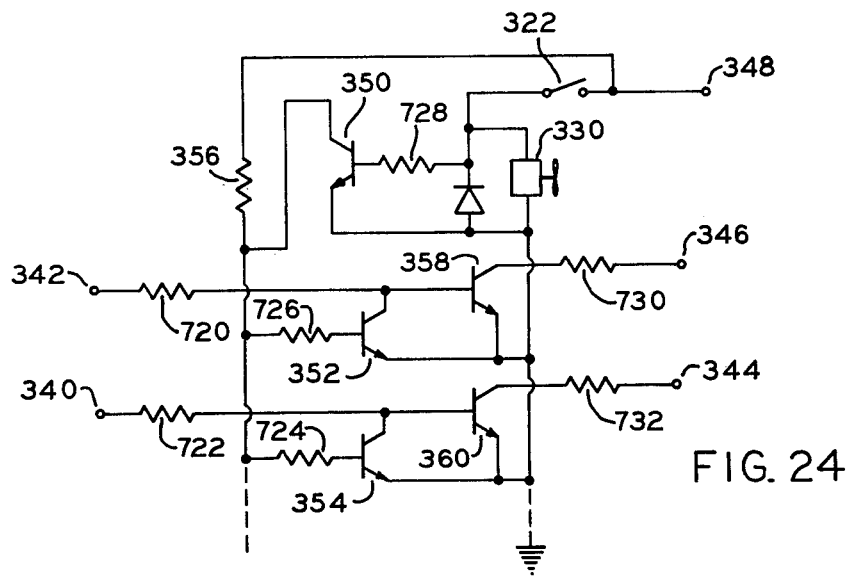
FIG. 24 illustrates in schematic a portion of a circuit which may be interposed between the output of the NOR gates 80 and the base of transistors 82 in FIG. 6 to facilitate implementation of FIG. 23 refrigeration system.

In FIG. 24, NOR gates such as 80 of FIG. 6 are connected to four substantially identical input terminals, such as 340 and 342 while the output terminals of FIG. 24 would be coupled to the bases of four transistors 82 in FIG. 6. The exemplary twelve volt direct current source would be coupled to terminal 348 and the contacts of the thermostat 322 function to connect this positive voltage source to the condensor coil fan 330 and to the base of transistor 350. So long as the switch 322 is open, the transistor 350 is maintained in its non-conducting state and transistors such as 352 and 354 receive base drive by way of resistor 356. Conduction by transistors 352 and 354 prevents conduction by transistors 358 and 360, respectively, thereby precluding any winding enabling signals at terminals 344 and 346 (no path for base current in transistor 82). When switch 322 is closed, the transistor 350 is rendered conductive to effectively ground the source of base current for the transistors 352 and 354 forcing those transistors to go to their non-conductive state and allowing the appropriate transistor 358, 360, or other transistor similarly positioned for the other windings, to become conductive when energized by their respective terminals such as 340 and 342 allowing the commutator circuit to function as previously described.

Figure 16:
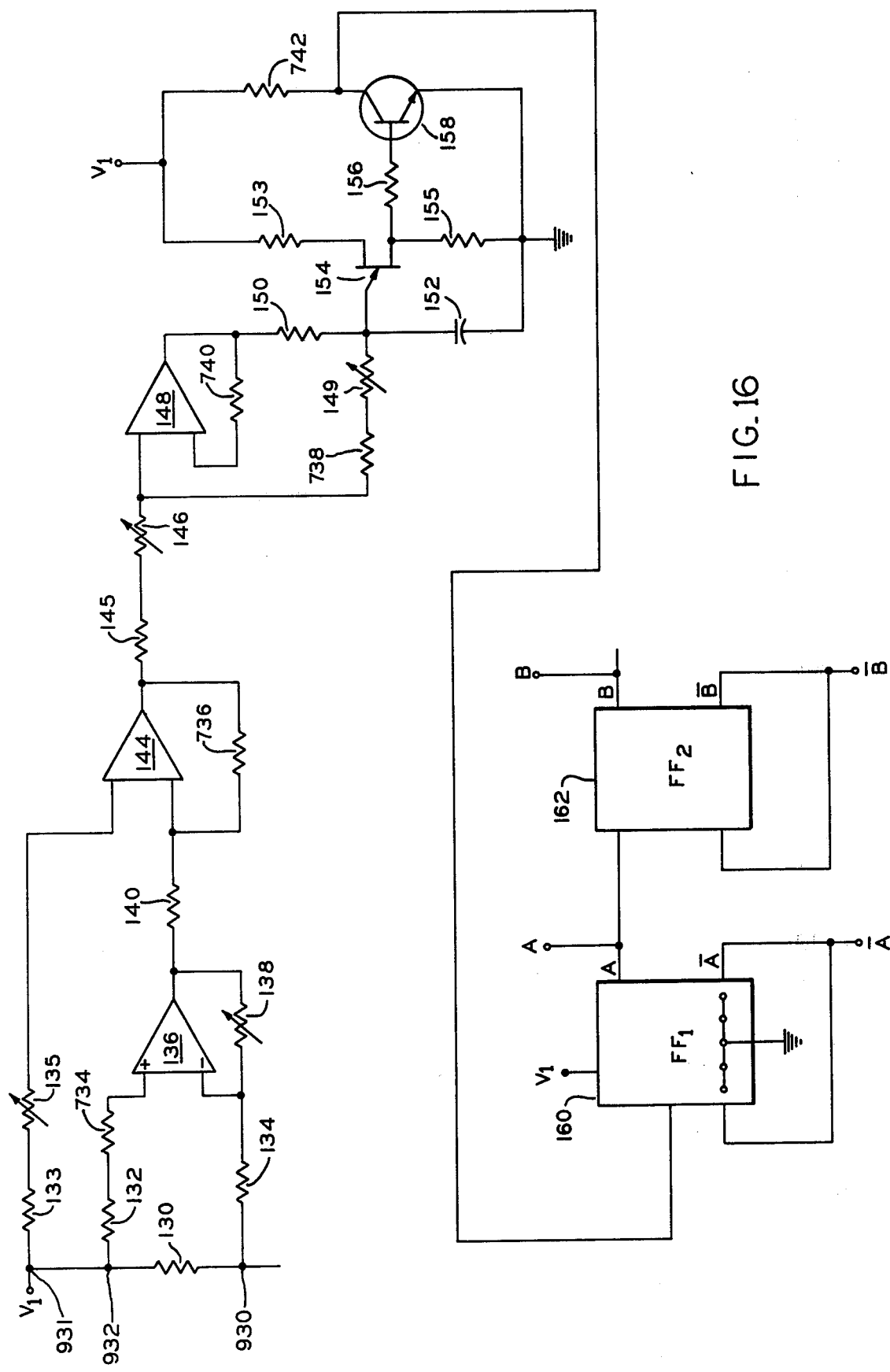
FIG. 16 illustrates in schematic form a circuit for supplying the A and B and their complements to circuitry such as illustrated in FIG. 6 without the need for special mechanical type devices to sense the angular position of the motor rotor.

The circuit of FIG. 16 illustrates one manner of omitting electro-optical or electromechanical rotor position sensing devices and is particularly suited to the situation where the several motor windings are connected in a half-bridge connection. The circuit of FIG. 16 has the resistance 130 connected between the source of voltage for the windings and the several windings. For example, lines 930 and 931 might be connected respectively to the source voltage and to the point marked +V in FIG. 6, so all current supplied to the windings will flow through resistor 130. Similarly, the resistance 130 might be connected by lines 930 and 932 in the common connection of the windings to ground in order to sense total winding current and the line 931 might be connected to the source supply as shown in FIG. 16 in order to sense the supply voltage with the connection between 931 and 932 being omitted. In either event, the total winding current flowing through resistor 130 develops a voltage thereacross which is applied to the plus and minus terminals of an operational amplifier 136 through resistive elements 132 and 134, respectively. As shown more fully in FIG. 6, the stationary armature windings 22a, 22b, 22c and 22d are connected in a half-bridge configuration to ground and the resistor 130 may be connected between the center of the half-bridge and ground. A variable by-pass resistor 138 is disposed about the operational amplifier 136. In turn, the output of the operational amplifier 136 is applied through a resistor 140 to one input of an operational amplifier 144, whereas the supply voltage $V_1$ is applied through a fixed resistor 133 and a variable resistor 135 to the other terminal of the operational amplifier 144. Variable resistor 138 and resistor 140 are employed to scale the voltage signal representative of current through the windings in accordance with the resistance of the motor windings, and thus, will vary in accordance with motor design. For small changes in motor size, the necessary scaling may be accomplished by adjusting the variable resistor 138, whereas, with large changes in motor size, the value of resistor 140 may be modified. As a result, the operational amplifier 136 senses the voltage drop imposed across the resistor 130, thereby sensing the total motor current to provide an output proportional to the current I in the stationary armature windings and also to the voltage lost in the motor due to its armature winding resistance R. This voltage drop may be characterized as the IR drop of the motor. The operational amplifier 144 determines the difference between the supply voltage $V_1$ and the output of the operational amplifier 136 to provide an output indicative of the motor's back emf (V-IR), which is an indication of the speed of the brushless DC motor.

The output of the operational amplifier 144 is applied through a fixed resistor 145 and a variable resistor 146 to a frequency circuit means or voltage-controlled oscillator formed essentially of an operational amplifier 148, a unijunction transistor 154 and a transistor 158. The output of the voltage-controlled oscillator is derived from the collector of the transistor 158 and is of a frequency proportional to the voltage input and therefore the speed of the brushless DC motor. In particular, the operational amplifier 148 acts as a current source for charging the capacitor 152 through the resistance 150. The capacitor 152 charges until the threshold level of the unijunction transistor 154 is reached, at which time the unijunction transistor 154 is rendered conductive in a forward direction, whereby the voltage stored upon the capacitor 152 discharges through the unijunction transistor 154 and a resistor 155. As shown in FIG. 16, the threshold voltage of the unijunction transistor 154 is set by the values of the resistors 153 and 155, which form in effect a voltage dividing circuit upon which is impressed a supply voltage $V_1$. As the discharge occurs through the resistor 155, the voltage developed thereacross and applied through resistor 156 to the base of transistor 158 rises until the transistor 158 is rendered conductive, thereby dropping the output taken from its collector toward ground potential. Thus, it can be seen that the output as derived from the collector of the transistor 158 is essentially a square wave form, varying at a frequency dependent upon the charging current to capacitor 152 and therefore the speed of the brushless DC motor.

Figure 17:
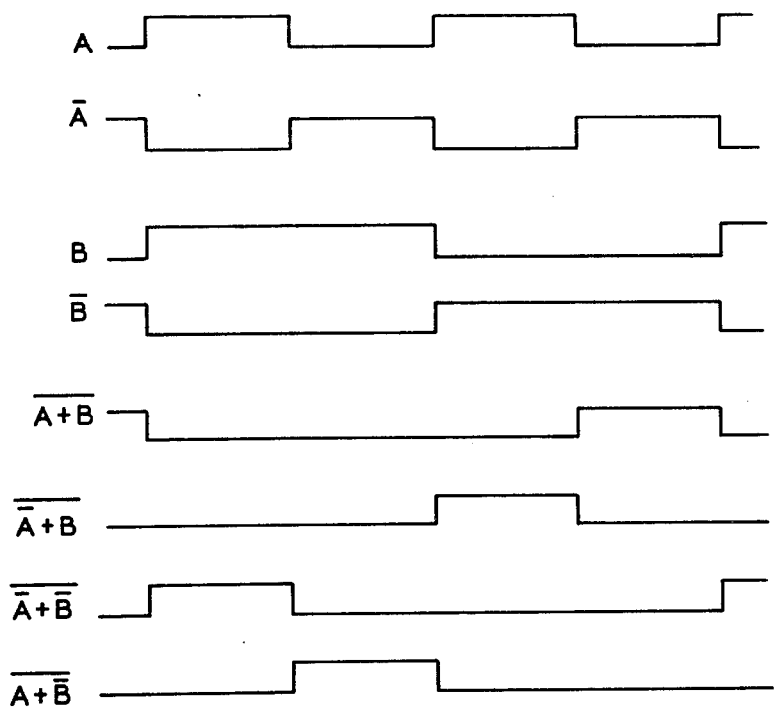
FIG. 17 illustrates the four output signals obtained from the circuit of FIG. 16 and their combination according to the logic circuitry illustrated in FIG. 6.

The output of the voltage-controlled oscillator is applied to an indexing means including a first flip-flop 160 whose outputs A and $\overline{A}$ are complementary square waves as illustrated in FIG. 17. In particular, the input signal of a frequency corresponding to the speed of rotor rotation is applied to the input of the flip-flop 160, which divides the frequency of the input signal by two to provide a train of square wave pulses. Further, the flip-flop 160 provides the complement signal $\overline{A}$ also shown in FIG. 17. The A output of the flip-flop 160 is applied to the input of second flip-flop 162 which also divides the frequency of the input by two to provide an output signal B and its complement $\overline{B}$ as shown in FIG. 17. The resulting square wave signals A, B, $\overline{A}$ and $\overline{B}$ indicate the speed of rotation of the motor and further simulate the angular position of the rotor shaft as it makes a complete revolution. More specifically, these signals are considered to simulate the rotor position in that as the rotor begins to rotate, it seeks its own position with respect to the energizing signals applied to the stator windings 22a, 22b, 22c and 22d. Though these aforementioned signals as derived from the flip-flops 160 and 162 do not precisely identify the rotor position in the same sense that the outputs of the sensors as described in the discussion of FIG. 8, these outputs occur sequentially during the rotation and effectively simulate the position of the rotor once the rotor has locked into the stator field.

It should also be noted in comparing FIGS. 8 and 17 that in the sensorless embodiment of FIGS. 16 and 17 the windings are no longer energized in alphabetical order. The simple expedient of physically interchanging a pair (such as a and d) of the winding connections at the output of the transistors 83 will correct this situation and give the proper alphabetical sequence of energization. Similarly the timing diagram of FIG. 17 has assumed the flip-flops 160 and 161 to be of a type wherein the leading edge of the A output of flip-flop 160 triggers the output of flip-flop 162 so that its B level is high or a 1. If flip-flop circuitry which triggers on a trailing edge of the A wave form is employed, the motor will run in a direction opposite that in which it runs when employing leading edge triggering flip-flops if the other connections are unchanged. Again, it should be remembered that the output of the flip-flops 160 and 162 may be processed and applied to the windings in the same manner as the A and B signals and their complements as illustrated in FIG. 6.

The start-up operation of an electronic commutating circuit disclosed herein will be explained with respect to FIGS. 16 and 17. Initially, the circuits are turned on by applying the supply voltage $V_1$ thereto. Initially, the rotor of the brushless DC motor is standing still; under this condition, the output of the voltage-controlled oscillator is set to generate an output of a frequency which, for example, corresponds to a rotor speed of approximately 60 rpm, such that as each of the stator windings 22a, 22b, 22c and 22d is sequentially energized, at least one of the stationary armature windings will produce a positive torque upon the rotor, thereby initiating its rotation. As rotation occurs, the rotor of the brushless DC motor will lock into the field of the armature. The voltage-to-frequency oscillator is programmed in that the initial output is not set to zero, but at a selected frequency; e.g., corresponding to a rotor shaft of 60 rpm ensuring that the motor is self-starting. The frequency of the output of the voltage-controlled oscillator will remain low until the rotor 10 has locked into the field of the stator windings. With regard to FIG. 16, the initial frequency of the output of the voltage-controlled oscillator is determined by setting the variable resistor 149 to a value such that the rotor 10 will lock into the stationary armature field. Thereafter, the speed of the rotor will increase until its running speed is obtained. The rate of frequency increase for a voltage input is determined by setting the variable resistor 135. Thus, the voltage-controlled oscillator is considered programmed in the sense that initially, the output is set to a frequency to ensure that the rotor will lock into the armature field and thereafter, that the speed of the rotor is brought up at a selected rate.

Not only are shaft position sensors eliminated by the embodiment illustrated in FIGS. 16 and 17, but further, since this embodiment operates basically on a square wave not illustrated in FIG. 17 but clearly having a repetition rate twice that of, for example, wave form A, square wave energization of a brushless or commutatorless direct current motor may take other forms. The square wave signal output from transistor 158 in FIG. 16 has a frequency proportional to rotor speed and in that particular embodiment for a two pole machine that frequency turns out to be double the rotor speed. Digital or computer control of a direct current motor now becomes feasible and the square wave employed according to the principles set forth in the discussion of the embodiment of FIGS. 16 and 17 may take other forms.

Figure 18:
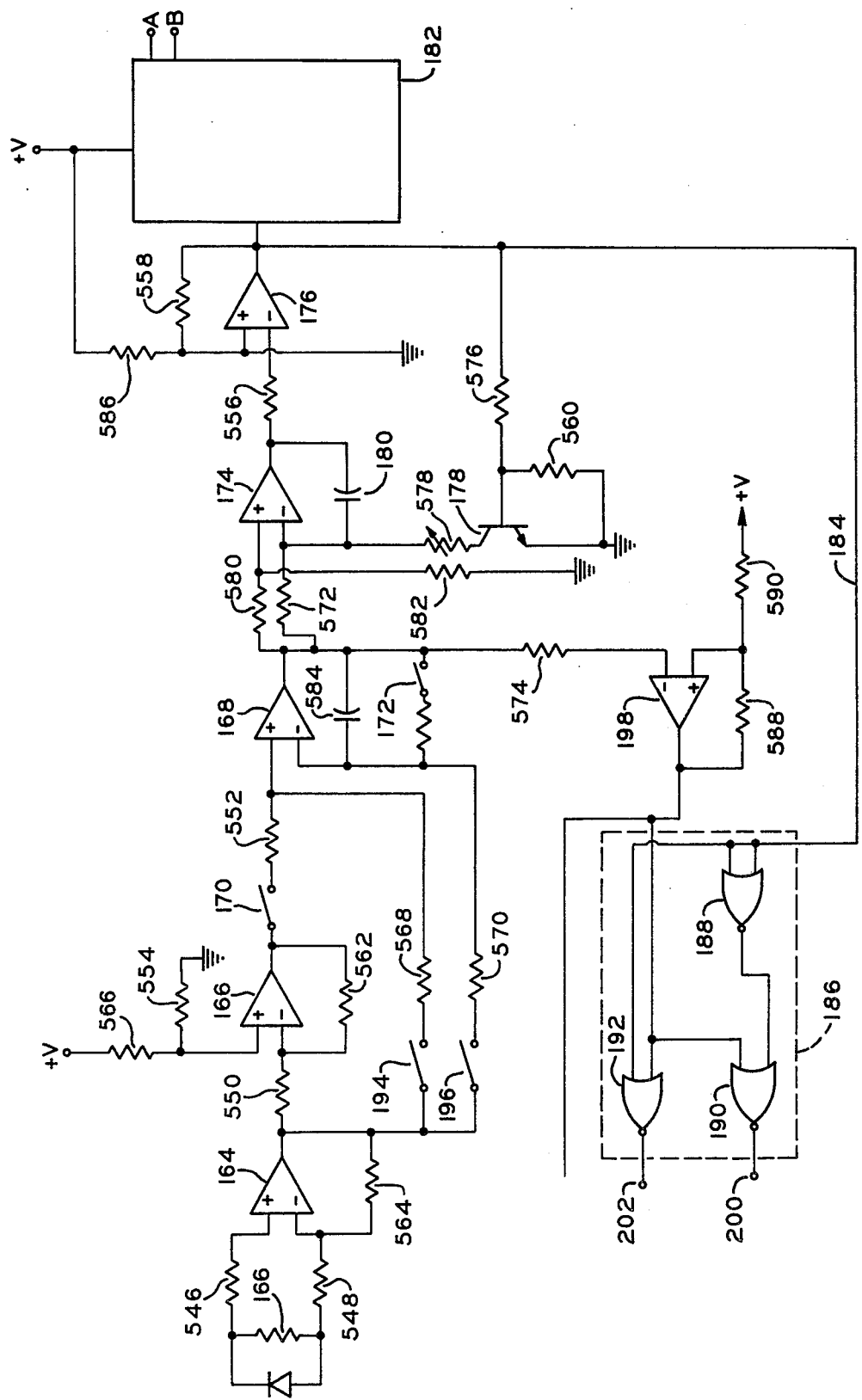
FIG. 18 is a schematic diagram of a motor control circuit analogous to that illustrated in FIG. 16 but selectively employing a control signal which is proportional to motor load.

FIG. 18 illustrates one such unique and useful variation wherein during start-up of the motor a signal proportional to motor speed is employed whereas during normal running operation of the motor a signal proportional to the motor load is employed.

In FIG. 18, signals which simulate the signals normally obtained earlier from shaft positioned sensors are obtained from a dual output flip-flop that is triggered by a frequency circuit means or a voltage-controlled oscillator. Voltage control for this oscillator is derived from a signal that during start-up is proportional to motor speed and that during running is proportional to the motor load. The flip-flop outputs are fed by way of inverters and also directly into signal conditioning circuits such as 80 of FIG. 6. Motor speed is adjusted according to load based on the need for the current flowing in any given winding of the motor to have an essentially square wave form which results in greater motor operating efficiency. Thus, the front and back halves of the wave form are individually sampled, integrated and compared. If they differ from each other, voltage to the voltage-controlled oscillator is changed depending upon this comparison between the leading and trailing half of the wave form and motor speed is accordingly slowed or increased.

In FIG. 18, an amplifier 164 senses the voltage drop across resistor 166 which like resistor 130 in FIG. 16 carries total motor current. In practice, such resistors as 166 and 130 would be quite small and may, for example, be of the order of a few hundredths of an ohm. The voltage drop signal across resistor 166 is scaled by resistors 546, 548, and 564 in accordance with the resistance of the motor winding, thus the resistance values of the scaling resistors will vary in accordance with motor design. Thus, output of amplifier 164 is proportional to the current in the motor and also proportional to the voltage lost to the motor due to its winding resistance. This amplifier output then is representative of the IR drop of the motor. A similar operational amplifier 166 receives the signal representative of the motor IR drop as one input and the applied voltage as the other input. As before then, the output of amplifier 166 is proportional to the term V-IR which output is an indication of the speed of the permanent magnet DC motor. This speed indicative signal provides one input to amplifier 168 so long as switch 170 is closed. The switch 170 is closed during start-up and until approximately two-thirds of the full load motor speed is obtained, at which time switch 170 is opened and the speed signal has no further effect on the performance of the system.

Switch 172 is ganged to close when switch 170 is closed and open when switch 170 is open. When these two switches are closed, amplifier 168 performs as an operational amplifier with output proportional to speed. When these two switches are open, amplifier 168 performs as a differential integrator with an output proportional to the load existing at the particular moment. The output of amplifier 168 is supplied to a voltage-controlled oscillator which oscillator includes amplifiers 174 and 176 along with the feedback circuits including transistor 178 and capacitor 180 and their related resistances. The output of the voltage-controlled oscillator from amplifier 176 is a square wave with frequency proportional to the voltage supplied as the output of amplifier 168. The output of the voltage-controlled oscillator is supplied to an indexing means including a flip-flop circuit 182 which is a type CD 4013 AE and provides A and B output square waves with the wave forms being substantially identical to the A and B wave forms illustrated in FIG. 17. A pair of simple NOR gates or invertors may be employed to obtain not A and not B wave forms and these four wave forms supplied as before to the A, B not A and not B lines of FIG. 6. The frequency of the A wave form is one-half that of the voltage-controlled oscillator while the B wave form has a frequency one-fourth that of the voltage-controlled oscillator.

The voltage-controlled oscillator output is also supplied by way of line 184 to a logic chip 186, for example, a CD 4001 AE which includes three NOR gates 188, 190, and 192.

Switches 170 and 172 are logic gates which are closed so long as the output from amplifier 198 is low indicating a relatively low motor speed and which open when the output from amplifier 198 raises indicating, for example, the motor is up to two-thirds of its running speed. The output from amplifier 198 is also supplied to logic chip 186 which, due to the presence of the inverting NOR gate 188 alternately closes switches 194 and 196 by way of control signals on lines 200 and 202 to alternately sample the front and back half of the current wave form signal as seen at the output of amplifier 164. The front and back half signals are supplied as the negative and positive inputs to amplifier 168 respectively which, as noted earlier, functions as a differential integrator with a long time constant and the output of amplifier 168 will increase when the tailing edge (switch 194 closed) is greater than the leading edge of the wave form while with switch 196 closed if the leading edge of the wave form is greater than the trailing edge, the output of amplifier 168 will decrease. Similarly, if the wave form output from amplifier 164 is approximately the desired square wave form, the output of amplifier 168 will remain constant.

From the circuits disclosed in FIGS. 16 and 18, it is apparent that further variations may be provided in accordance with the desired application. For example, the circuit of FIG. 18 is designed for a fixed advance angle for commutation of the motor windings with this angle being approximately 15 electrical degrees in the illustrated embodiment. However, with either a very light load or a very heavy load, it may be desirable to change the angle of advancement to maximize efficiency,. This may be accomplished by providing a bias signal at either of the two inputs of amplifier 168.

Further, it is believed that the disclosed circuitry may be employed for multiple stage motors with modification only being required in the logic circuitry producing wave forms A, B, $\overline{A}$, etc. For example, a six stage motor would require generation of six wave forms for sequentially switching the six windings associated with the six stages with each of these wave forms being fed to a signal conditioning circuit such as 80a of FIG. 6 which in turn causes actuation of the winding in the same manner as shown in FIG. 6. If the circuitry were employed within multi-stage motors, it is believed that it would be more desirable to not have overlapping "on" times between windings, especially in motors with four or more stages in order to properly sense the motor current being produced and relate the current to winding energization.

Still further, if a reversible motor is required, two sets of logic circuitry could be provided to generate the required switching sequence in the different directions of rotation with the sets being alternately connected or disconnected to the voltage-controlled oscillator output depending on the desired direction of rotation.

Further variations on the present invention should now be understood without too much difficulty. The schematic diagram of FIGS. 25a and 25b and the associated wave forms as depicted in FIG. 26 illustrate another approach to an electronically commutated direct current motor which does not employ rotor position sensors as such, but rather senses the back emf of an unenergized winding. Conversely, this may be the winding next to be enabled in the winding energizing sequence. This circuitry may be employed in conjunction with a two phase or two-stage, two pole motor with bifilar windings for each phase which motor lacks the position sensors but is otherwise quite similar to the motor depicted in FIG. 1. In addition, and importantly, this type of arrangement may be used with a three stage, four stage (and even higher) motor. Current from a battery or other direct current source is coupled from the plus V terminal to the individual motor windings by transistors such as 362 and 364 which are connected in a modified Darlington configuration with one such pair of each motor lead. Some grounding problems in the logic circuitry may be avoided in, for example, a vehicle battery powered refrigeration system if the plux V terminal is connected to the positive battery terminal and sequentially to each positive motor winding lead with all the negaive motor winding leads connected together and to the negative side of the source. Feedback diodes such as 366 as before provide a current path in one winding for energy stored in another winding at the time the current in that other winding is switched off. The capacitor 368 as before functions as a sink for this energy, for example, when the source is inadvertently opened or when the source is other than a battery. Each winding and transistor pair are enabled one-fourth of the time and a protection means such as diode 370 may be included to provide against inadvertent reverse polarity connections. In the illustrated arrangement, damage to the commutation circuit and motor is prevented since current flow through the diode 370 due to a reverse polarity situation will cause failure of the fuse 372. The direct current source plus V in addition to being coupled sequentially to the motor windings is applied to terminal 374 as an energy source for the output driver transistor such as 376 and to terminal 378 where it is processed by the zener diode filter network to provide at terminal 380 a regulated voltage $V_r$ of, for example, 8.2 volts for use as a voltage source to the logic packages and operational amplifiers.

The logic circuit in general functions to sequentially drive the power transistors such as 362 and 364 and to initiate the drive signal when the rotor mounted permanent magnets of the motor are optimally located with respect to the winding to be turned on. This optimal location or desired advance angle alpha ($\alpha$), (see FIG. 3 and attendant discussion) is derived from the back emf voltage of the winding next in the drive sequence.

Figure 25A:
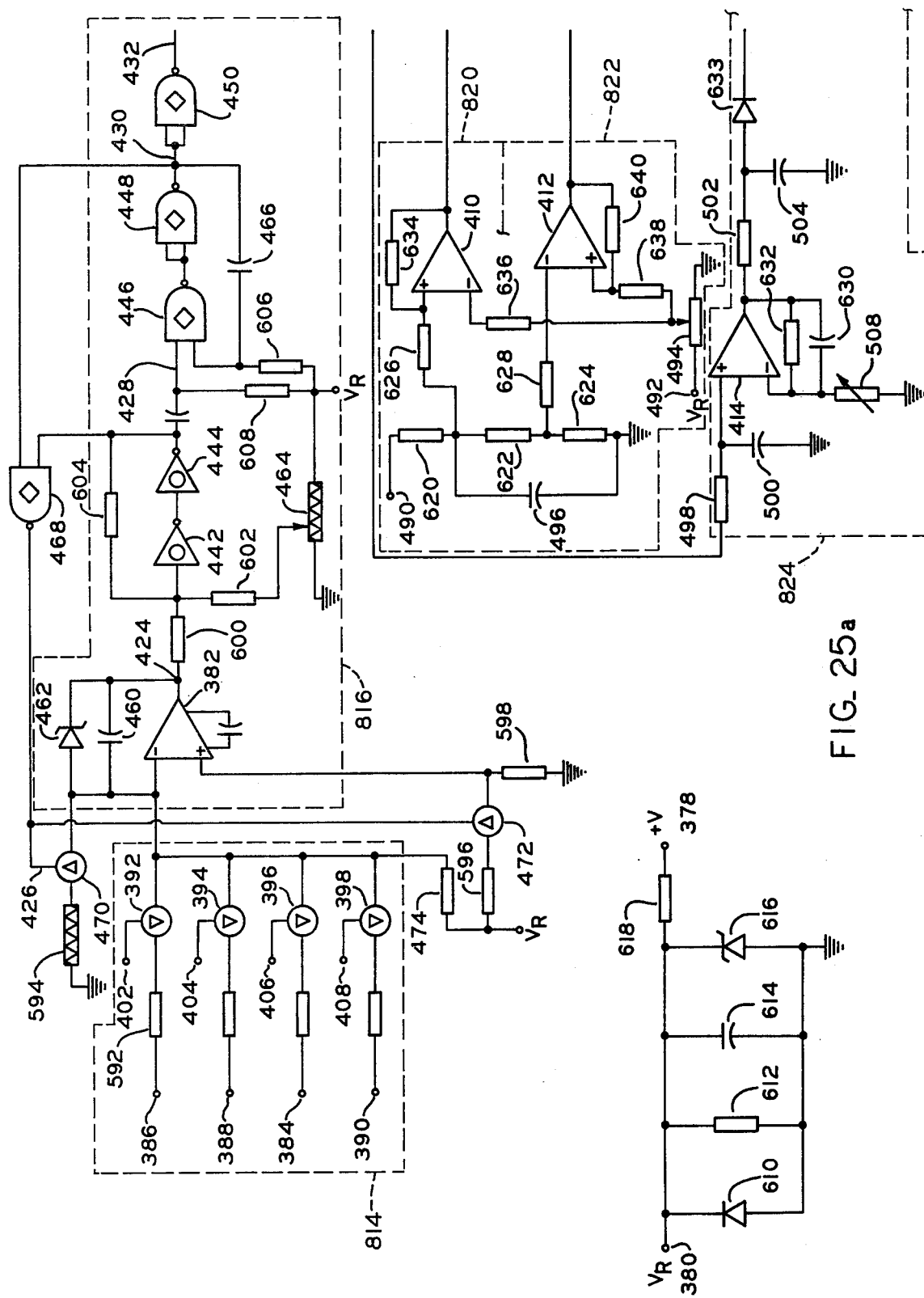
FIGS. 25a and 25b together form a detailed schematic diagram of a modified circuit for indirect rotor position sensing and control.
Figure 26:
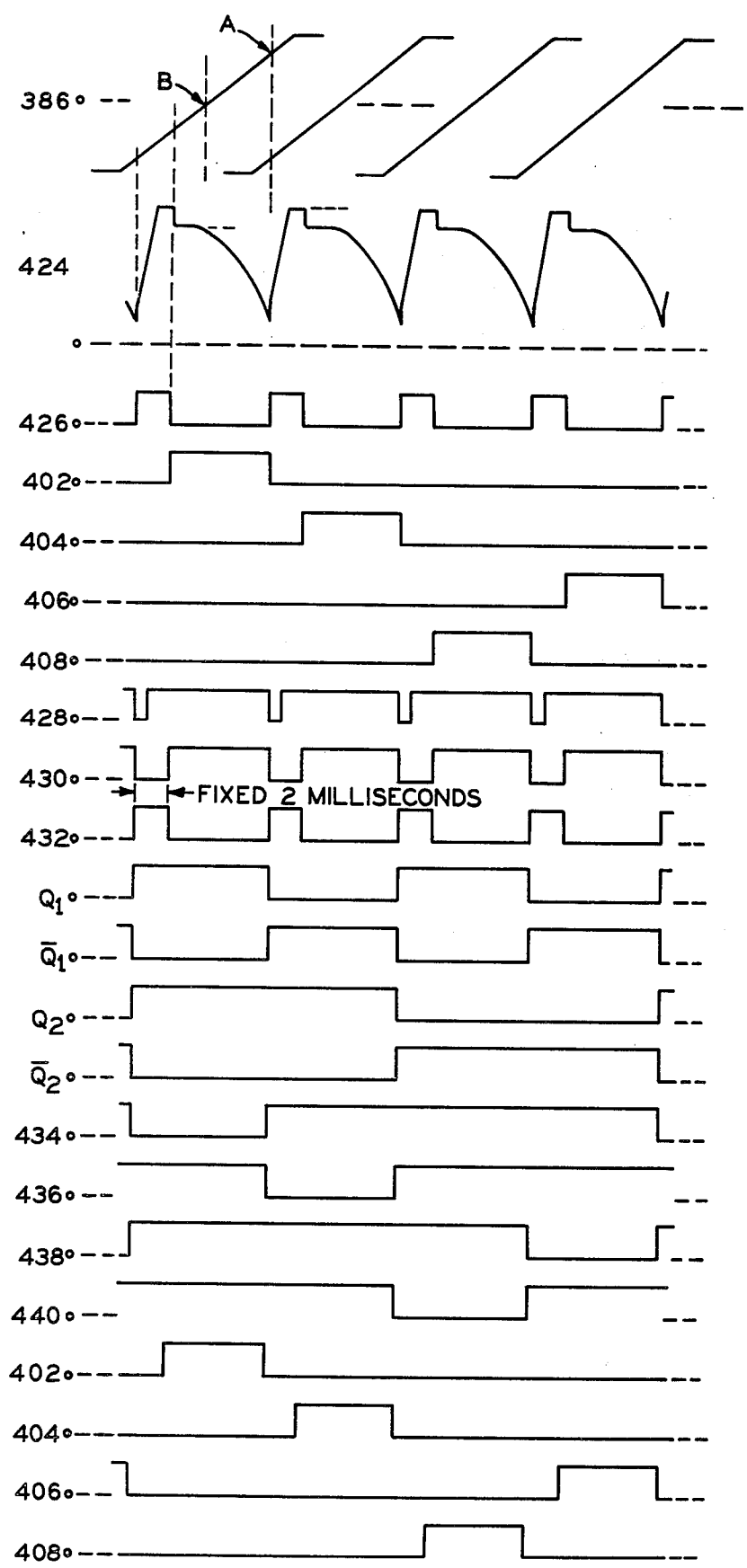
FIG. 26 illustrates various wave forms for the circuit of FIG. 25.

In operation, detector circuit 814 shown within dotted lines in FIG. 25a and connected to each of the windings selectively senses the emf voltage of a particular winding with such selection in this particular embodiment being the winding next to be energized. The detector circuit then transmits the sensed emf voltage of the particular winding to a position determining circuit 816 wherein the emf voltage is conditioned and employed to produce a simulated relative position output signal which simulates or is indicative of the relative position of the rotor and armature of the motor. In this particular embodiment, such simulated relative position output signal is in the form of pulses with the frequency or the time frame in which the pulses occur being indicative of the relative position of the rotor and armature. In order to select the winding next to be energized in accordance with the simulated relative position output signal, a circuit means 818 processes the incoming simulated position signal through an indexing or sequencing arrangement to produce an output signal for triggering energization of the particular winding. The simulated relative position output signal and the circuit means output signal also cause the detector circuit to select or switch to another winding for sensing the emf voltage which in this embodiment is the winding which is to be energized next in sequence. The emf voltage from this other winding is again conditioned and processed by the position determining circuit for obtaining the optimal location or desired advance angle for energization of the other winding whereupon, another simulated relative position output signal is produced and fed to the circuit means. The circuit means again indexes to cause the previously energized winding to be deenergized, to causes energization of he other winding and to cause the detector circuit to switch to still another winding. This operational procedure occurs continuously during motor operation with emf voltage of each winding being selectively sensed and employed to selectively energize each of the windings.

Figure 25B:
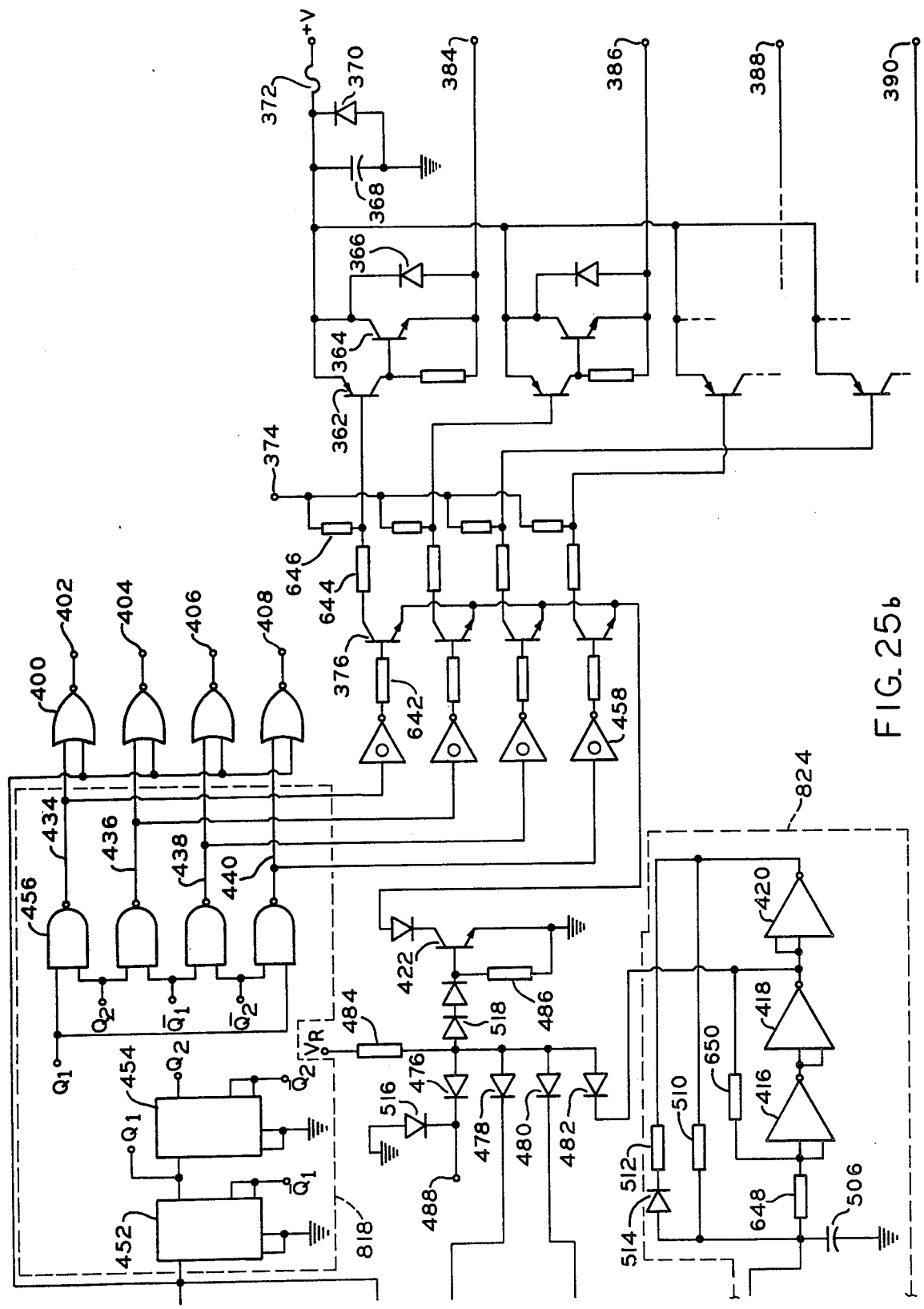

In somewhat more detail, the position determining circuit of FIG. 25a includes an operational amplifier 382 which functions to integrate this back emf voltage and when this integrated voltage reaches a reference level or a predetermined number of volt-seconds, a simulated relative position output signal is produced causing the succeeding logic parts of the circuit means to change state and to sequence or index to the next winding energizing event. In the process, the drive signal to the "on" transistor from drive transistors such as 376 is removed and redirected to the next Darlington pair or output transistor to be energized. In order to sense the emf voltage of the windings and thus, control their energization sequence, the motor leads 384, 386, 388 and 390 at the extreme right of the FIG. 25b are connected to like numbered terminals at the left-hand of the FIG. 25a for sequentially sampling the emf voltage of the windings by way of switches 392, 394, 396 and 398 of the detector circuit. These switches are sequentially enabled by NOR gates such as 400 having the simulated relative position signal and the circuit means output signals as inputs and which are interconnected with the switches by way of terminals 402, 404, 406 and 408. However, winding energization is precluded thereby preventing further motor operation if the motor supply voltage is outside a predetermined voltage range or the motor speed is below a predetermined minimum low speed. Undervoltage circuit 820 and overvoltage circuit 822 having the operational amplifiers 410 and 412 respectively, as their nucleus assure that the supply and voltage does not fall below a predetermined minimum value nor exceed a predetermined maximum value. An underspeed circuit 824 structured about the operational amplifier 414 and logic inverting gates 416, 418 and 420 assures that motor operation is above a predetermined minimum speed. These circuits, in the event of a fault, that is, a violation of the above-mentioned predetermined limits, cause transistor 422 to go non-conducting thereby preventing any enabling current flow in the output driver transistors such as 376 and hence no winding energizing current through the output transistors such as 362 and 364.

In order to produce the output signal indicative of the relative position of the rotor and armature when the operational amplifier 382 has integrated the emf voltage to a predetermined reference level, the position determining circuit is provided with inverting gates 442 and 444 which are coupled together with feedback to form a Schmitt trigger circuit and interconnected with NAND gates 446 and 448 which are themselves connected together to form a one shot multivibrator. The output of the one shot multivibrator passes through an inverting NAND gate 450 and into a pair of flip-flops 452 and 454 to provide the Q1 and Q2 signals along with their complements to be logically combined by a first decoder comprising four NAND gates such as 456 and a second decoder comprising four NOR gates such as 400. The NAND gates may be of a CD 4011 type while the NOR gates may be of a CD 4001 type. The concatenated invertors 416 and 418 which form the Schmitt trigger circuit may similarly be type CD 4001 while invertors such as 458 may be a type CD 4049.

The wave forms of FIG. 26 illustrate the steady state or running mode of the circuitry of FIGS. 25a and 25b with corresponding reference numerals to the right of the wave form identifying the line in the schematic diagram where that wave form occurs. Somewhat idealized back emfs of the motor winding are shown at the top of FIG. 26 and the object of the circuit will be to commutate with a predetermined amount of advancement, i.e., to switch from one winding to the next when the rotor magnet is within ten to fifteen electrical degrees of fully coupling the winding to be turned on. This is shown as time or point A in FIG. 26. This triggering point is determined by integrating the back emf in the amplfier 382 beginning at point B which is the zero back emf point or zero crossing point. The voltage is integrated for a period of time and is a measure of the flux change rather than a function of the motor speed. When this integration is completed and the triggering point A achieved, the Schmitt trigger output 428 is acutated. This integration interval between points B and A is preceded by a two milli-second reset period in this embodiment during which capacitor 460 charges back to the reference voltage of, for example, 6.8 volts as determined by the zener diode 462. Integration is also preceded by another period of a duration determined by the motor speed and physically that time interval during which the back emf is negative. The zener diode functions to prevent integration of the negative emf voltage so that the integration interval starts at the zero crossing point of the emf voltage or point B as illustrated in FIG. 26. The triggering point for the Schmitt trigger circuit is adjustable by potentiometer 464.

Integration from point B or the zero crossing point aids initial starting of the motor and assures accurate control of the advance angle of commutation independent of the speed of rotation of the rotor. Initial starting is aided in that a reverse motor direction causes an emf voltage of a relatively large positive polarity; thus, integration is quickly completed causing a fast switching to a next winding in the desired sequence. This switching in the desired sequence causes the windings to produce a rotating magnetic field in the desired direction for proper rotation. This integration and rapid switching continues until the motor is rotating in the proper direction and being commutated at the proper time. Further, because negative emf voltages are ignored, integration does not begin simultaneous with the switching of the detector circuit. Therefore, if a fixed delay is required for suppressing noise and switching transients and/or resetting the integration circuit, this delay will occur when the emf is negative, and thus, would not cause variance of the advance angle with the speed of the motor.

The Schmitt trigger output actuates the one-shot multivibrator which provides an output change for a two milli-second interval as determined by the specific value of capacitor 466. This output change activates a means provided to reset the emf voltage integrator. In the illustrated arrangement, the resetting means NAND gate 468 and switches 470 and 472 with the NAND gate 468 being responsive to the output of the multivibrator for turning on switches 470 and 472 to reset the operational amplifier 382. The one-shot output is also inverted in NAND gate 450 to produce the simulated relative position output signal which is further processed by the flip-flops 452 and 454 to produce signals suitable for sequentially turning on the Darlington power transistors. NAND gate 468 also assists motor starting since when the motor and circuit are first energized, capacitor 450 is discharged and the one-shot multivibrator has a high output on line 430 and would normally remain with that high output until capacitor 450 is charged and an integration cycle completed. The Schmitt trigger, however, has its output initially low and that output remains low long enough for a high output from the NAND gate 468 to turn on switches 470 and 472 to reset or charge capacitor 460.

After the capacitor 460 is reset or charged, the position determining circuit is ready to accept emf voltage signals from the detector circuit. In order to sequentially select the windings to be sensed, NOR gates such as 400 are provided to actuate the electronic switches such as 392 for sequentially gating the back emf voltages from the windings to the operational amplfifier 482. However, as mentioned previously, this sequential gating is held off for a two milli-second interval as illustrated in the wave forms identified as 402, 404, 406 and 408, in order to allow capacitor 460 to recharge.

At the starting of the motor, the back emf voltage sensed by the detector circuit may be zero and thus, voltage-time integration in the operational amplifier of the position determining circuit might not take place except for the presence of a means for aiding starting which generates a characteristic signal that is associated with an emf condition of the motor at low motor speed which is substantially less in magnitude than the emf voltage produced by the motor at its full operating speed. In the illustrated arrangement, the starting aid comprises a bias voltage produced across resistor 474 which simulates a low speed back emf signal and assures a continuous cycling of the closed loop operational amplifier (Schmitt trigger) one-shot system. In the particular arrangement shown, the resistor 474 was selected to produce a bias voltage to cause cycling to take place at a rate equivalent to 400 revolutions per minute for the motor with the remaining circuitry responding accordingly to sequence the motor windings in the desired direction of rotation. The resistance value of resistor 474 and in turn the bias voltage to aid starting may vary depending on the torque and the inertia which must be overcome by the motor at start in order to produce rotation of its rotor. For example, a low bias voltage is preferred when the inertia is high; thus, the motor is started slowly and the emf voltage thereby produced will not be masked by the low voltage bias. A somewhat higher bias voltage may be employed when the inertia is low, thereby reducing current in the power transistors by providing faster sequencing to the next winding to be energized. The bias voltage would not be required if another means were provided to assure initial rotation of the rotor. For example, if the motor were to be applied in a chain or cascade arrangement with it being the second or subsequent motor in the arrangement, initial rotation would always be assured, thus eliminating the need for any further aid in starting. Once the rotor is turning, the back emf signals predominate and the motor continues operation as described. In the event that the rotor starts rotating in the wrong direction, continued erroneous rotation or oscillation is prevented since, as previously discussed, the back emf signal causes integration to take place very rapidly and the next winding in the proper direction of rotation is promptly switched on.

It should now be appreciated that I have described one way of measuring the flux change and used the signal so derived to control commutation at a described amount of advance. However, circuits using devices other than an integrator may accomplish this same purpose or function. For example, a voltage-controlled oscillator and a counter may be employed to measure the flux change over a predetermined interval with the oscillator being responsive to the positive emf voltage signal from the detector circuit to produce output pulses at a frequency proportional to emf voltage. These pulses could in turn be counted by a counter until a predetermined number is accumulated which is representative of a predetermined number of volt-seconds; whereupon, the counter produces an output signal to index or sequence the flip-flops 452 and 454 to produce signals suitable for sequentially turning on the Darlington power transistor. After producing its output signal, the counter would automatically reset in order to be ready to repeat the counting process for the next winding to be sensed. As an aid in starting, the oscillator could be set to generate output pulses at a frequency corresponding to a predetermined minimum rotor speed as was provided with the oscillators employed in the circuits shown in FIGS. 16 and 18. The above-described approach would not only eliminate the integrator but would also eliminate the need for the Schmitt trigger, the multivibrator and the reset portion of the circuit wherein capacitor 460 is charged to an initial value.

A still another approach employing a computer or micro-processor may be employed to measure flux change by sampling the emf voltage at predetermined intervals, for example one milli-second, and accumulating a total until a predetermined total of volt-seconds is reached; whereupon, an output signal may be generated to index or sequence the flip-flops 452 and 454 to produce signals suitable for sequentially turning on the Darlington power transistors. Still further, the computer or micro-processor could also be programmed to perform the decoding process so that output signals could be generated to directly turn on the power transistors for sequentially energizing the motor windings.

Although in the above-described embodiments, Darlington power transistor arrangements have been employed to perform the power switching of the windings, persons skilled in the art will recognize that alternate modes of switching may be employed. For example, silicon-controlled rectifiers (SCRs) or thyristors may be used with an arrangement being provided to reset the SCR or thyristor controlling energization of a particular winding when the circuit means generates an output signal to energize a next winding in the energizing sequence. Still further, in certain limited applications, relays may be employed to switch power to the windings.

As noted previously, winding energization is precluded thereby preventing further motor operation if the motor supply voltage is outside a predetermined voltage range or the motor speed is below a predetermined minimum value of low speed. It was also noted that transistors such as 376 will respond to high signals sequentially generated by gates such as 458 only if transistor 422 is conducting. However this transistor 422 will conduct so long as the cathodes of diodes 476, 478, 480 and 482 are all at the $V_r$ reference voltage and the current flow through resistor 484 is essentially the sum of the base to emitter current in transistor 422 plus the current flow in resistor 486. Grounding or lowering the potential on terminal 488 would disable transistor 422 while on the other hand raising that voltage to the $V_r$ reference level or above will, under normal conditions, allow transistor 422 to conduct. Similarly, if the output of operational amplifiers 410 and 412 of the undervoltage circuit and overvoltage circuit, respectively, is low, transistor 422 will normally conduct. Both operational amplifiers 410 and 412 function to compare the battery voltage V as applied at terminal 490 to the zener regulated reference voltage as applied at terminal 492, however, the reference voltage is applied to the negative terminal of amplifier 410 of the undervoltage circuit and therefore that amplifier output will be low so long as the fraction of the battery voltage applied to its negative terminal is greater than the fraction of the reference voltage, as determined by the setting of potentiometer 494, which is applied to its positive terminal. Thus, operational amplifier 410 has a high output so long as, for example, the battery voltage is above 10.5 volts and functions as an undervoltage or low voltage detector. Similarly, operational amplifier 412 is set by the appropriate choice of voltage dividing resistors to have a high output so long as battery voltage is below, for example, 16 volts and this operational amplifier functions as an overvoltage or high voltage detector. The capacitor 496 is present to filter transients and erratic wave forms from a battery charging device to prevent false indications of under or overvoltage.

Numerous further control functions may be implemented employing the electronically commutated motor control circuit of FIGS. 25a and 25b by hanging additional diodes to the base of the transistor 422 to divert that transistor's enabling current when the diode is biased to conduct thereby disabling transistors 376 and therefore also the winding enabling transistor pairs. For example, the underspeed circuitry illustrated in FIGS. 25a and 25b and connected to diode 482 will function to disconnect the windings when for some reason the motor is running at an inordinately slow speed. The output of gate 450 is a rectangular wave which varies with motor speed and which is on about one-half of the time at normal running speed. In this particular embodiment, the running speed was approximately 3600 rpm and the output of gate 450 was approximately a 240 hertz rectangular wave. This signal is filtered by resistor 498 and capacitor 500 and thereafter amplified by amplifier 414 to be again filtered by the resistor 502 and capacitor 504. The resulting direct current voltage which is substantially proportional to speed is stored as a voltage on capacitor 506 and, so long as that voltage is at or above the level representative of a predetermined minimum speed, for example 2500 revolutions per minute in the illustrated arrangement, the output of the Schmitt trigger comprising amplifiers 416 and 418 remains high. Calibration of this voltage or this minimum speed level may be achieved by changing poentiometer 508. If the motor speed becomes too low, the Schmitt trigger circuit changes to its low state allowing current flow through diode 482 and simultaneously providing a high output from the amplifier 420 to charge capacitor 506. The time constant for capacitor 506 and resistor 510 along with the hysteresis of the Schmitt trigger circuit 416, 418 determines a reset time for the circuit and several minutes such as 4 to 5 may be involved.

At initial start-up of the motor, this same 4 to 5 minutes must elapse before the start can occur. The capacitor 504 will typically retain its charge sufficiently long for normal on-off duty cycle functioning of, for example a refrigerator motor, however, if a restart is made and the exemplary 2500 revolution per minute speed is not achieved within say three to five seconds, the time constant of capacitor 506 and resistor 512, the start will be aborted and the five minute delay for recharging capacitor 506 initiated prior to a restart attempt. The relatively long charging time for capacitor 506 and comparitively short discharge time is of course due to the presence of diode 514 and the substantially lower resistance of resistor 512 as compared to resistor 510.

In the exemplary vehicle refrigeration environment, a condensor cooling fan would typically be coupled across diode 516 and that diode would function to conduct energy stored in the inductance of the fan motor. In other environments without such a fan motor a resistance would be substituted for the diode 516. Diodes 518 are included to give an additional small voltage drop to the base of transistor 422 since, in practice, the low outputs of amplifiers such as 410 and 412, may not be exactly zero.

Figure 27:
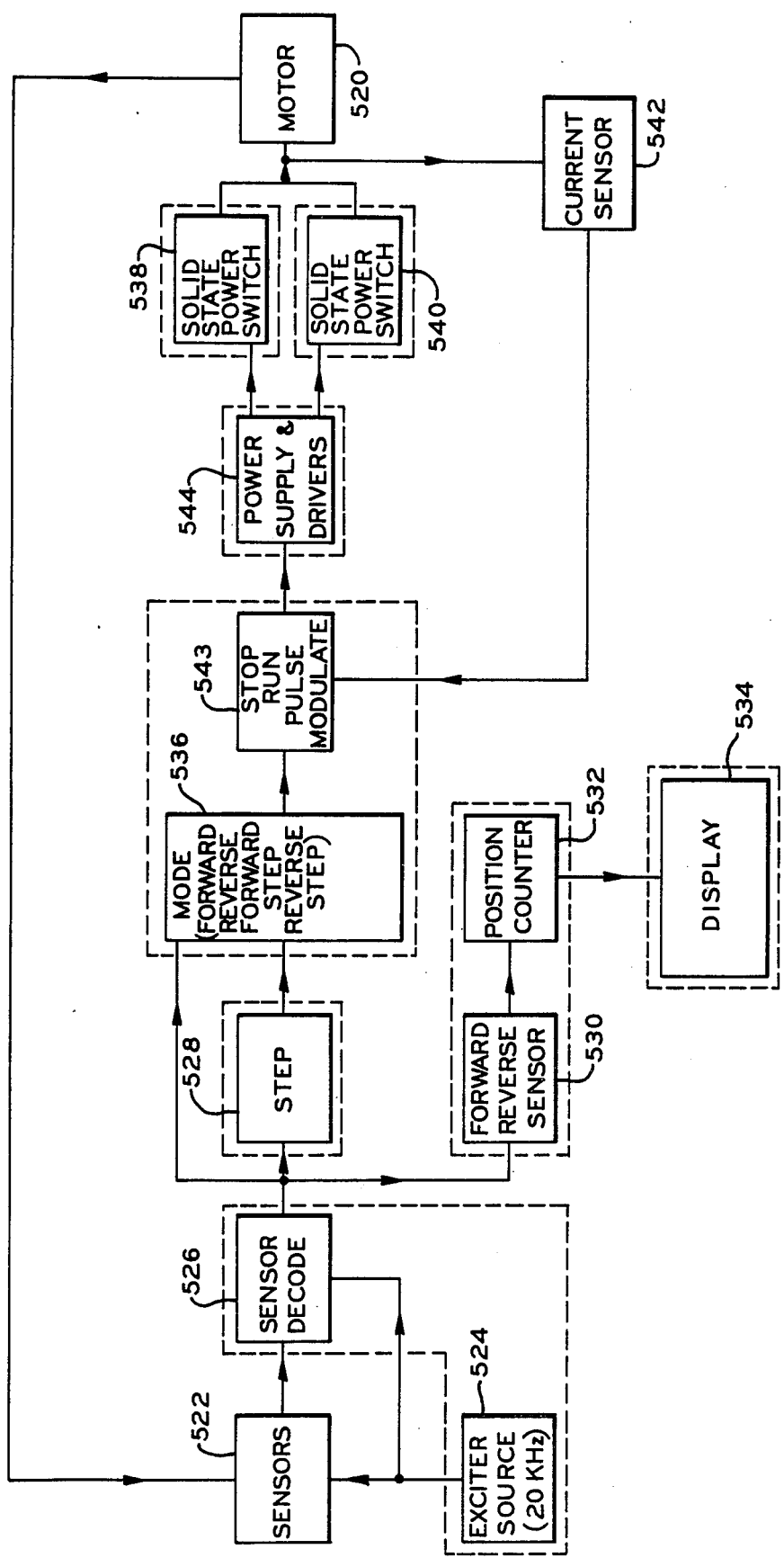
FIG. 27 is a block diagram of a control circuit for precise rotor positioning.

As noted earlier, the fact that the brushless direct current motor of the present invention may be enabled by reactangular wave forms which are processed by logic circuitry makes possible a number of motor control embodiments employing digital control techniques. One particularly unique digital application of the electronically commutated motor of the present invention is illustrated in FIG. 27 and may be employed, for example, for moving and precisely positioning a linearly movable element. The brushless direct current motor 520 has rotor position sensors 522 and in this environment a six pole machine employing GECOR (cobalt samarium) permanent magnets was employed to meet the low operating speed and size constraints. Also, in this particular embodiment, electro-magnetic sensors are employed and the 20 kilohertz exciter source provides a signal for these sensor signal exciter coils. In the linearly movable element environment, the motor 520 by way of a screw shaft drives the element and accurate control of the motor results in accurate positioning of the element. Use of the direct current motor of the present invention has many advantages over the conventional approach to linearly moving elements in that typical gear boxes and stopping brakes as well as safety clutches are eliminated and the locking torque of the motor may serve as a holding brake. Further, the system is uniquely suited to battery operation and is easily controlled by a process computer for forward, reverse, stepping or braking commands.

These sensors 522 are of course physically located with the motor 520 and stationary exciter and pick-up coils are sequentially coupled and decoupled from each other by a rotating segmented disc or shutter supported on the motor rotor shaft. The exciter coils are energized by the 20 kilohertz exciter source 524 and the pick-up coil signals processed in the decoder 526 to produce uniform rectangular voltage wave forms for subsequent processing. The output of the sensor decoding circuitry 526 is supplied to stepping logic circuitry 528, counter logic circuitry including the forward-reverse sensor logic 530 and a position counter 532, the contents of which may be digitally displayed employing typical seven segment display units in the display panel 534. The logic circuit 528 is provided with logic circuitry which inhibits normal commutation of a next winding in the energization sequence, thus causing continued energization of the same winding until the rotor proceeds to a position where the torque per ampere output is zero. The rotor remains in this position until a signal is supplied to cause commutation of the next winding in the energization sequence which causes another step in the same manner. The output of the sensor decoding circuit 526 is also supplied to mode control circuitry 536 which sorts out forward, reverse, forward step, and other commands and relates those commands to the sensor signals to compile that information in four logic gates. There is one such gate for each of the four transistor power switches and at any given time only one of those gates will have a high output. These outputs are modified in another set of gates which accept the run and stop commands as well as current limiting information. Current limiting is carried out as a pulse width modulation process and the output of these last gates is amplified in two stages of transistor drivers which in turn supply base current to the transistor power switches 538 and 540. Motor current may be sensed at 542 and if that current is excessive, gates in the pulse modulating circuitry 544 are inhibited for a short time period, such as 500 micro-seconds to inhibit the power supply and driver circuitry 544 for a like time period allowing the motor current to decay somewhat. Of course, by limiting current to a maximum value, the torque output of the motor which is a function of the current is also limited or controlled to a maximum value with the above-described arrangement. Torque control may be desirable under certain circumstances to protect the mechanical system driven by motor.

It will now be apparent that I have shown and described different embodiments of my invention, in preferred forms thereof. At the present time, the half-bridge connection arrangement utilizing bifilar windings in the two winding motors and monofilar in multiple winding motors is believed to be the better mode as compared to a monofilar/full-bridge circuit arrangement.

This is because less transistors are required for the half-bridge approach and therefore less expense is involved even though less efficient utilization of winding material (e.g., copper or aluminum) results. On the other hand, if and when the relative expense of transistors and winding material changes in favor of solid state devices, the monofilar/full-bridge circuit would be preferred.

When either approach is followed, it is definitely preferably to provide energy storage means (e.g., as described hereinabove) in order not only to protect the output transistors but to improve the efficiency of energy utilization.

When either approach is used, methods embodying other aspects of my invention may be practiced, of course. For purposes of summary, such methods relate of course to the manufacture of brushless DC motors (whether or not they are of the electronically commutated variety), and include: the selection of AC induction motor types of cores; the development of distributed windings in slots of such cores by means of available AC induction motor equipment to form wound stator assemblies; and the assembly of such wound stator assemblies with permanent magnet rotor assemblies.

The winding turns may be wound and established (concurrently or sequentially) in coil receiving means and then axially inserted into the axially extending core slots (either directly from the coil receiving means or from an axial inserting means to which the winding turns are transferred from the coil receiving means).

It should be recognized that the methods just briefly summarized represent a departure from the art of making DC motors of which I am aware. For example, prior techniques have involved the formation of what are known as "ring" windings (e.g., wave or lap windings) which are disposed on a conventional DC dynamoelectric machine core.

Further, there has been shown and described a simplified circuit for commutating the energizing signals applied to a brushless DC motor. More specifically, the circuitry of this invention does not require a mechanical sensor assembly coupled to the rotor of the brushless DC motor; instead, the output of the motor is sensed and is used to generate a varying signal of a frequency corresponding to the rotational velocity and indicating the position of the rotor. Thus, in certain applications such as for use with a brushless DC motor for driving a refrigeration compressor, the compressor shell does not require additional through leads, thereby improving the hermetic seal of the shell.

To better reveal the improved characteristics of motors embodying the invention, the data of Table I is presented.

TABLE I

| Advance, alpha in Electrical Degrees | Data taken at 2600 rpm | | | |
|---|---|---|---|---|
| | Torque, Total | Oz. Ft. Net | Efficiency Total* | % Net** |
| 0 | 1.15 | .95 | 73.7 | 60.9 |
| 6 | 1.20 | 1.00 | 78.2 | 65.2 |
| 15 | 1.50 | 1.30 | 81.2 | 70.4 |
| 22 | 1.60 | 1.35 | 77.7 | 65.6 |

*without regard to windage and friction losses
**including windage and friction loss The data of Table I was obtained by testing one motor that embodies the present invention and that was operated from a 12 volt DC supply.

The motor utilized a standard stator lamination design that is used commercially in induction motor applications. The lamination was substantially identical to the lamination shown in FIG. 2. The bore of the core was about two inches with a stack height of about two inches. The core had 24 slots, and carried distributed copper magnet wire winding side turn portions that were bifilar wound. Eight winding coil groups total (four bifilar coil groups) were used. Each coil group included three coils and each coil comprised from outermost coil to innermost coil respectively: 7, 10, and 10 turns. The wire was about 0.05 inch diameter (uninsulated) copper wire. The coils of each coil group spanned, from outer to inner coils respectively, 11, 9, 7 teeth respectively. Thus, the "spread" of an associated pair of coil groups was six slots or 90 mechanical degrees. It thus will be understood that eight slots contained 14 conductors (seven bifilar conductor pairs), while the rest of the slots had 20 conductors each.

The rotor magnets were formed of ferrite magnet material from Allen Bradley Company and designated as M-7 material. The arc length of each of the two magnets used was 143 mechanical degrees; the thickness was about 0.25 inches; and the axial length was about two inches. The magnets were epoxy bonded to a solid, soft iron rotor core and the assembled rotor had an outer diameter of about 1.98 inches. Commutation and sensing was accomplished with circuits substantially identical to those shown herein. The actual circuit components (i.e., transistors, resistors, capacitors, etc.) were commonly available types and were selected to have only sufficient voltage and current ratings and gain to supply up to 30 amperes to the motor windings. The motor was commutated with from zero to twenty-two electrical degree advance. Since the motor was a two-pole motor, electrical degrees were of course equal to mechanical degrees.

In Table I, two efficiency and torque columns are recorded. The total torque represented the torque produced by the motor without regard to windage and friction losses. The first "efficiency" column also was the efficiency of the motor without regard to windage and friction losses, although copper and commutator circuit losses were allowed for. Net torque was the net torque available at the shaft of the motor, and net efficiency was the overall efficiency of the motor system including the commutator. The significant reduction in net efficiency (due to windage and bearing losses) was expectable because the motor tested was only about 1/20 horsepower.

Table I does show the significant improvement in efficiency and torque that is attainable by advancement of commutation. Thus, a 15 electrical degree advance would provide significantly more maximum efficiency at 2600 rpm; whereas an advance of 22 degrees would provide significantly greater maximum torque at 2600 rpm.

TABLE II

Representative component values or element identification for the foregoing circuits.

| Reference No. | Component |
|---|---|
| FIGS. 6 and 7 | |
| 70', 80 | CD 4001 AE |
| 43, 44 | H 13 A2 |
| 71, 72 | 390 K |
| 74 | 1.8 K |
| 92 | 39 OHM 2W |
| 93 | 200 MFD 300V |
| 94 | 100 MFD |
| 95 | 15V |
| 81 | 2N 4401 |
| 82 | 2N 5988 |
| 83 | 2N 6258 |
| 84 | 10 K |

TABLE II-continued

Representative component values or element identification for the foregoing circuits.

| Reference No. | Component |
|---|---|
| 86 | 150 OHM |
| 88 | A 15 |
| 91 | 500 or 1000 MFD |
| FIG. 16 | |
| 130 | .02 OHM |
| 132, 133, 140, 736, 145, 740 | 100 K |
| 134 | 120 K |
| 135, 734, 149 | 50 K |
| 138 | 3.5 MEGOHM |
| 146 | 1 MEGOHM |
| 738 | 82 K |
| 150 | 2.2 K |
| 153 | 1 K |
| 155 | 47 OHM |
| 156 | 120 K |
| 742 | 33 K |
| 136, 144, 148 | MC 3301 P |
| 160, 162 | CD 4013 AE |
| 158 | 2N 3414 |
| 154 | 2N 1671 |
| FIG. 18 | |
| 186, 170, 172, 194, 196 | CD 4016 AE |
| 182 | CD 4013 AE |
| 164, 166, 174, 176 | LM 324 |
| 168, 198 | LM 3900 |
| 166 | .02 OHM |
| 546, 548, 550, 552, 554, 556, 558, 560, 562 | 10 K |
| 564 | 120 K |
| 566 | 4.7 K |
| 568, 570, 572, 574, 576, 578 | 100 K |
| 580, 582 | 150 K |
| 584 | 1 MFD |
| 180 | .01 MFD |
| 586 | 22 K |
| 588 | 1 MEGOHM |
| 590 | 270 K |
| FIG. 19 | |
| 204 | Two parallel .10 OHM 2W |
| 208 | 10 V |
| 702 | 1.2 MEGOHM |
| 704, 706 | 100 K |
| 214 | Series 100 K & 200 K Variable |
| 708, 710 | 1 MEGOHM |
| 210 | MC 3301 P |
| 712 | 82 K |
| 222 | 390 MFD |
| 714, 716 | 47 K |
| 220 | .01 MFD |
| 718 | 3.9 MEGOHM |
| 218 | Series 33 K & 500 K Variable |
| 224 | 1N914 |
| FIGS. 21 and 22 | |
| 246 | H13 A2 |
| 652, 654 | 39 K |
| 656, 660, 670 | 1 K |
| 658 | 560 OHM |
| 256, 258, 260, 262, 290 | CD 4001 |
| 264, 266, 268, 270 | CD 4001 |
| 272, 286 | 2N 4401 |
| 662 | 47 OHM 2W |
| 664 | 5000 MFD |
| 666, 678 | 10 K |
| 668 | 10 OHM 10W |
| 672 | 100 OHM |
| 674, 676 | .03 OHM |
| 284 | A 115 |
| 294, 680, 682 | .001 MFD |
| 292 | 100 K |
| 296 | 1N914 |
| 298 | 33 K |
| 288, 302, 304 | MC 3401 |
| 308 | 2N3414 and D44H5 |
| 312 | A 15 |
| 684, 686 | 22 K |
| 688, 691 | 1 MEGOHM |
| 690 | 2.2 MEGOHM |
| 692, 694 | 100 K |
| 696, 700 | 1 MFD |
| 698 | 27 K |
| FIG. 24 | |
| 720, 722 | 8.2 K |
| 356 | 2.2 K |
| 350 | 2N 3414 |
| 724, 726, 728 | 10 K |
| 730, 732 | 82 OHM |
| FIGS. 25a and 25b | |
| 592 | 10 K |
| 594 | 680 OHM |
| 474 | 5.6 MEGOHM |
| 596 | 150 K |
| 598 | 10 K |
| 462 | 1N4736 6.8V |
| 460 | .1 MFD |
| 382 | CA 3130 |
| 600, 602 | 10 K |
| 464 | 100 K |
| 604 | 1 MEGOHM |
| 606 | 150 K |
| 608 | 33 K |
| 446, 448 | CD 4011 |
| 466 | .01 MFD |
| 610 | 1N5059 |
| 612 | 10 K |
| 614 | 25 MFD 25V |
| 616 | 1N4738 8.2V |
| 618 | 120 OHM 1W |
| 620 | 33 K |
| 622 | 6.8 K |
| 624 | 12 K |
| 626, 628, 508, 636, 638 | 100 K |
| 494 | 20 K |
| 498, 632 | 33 K |
| 500, 504 | .5 MFD |
| 630 | .1 MFD |
| 410, 412, 414 | LM 324 |
| 502 | 15 K |
| 633 | 1N4448 |
| 634 | 1.8 MEGOHM |
| 640 | 4.7 MEGOHM |
| 452, 454 | CD 4013 |
| 456 | CD 4011 |
| 400 | CD 4001 |
| 458 | CD 4049 |
| 642 | 2.7 K |
| 644 | 100 OHM 2W |
| 646 | 100 OHM |
| 376 | 2N3414 |
| 362 | 2N5988 |
| 364 | 2N6258 |
| 366 | 1N5059 |
| 368 | 1000 MFD 25V |
| 370 | MR 751 |
| 480, 514 | 1N4448 |
| 484 | 6.8 K |
| 486 | 2.7 K |
| 648 | 1.5 MEGOHM |
| 650 | 4.7 MEGOHM |
| 510 | 2.2 MEGOHM |
| 512 | 68 K |
| 416, 418 | CD 4001 |
| 506 | 50 MFD |
| FIG. 27 | |
| 542, 538, 540 | Two parallel .1 OHM 10W STV 6060 with 1N 5625 and V150 PA10 in parallel collector to emitter |
| 544 | 2N 3414 driving D45H8 |
| 536 | CD 4011 |
| 543 | CA 3130T and CD 4012 as inputs to CD 4011 then to CD 4049 invertor output |
| 528 | CD 4042 driving CD 4011 then to CD 4012. Also CD 4001, |

TABLE II-continued

Representative component values or element identification for the foregoing circuits.

| Reference No. | Component |
|---|---|
|  | CD 4011 and CD 4029 |
| 524, 526 | CD 4011 input to CD 4030, CD 4011 and CD 4001 in series Also three 2N 3414 |
| 530 | CD 4042, CD 4011 and CD 4012 in series |
| 532 | CD 4001 driving CD 4011 and also CD 4029 |
| 534 | MC 14511 to man54 |

The solid state components listed in Table II hereinabove, with the exception of transistors STV 6060 and displays MAN54 (see FIG. 27) were either RCA, G.E., National, or Motorola devices. The four transistors STV 6060 were TRW transistors, and the four displays MAN54 were Monsanto displays.

The present invention has been described thus far, primarily in connection with a two-stage, two pole motor of the type illustrated in FIGS. 1 and 2, however, as mentioned previously, the invention is equally applicable to multiple stage motors such as three, four, five, etc. stage motors with a varying number of poles.

In carrying out the invention with a three winding stage motor, the same factors considered with respect to the two-stage motor must again be considered. For example, in order to maximize efficiency and avoid starting problems, consideration must be given to such factors as torque per ampere (T/I) curve or motor operating characteristic, winding spread, rotor permanent magnet arc length, commutation advancement, magnetic coupling, energy recovery from a winding after deenergization, slot configuration of a stationary armature, and slot utilization. In addition, in the preferred sensorless approach, the rotor position must be reliably and accurately simulated for purposes of commutation.

Figure 28:
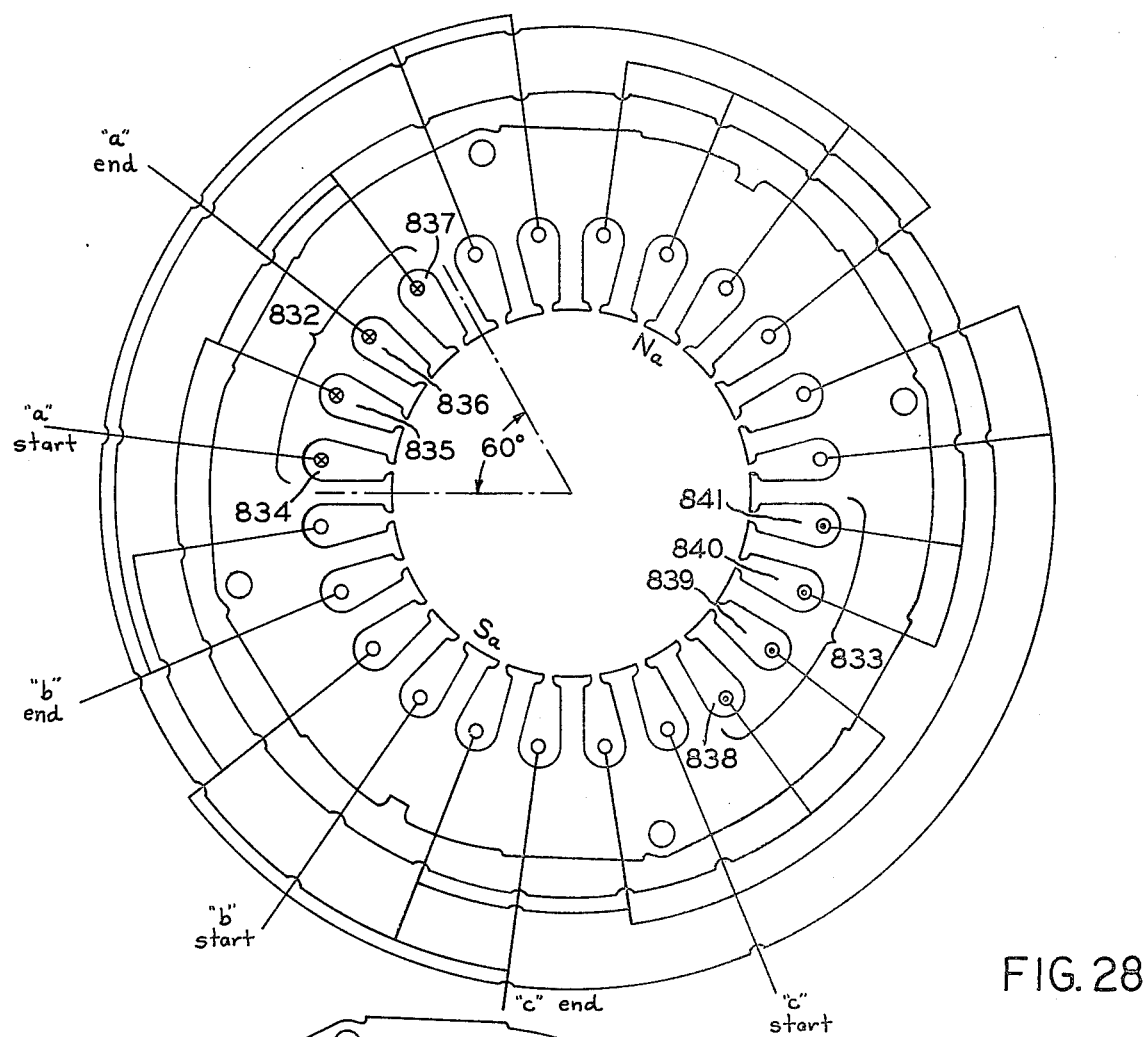
FIGS. 28, 29 and 30 are diagrammatic front elevational views of stationary armatures of the present invention illustrating selected winding arrangements for a three stage, two pole motor, a three stage, four pole motor and a three stage, eight pole motor, respectively.
Figure 29:
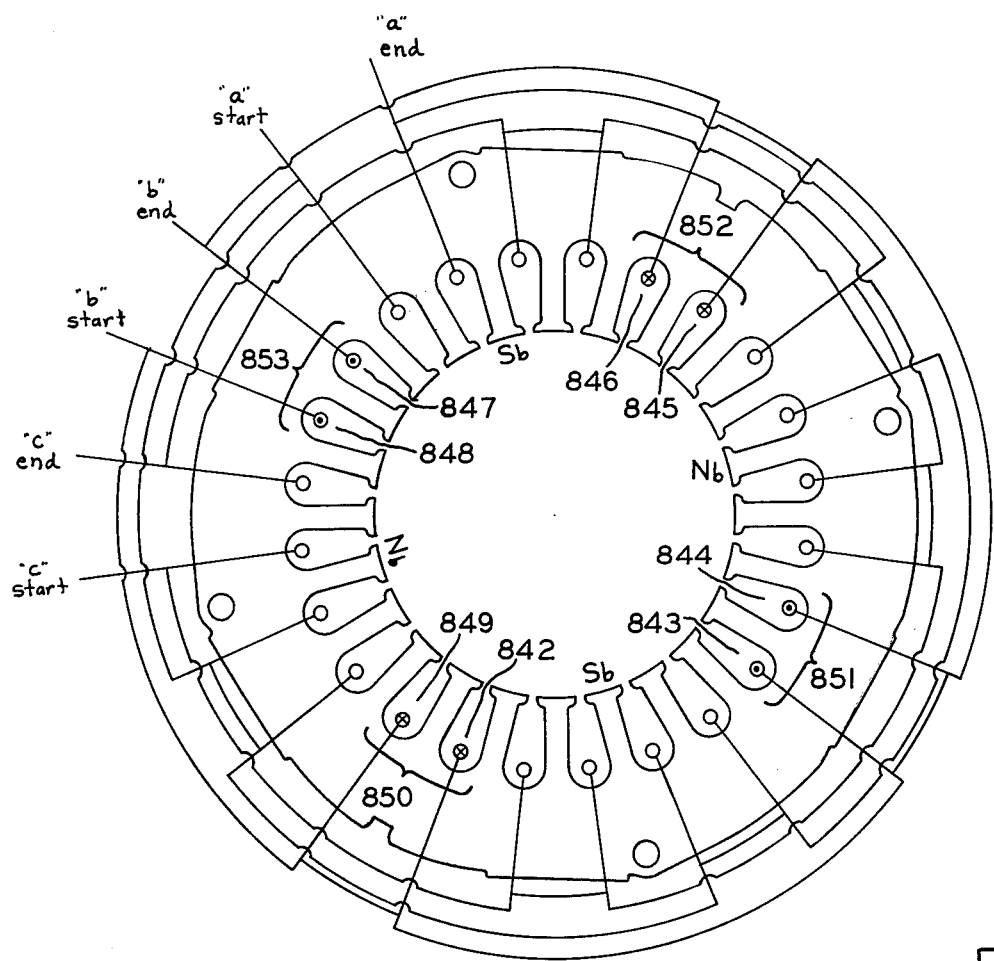
Figure 30:
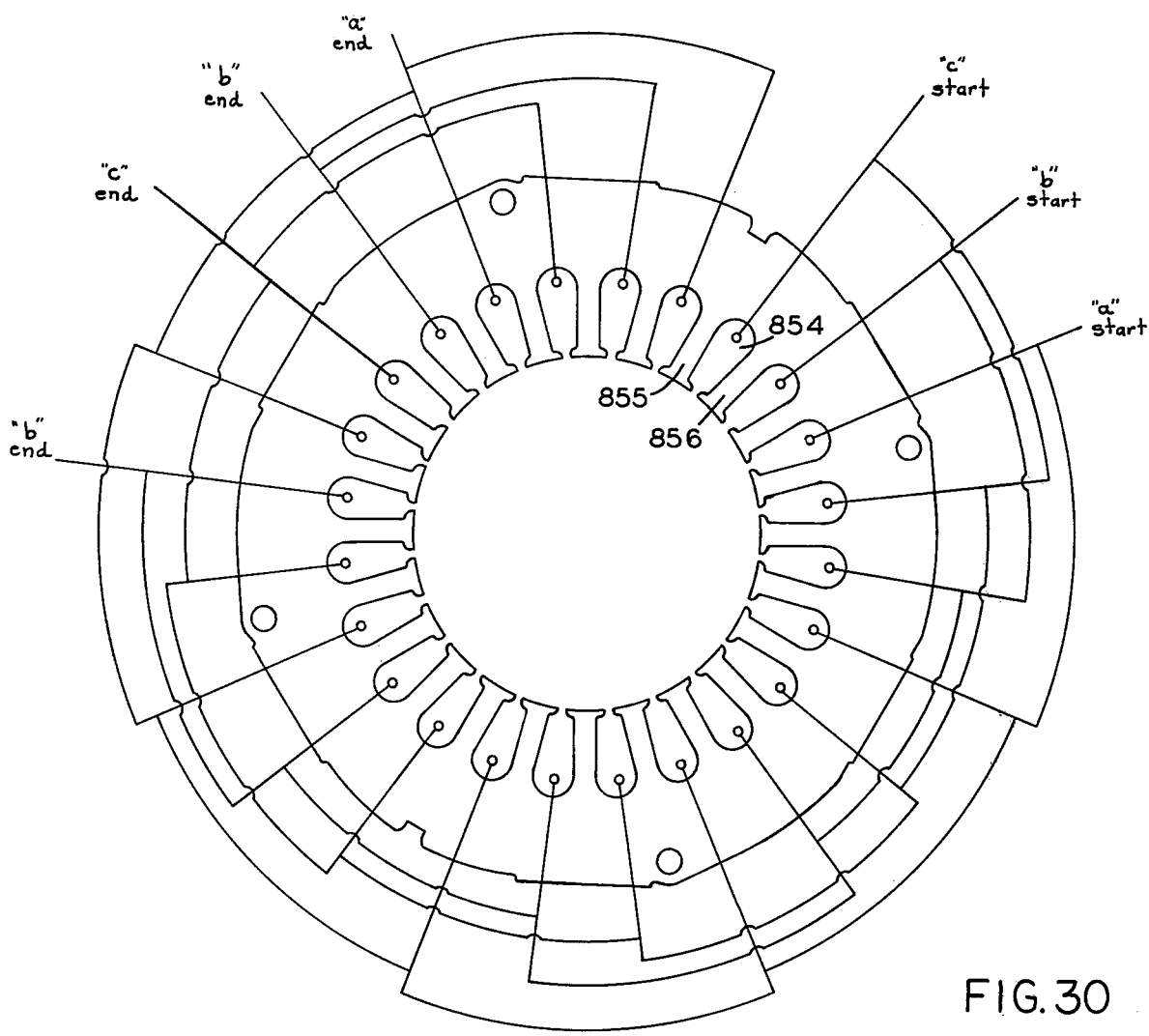

FIGS. 28, 29 and 30 show winding configurations in twenty-four slot stationary armatures for three winding stage, two pole, four pole and eight pole motors, respectively. The illustrated stationary armatures are monofilarly wound in the uniform slot configurations and have all slots filled. However, for greater clarity, the armatures are illustrated with only one single turn coil in each slot. It is preferred to fill all slots of the armature in order to minimize core thickness or stack height of the stationary armature and thus making the motor more compact in size and more economical to manufacture. However, as discussed hereinbelow, the stationary armature can be employed with empty slots with a resulting reduction in rotor permanent magnet arc length but at the expenses of increased armature cores.

Referring to FIG. 28, the illustrated armature 830 for a three winding stage, two pole motor cmprises three monofilar windings a, b, c (one for each stage). Each winding comprises coils formed from concentric turns of a conductor that are disposed in the core 831 with the side turns of the coils forming two winding sets in the core slots. The conductor portions of each set conducting current when the winding is energized, in the same axial direction along the length of the core. For example, the winding "a" comprises two winding sets, 832, 833 with winding set 832 being disposed in core slots 834-837 and with winding set 833 being disposed in core slots 838-841. The winding "a" was formed by first making a predetermined number of concentric turns of a conductor to form a coil whose side turns occupy core slots 834 and 838 when inserted into the core slots with conventional coil insertion equipment. The winding of the conductor continued with a predetermined number of concentric turns of a different diameter to form a second coil whose side turns occupy slots 835 and 839. The winding of the conductor continued with a predetermined number of concentric turns being made to form a third coil whose side turns occupy slots 837 and 841 as shown after being disposed in the core. A fourth coil was also formed by making a predetermined number of concentric turns of the conductor so that the side turns of the coil occupy slots 836 and 840 as shown when disposed in the core.

Even though the coils have been described as having been formed in a particular order, the coils may be formed in any order, but the winding must be such as to assure that when the winding "a" is energized, all the conductor portions within a winding set conduct the current in a common direction along the axial length of the core. As shown in FIG. 28, all the conductor portions of winding set 832 conduct the current in a common direction ("x" indicating current flow into the page) and all the conductor portions of winding set 832 also conduct current in a common direction ("." indicating current flow out of the page) which is in a direction opposite the direction of current flow in the set 832. This current flow in winding "a" as illustrated creates magnetic poles $N_a$ and $S_a$. Because all the conductor portions of each set instantaneously conduct current in the same axial direction along the length of the core, the spread of winding "a" can be measured at either winding set 832 or set 833. As illustrated, the spread of winding "a" is 60° (electrical and mechanical) measuring from the centerline of the slot tooth separating set 832 from winding "b" to the centerline of the slot tooth separating the set 832 from winding "c".

Windings "b" and "c" for the three stage, two pole motor of FIG. 28 are wound and disposed in the armature in the same manner as described above for winding "a". Although all the coils of each winding in FIG 28 are shown as being formed in a continuous winding process, i.e., without cutting the conductor between the winding of different coils, the coils may be formed separately or in groups of two or more and then interconnected to create a single winding with the coils being disposed and interconnected so that current flow in each winding set is in the same direction.

FIG. 29 illustrates a stationary armature for a three winding stage, four pole motor comprising three windings a, b, c (one for each stage) with each winding formed from four coils each have a predetermined number of concentric turns of a conductor. For clarity, only one conductor turn is shown in each slot of the armature. The side turns of the coils form four winding sets for each winding. For example, winding "b" has four coils each having a predetermined number of conductor turns with the first coil being disposed in core slots 842 and 843, the second coil being disposed in slots 844 and 845, the third coil being disposed in slots 846 and 847 and the fourth coil being disposed in slots 848 and 849. The coils may be wound consecutively or wound separately and then disposed and interconnectd so as to produce current flow as indicated ("x" indicating current flow into the page and "." indicating current flow out of the page). As illustrated, the side turns of the coils create four winding sets 850-853 with winding set 850 being disposed in slots 850 and 842, winding set 851 being disposed in slots 843 and 844, winding set 852 being disposed in slots 845 and 846 and winding 853 being disposed in slots 847 and 848. After the coils have been wound and disposed in the armature slots, the conductor portions of each winding set will conduct current in the same axial direction as indicated, along the axial length of the core when the winding "b" is energized; thus, creating four magnetic poles of two pairs of magnetic poles, $N_b$, $S_b$ as shown. The windings "a" and "c" of FIG. 29 are formed in the same manner as described above for winding "b", with each having four winding sets with conductor portions conducting current in the same axial direction along the core when energized.

The three winding stage, four pole armature winding arrangement of FIG. 29 has a winding "spread" of 30 mechanical degrees or 60 electrical degrees. As previously discussed, the "spread" is the angular expanse of adjacent core slots that carry the conductors of a given winding which instantaneously conduct current in the same axial direction along the axial length of the core. As shown in FIG. 29, a set of winding "b" occupies two adjacent slots and all the conductors within that set carry current in the same axial direction along the axial length of the core; thus, the spread is the angular expanse of the two slots occupied by the set which is 60 electrical degrees or 30 mechanical degrees.

As discussed previously in reference to the two pole, two stage motor of FIGS. 1 and 2, the torque per ampere (T/I) characteristic of a motor is a function of winding spread and permanent magnet arc length. When maximum torque over a full revolution is desired, the torque per ampere (T/I) wave form typified by FIGS. 11A-C and 12–15 should be kept as "flat" as possible. A maximum T/I would be obtained if the T/I wave form for 180 electrical degrees were to be a square wave form. However, steeper wave forms create possibilities of starting problems, thus it is desirable to approach as near as possible the square wave form without causing starting problems. The maximum T/I duration is increased by minimizing the winding "spread" and/or maximizing the rotor magnet arc length. In addition, as previously discussed, an optimum advanced timing angle α, based on rotor speed and L/R time constant of the windings for advancement of commutation of the windings can be selected which enables a reduction in magnet arc length. The functional relationship of these factors on a per pole basis can be expressed by the following expression:

$$\text{Magnet Arc} = \frac{180(N-1)}{N} + \text{spread} - 2\alpha$$

where: winding "on" time = $\frac{180(N-1)}{N}$ where: spread = $\frac{180}{N}$ where: $N$ = number of stages where: $\alpha$ = angle of advanced timing (5°–30°)

The above expression for spread assumes that a core having uniform slot punchings is utilized and that all the slots have winding turns therein. In addition, the expression for spread assumes measurement for center line to center line of teeth separating the winding being measured from adjacent windings. Further, the expression ignores second and third order tooth effects due to tooth width and tooth tip saturation, respectively.

Referring again to FIG. 29, the winding spread for winding of the stage phase, four pole motor is 60 electrical degrees or 180°/N. The "on" time for each winding will be 180°(N-1)/N or 120 electrical degrees. Thus, the optimum permanent magnet arc length for a motor employing the stationary armature of FIG. 29 is 180 electrical degrees minus 10 to 60 depending on the optimum timing angle determined as a function of the load and speed of the motor.

Multiple pole motors are often very desirable since they cause accompanying benefits. For example, an increase in the number of poles results in less amp-turns per pole which mechanically permits the use of thinner rotor permanent magnets. Increasing the number of poles also causes a decrease in winding end turns. Still further, increasing the number of poles allows a decrease in the core thickness or yoke thickness since the flux conducting requirements of each pole is reduced. However, as the number of poles are increased, the second and third order tooth effects must be considered, and the magnetic core losses are generally increased for the same motor speed with the higher frequency rotating magnetic field in the stationary armature.

As illustrated by FIG. 30, an increase in the number of poles created by a winding makes the previously discussed second or third order tooth effects more important. FIG. 30 shows an armature for a three stage, 8 pole motor with these windings a, b, c (one for each stage) and with each winding being formed in a manner similar to the windings of FIGS. 28 and 29. A pole is created by several turns of a winding occupying a single slot with each winding occupying a total of eight slots to create eight poles or four pole pairs. In the eight pole arrangement shown in FIG. 30, measuring spread involves measurement at only one slot. For example, the spread of winding "c" can be measured at core slot 854 in which one winding set of winding "c" is disposed with the set having conductor portions carry current in the same direction along the axial length of the core. One method of measuring spread which is the same method as used in previous figures is to measure from the center line of tooth 855 to the center line of tooth 856 which results in a spread of 60 electrical degrees. However, it can be seen that a different value for spread would be obtained if the spread were to be measured from one side of slot 854 to the opposite side of the slot. A still different value would result if the spread were to be measured from one side of the tip of tooth 855 to the side of the tip of tooth 856. Thus, it can be seen that where measurement of the spread involves a winding turn or turns in only one slot, the core slot size, slot geometry, tooth width, tooth tip width or geometry and number and location of winding turns within the slot become factors to consider in accurately determining the winding spread. The spread of a winding would approach zero if the winding were comprised of a single turn coil disposed in the air gap between a rotor and core having no slots since magnetic coupling between the rotor and the coil would be unaffected by slot geometry, slot size, etc.

In FIG. 30, a rotor employed with the stationary armature as shown would have eight permanent magnet segments distributed around its periphery to create eight poles at its perimeter. If the winding spread were 60 electrical degrees, then the magnet arc length of each segment would be between 120 and 150 electrical degrees using the expressed relationship previously set forth. Theorectically, in a three stage motor, a magnet arc length of 60 electrical degrees could be employed if the winding spread were to be 0 electrical degrees.

Figure 31:
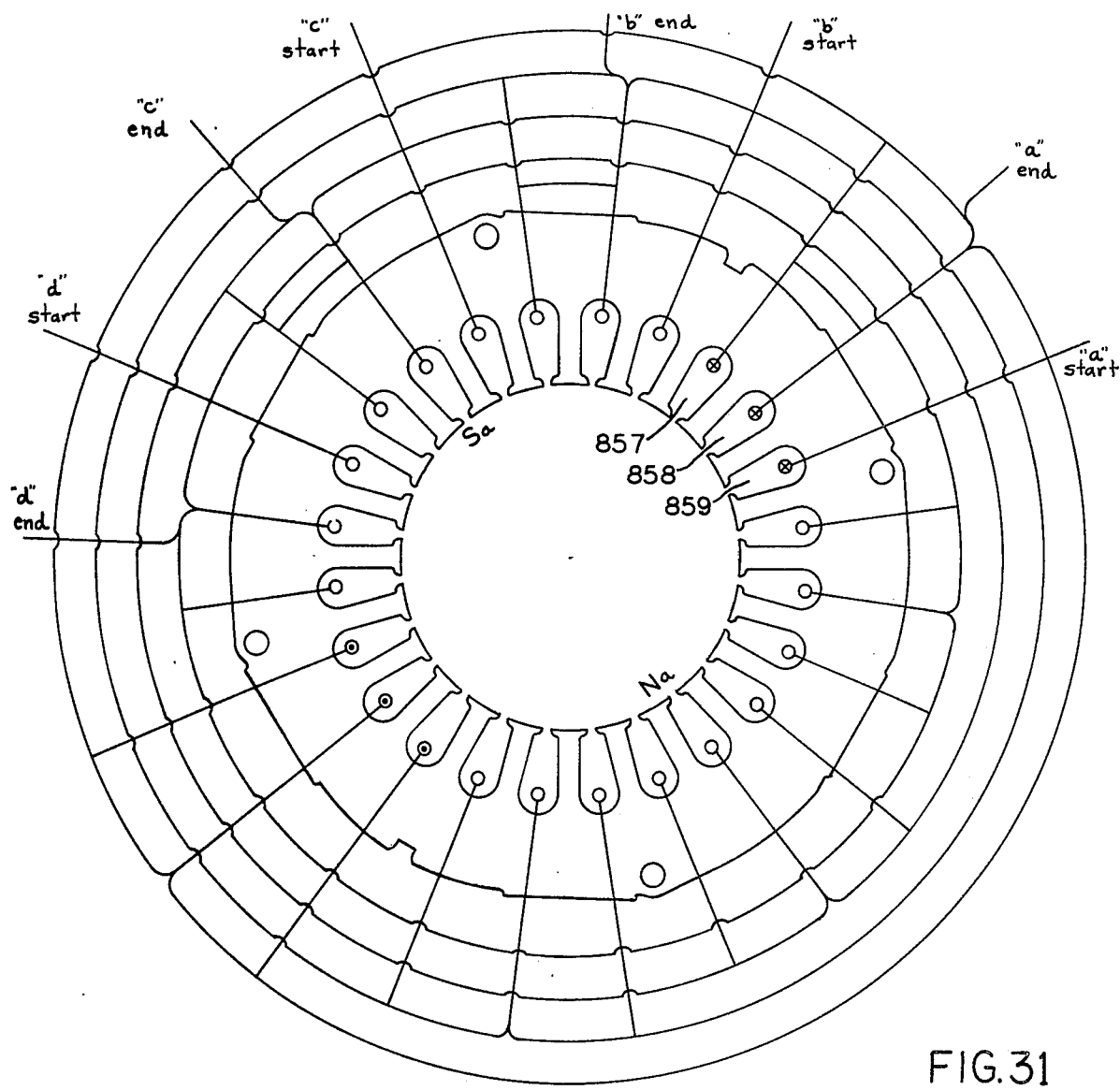
FIG. 31 is a diagrammatic front elevational view of a stationary armature of the present invention, showing a selected winding arrangement for a four stage, two pole motor.

FIG. 31 illustrates the coil distribution or winding arrangement for a four winding stage, two pole motor employing four windings, a, b, c, d (one for each stage) disposed on a twenty-four slot stationary armature. Each stage has one winding comprising two winding sets and has its winding disposed in two groups of core slots symmetrically disposed from each other with each group comprising three adjacent core slots occupied by a winding set. When a winding is energized, each set of that winding e.g., the set of winding "a" occupying adjacent core slots 857, 858, 859 conducts current along the axial length of the core to produce a magnetic pole such as $N_a$ or $S_a$.

Although the four stage, two pole motor is shown in FIG. 31 with a twenty-four slot stationary armature, the motor could have easily been formed with only an eight slot armature core. Further, if a four stage, four pole motor were desired, sixteen core slots would be adequate. Thus, the minimum number of core slots will depend upon the number of motor stages and number of poles desired.

Figure 32:
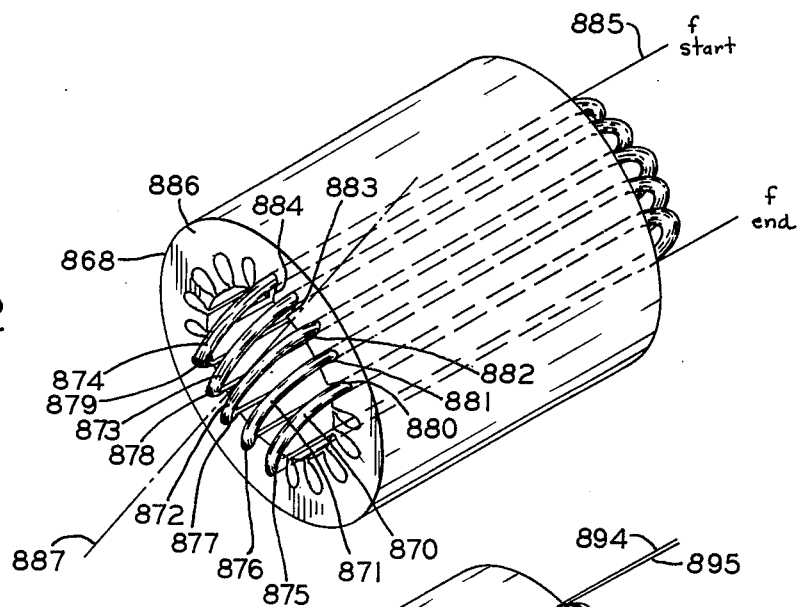
FIG. 32 is a diagrammatic perspective view of a stationary armature of the present invention, showing a selected monofilar winding arrangement for one stage of a motor.

The formation of windings of the present invention is further illustrated by FIG. 32 which shows a perspective view of a single monofilar winding "f" disposed on stationary armature core 868 to form one stage of a motor. The winding comprises five coils 870-14 874 disposed in core slots 875-884 with each coil comprising a predetermined number of concentric turns of conductor 885. The side turns of each of the coils are positioned within two core slots. As illustrated, coil 870 has its side turns disposed within slots 875 and 880; coil 871 has its side turns disposed within slots 876 and 881; coil 872 has its side turns disposed within slots 881 and 882; coil 873 has its side turns positioned within slots 878 and 883; and coil 874 has its side turns disposed within slots 879 and 884. The coil side turns disposed in slots 875-879 comprises a first winding set and the side turns disposed in slots 880-884 comprises a second winding set. The coils are wound and inserted into the slots of the core so that all the conductor portions of each winding set conducts current in the same direction along the axial length of the core when the winding is energized. The flow of current in the two winding sets establishes two magnetic poles $N_f$ and $S_f$ within the stationary armature. Of course, reversal of the current flow also reverses the location of the two magnetic poles.

The coils may be consecutively wound to form the one winding or they may be wound separately or in groups of one or more and then interconnected to form the one winding. Conventional winding equipment may be employed with the winding being formed directly on coil insertion tooling which is subsequently moved within the interior bore of the core for inserting the coils within the core slots. Also, other conventional winding and insertion equipment may be employed wherein coils for the winding are wound and then transferred to an inserting tool for placement within the core slots.

After the winding has been formed and disposed in the proper slots, the winding has its end turns disposed across the interior bore of the core; thus, they must be folded to the side toward the core face 886 in order to allow for mounting of the rotor. In FIG. 32, the end turns of coils 870-872 may be folded in one direction away from reference line 887 toward the core face 886 and the end turns of coils 873-874 may be folded in an opposite direction away from the reference line. However, the side turns of the coils could be folded about reference lines other than 887 if convenient since the purpose of the folding is to provide clearance for the rotor.

Figure 33:
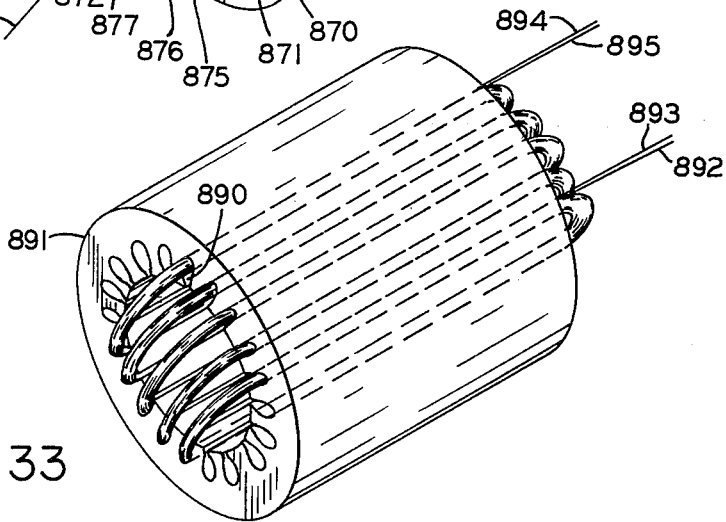
FIG. 33 is a diagrammatic perspective view of a stationary armature of the present invention, showing a selected bifilar winding arrangement for one stage of a motor.

A bifilar winding arrangement is illustrated in FIG. 33 wherein double strands are wound and disposed within the slots 890 of the magnetic core 891. The double strands of wire are wound simultaneously and then inserted into the slots in the same manner as the monofilar or single strand winding illustrated in FIG. 32. As a result of winding two strands of wire simultaneously, either one or two windings are established. If one winding is desired, strand ends 892 and 893 are connected to each other and ends 894 and 895 are connected to each other, thus, establishing effectively one winding. Bifilar winding to establish a single winding may be advantageous to establish a desired slot fill or where coil insertion equipment would have difficulty in inserting turns of wire a particular diameter but could insert turns compressing two wires of differing diameter. Of course, a single winding could be established by winding more than two strands simultaneously or two windings could be established in the same slots of the core by developing each winding separately and then inserting both into the core slots.

Figure 34:
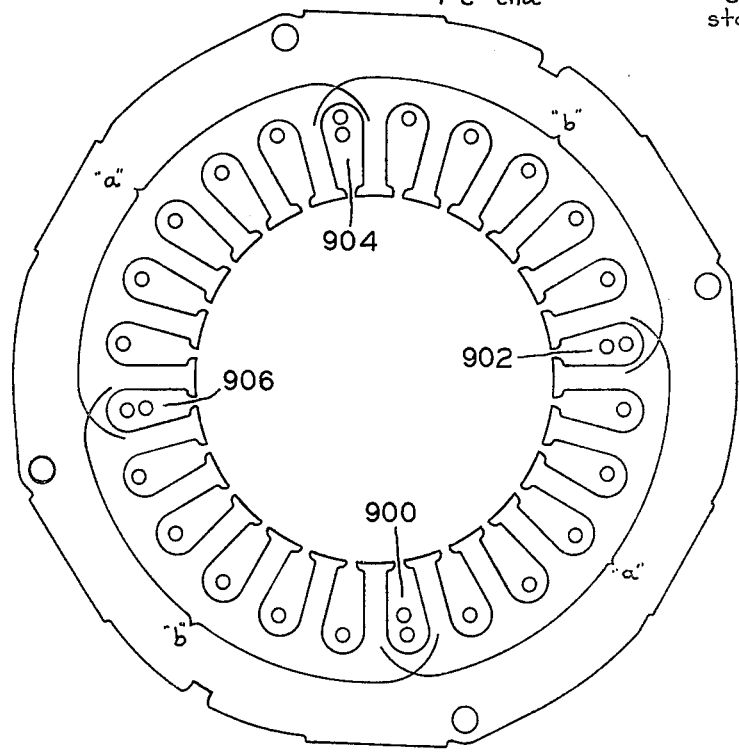
FIG. 34 is a diagrammatic front elevational view of a stationary armature of the present invention, illustrating a winding arrangement for a two stage, two pole motor in which windings share armature slots.

As mentioned previously, the expression developed for quantitatively determining the interrelationship between magnet arc length, winding spread, number of stages and timing advancement angle assumed that all core slots were being utilized for winding turns and that no slots were being shared between windings. However, various factors may make it impractical to have ideal core slot punching or winding distribution. For example, available cores may have too many or too few slots to allow conformance with the ideal situation where all core slots are filled and windings are not required to share slots. Under these circumstances, adequate motor performance can still be obtained by compensating for this increase or decrease in winding spread caused by slot sharing or by leaving empty slots. If core slots are left empty or a core slot is shared between windings, then the spread does not equal 180/N where N is the number of phases. For example, FIG. 34 shows a two stage, two pole motor with windings "a" and "b" sharing slots 900, 902, 904, and 906, thus the spread would be greater than 90 electrical degrees. Therefore, a rotor magnet would have to be sized accordingly with greater length to compensate for the increase in a winding spread.

Figure 35:
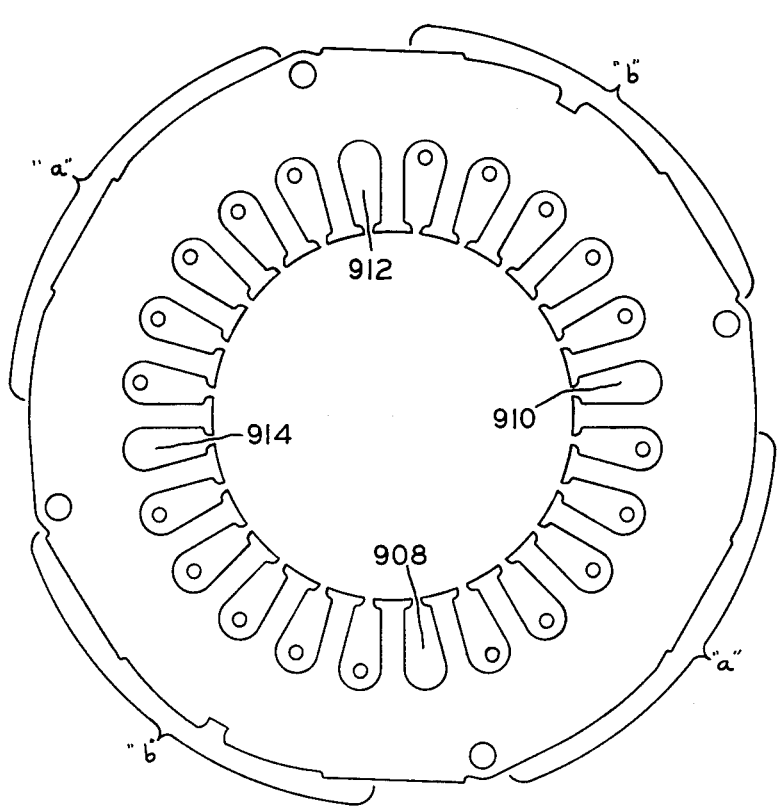
FIG. 35 is a diagrammatic front elevational view of a stationary armature of the present invention, illustrating a winding arrangement for a two stage, two pole motor in which the stationary armature is provided with empty slots.

FIG. 35 illustrates a stationary armature core for a two stage, two pole motor with empty slots 908, 910, 912, 914 between windings "a" and "b". With this arrangement, the core is not being fully utilized but the winding distribution is symmetrical. This arrangement allows use of a rotor permanent magnet of lesser arc length than would be required if all slots were filled with winding turns.

Figure 36:
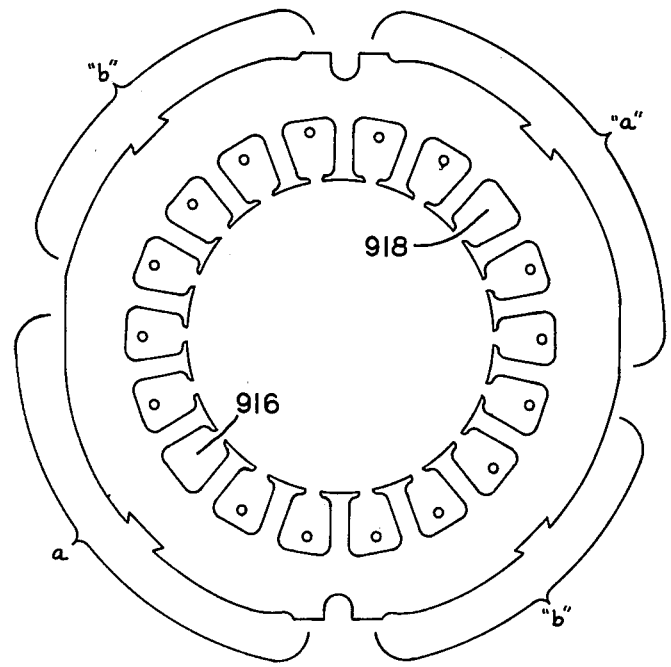
FIG. 36 is a diagrammatic front elevational view of a stationary armature of the present invention, illustrating a winding arrangement for a two stage, two pole motor in which the windings are non-symmetrically disposed in slots of the stationary armature.

Even though the stationary armature arrangements in FIGS. 34 and 35 employ shared and empty slots, respectively, the windings are symmetrically disposed about the armature. FIG. 36 illustrates a nonsymmetrical winding disposition in an eighteen slot stationary armature for a two stage, two pole motor. Empty slots 916, 918 appear in the middle of winding "a" with no empty slots appearing in winding "b". With this arrangement, the motor would still be capable of running, however, the motor performance would be decreased, thus making it undesirable for applications where optimum motor performance is required. In addition, compensation for the nonsymmetry would be required in circuitry being employed to advance the timing angle for winding energization such as incorporation of a time delay in the circuitry controlling commutatiion of winding "a" to compensate for an "on" time greater than that required for winding "b".

Commutation control for motors disclosed by this invention are unaffected by the number of poles. Thus, the three stage motors shown in FIGS. 28, 29 and 30 could employ an identical commutation control circuit. Further, the three phase motors can employ substantially the same circuitry as that employed for the previously discussed two stage, two pole motor as illustrated in FIGS. 25a and 25b.

Figure 37A:
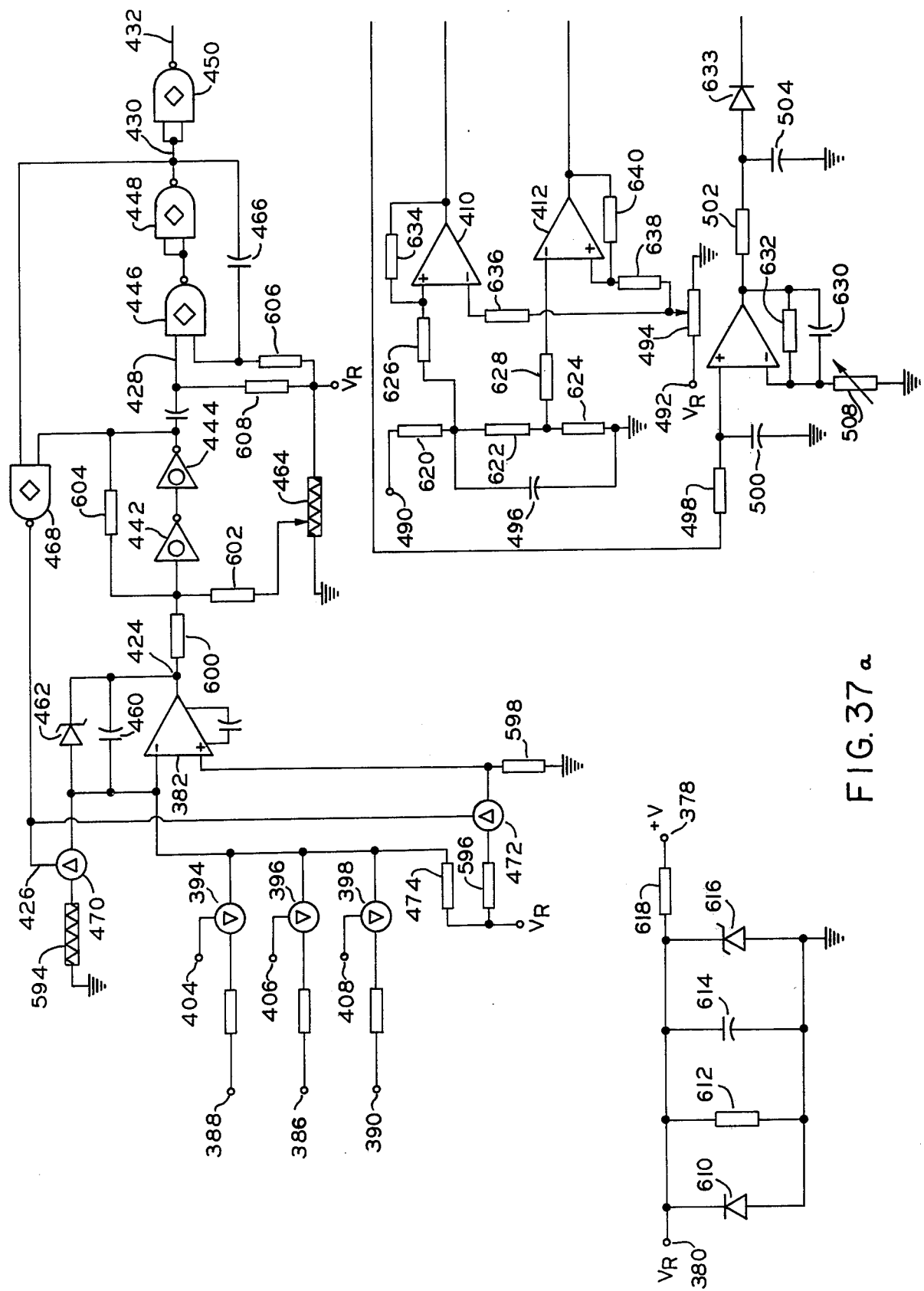
FIGS. 37a and 37b together form a detail schematic diagram of a commutating circuit embodying features of the present invention and arranged for controlling commutation of a three stage brushless DC motor.
Figure 37B:
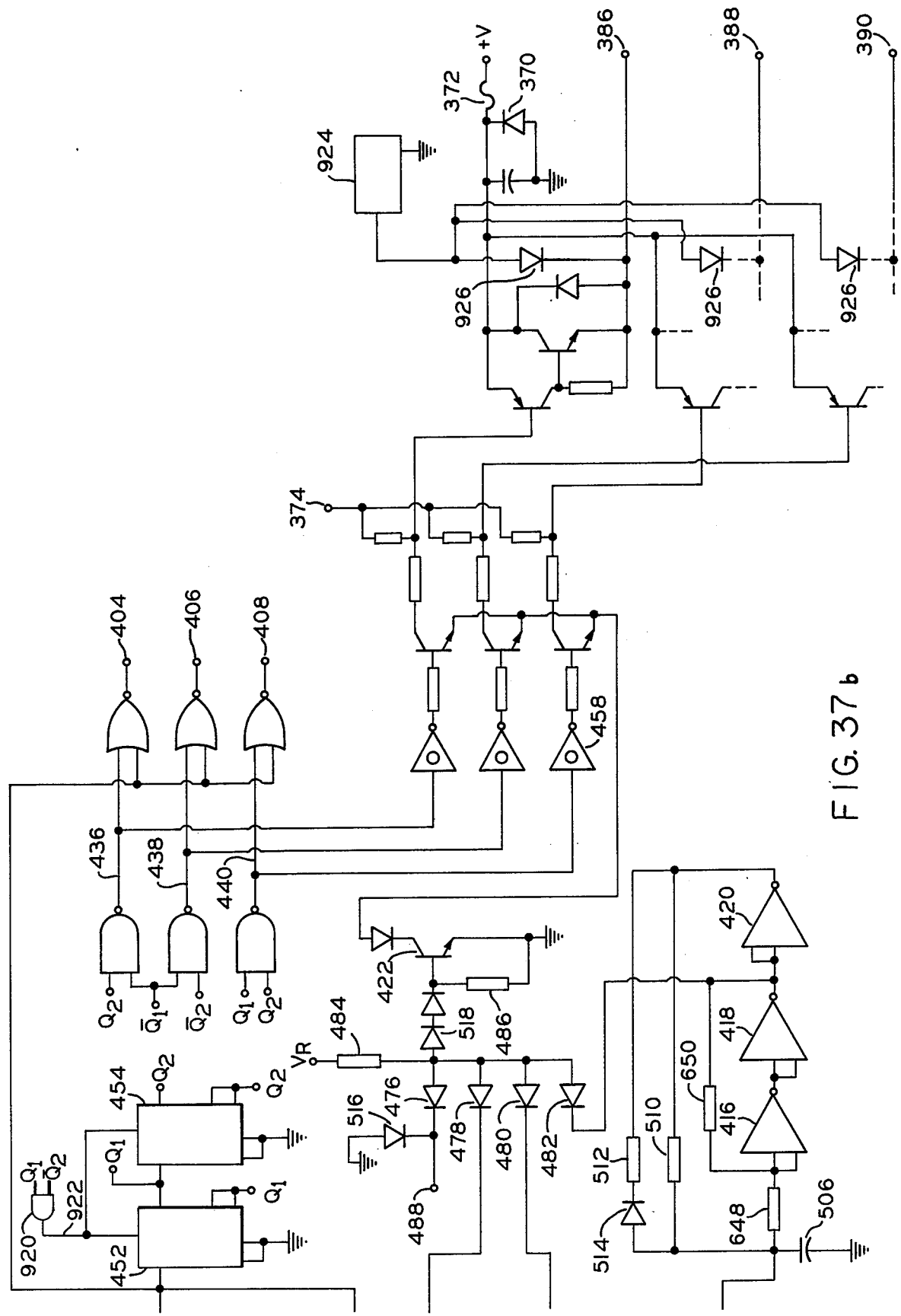

FIGS. 37a and 37b illustrate the commutation circuit which it is believed could be used for a three stage motor. FIG. 37a is similar to FIG. 25a with the exception that wire 384, one of resistors 592, and switching element 392 have been deleted for three stage operation. As mentioned previously, the number of poles does not affect commutation, however, for operation of a three stage motor, the back emf integration interval must be adjusted. This integration interval adjustment is provided by potentiometer 464. Adjustment of the potentiometer changes the triggering point for the Schmitt trigger comprising invertors 416 and 418. Operational amplifier 382 integrates the back emf over an interval or until a predetermined number of volt-seconds is accumulated whereupon the Schmitt trigger circuit is triggered as described with reference to FIG. 25a.

Referring to FIG. 37b, the remaining commutation circuitry is similar to the circuitry shown in 25b. The two circuits differ in that for operation of a three stage motor, flip-flops 452 and 454 are modified to produce three output signals, and element 920 with inputs $Q_1$ and $\overline{Q_2}$ may be added to provide a signal on line 922 to reset flip-flops 452 and 454 when both $Q_1$ and $\overline{Q_2}$ signals are present. In addition, because it is necessary to commutate only three windings for three phase operation, FIG. 37b shows deletion from FIG. 25b of one of each of elements 456, 400, 458, 376, 644, 646, 362, 364 and 366.

However, it has been found that coupling between windings of a three stage motor may be as low as 25 percent as compared to the two stage, two pole bifilarly wound motor where there is excellent coupling between the windings. Thus, there exists stored energy in each winding after it is deenergized which must be either dissipated or recovered. This stored energy may be dissipated by the power transistors or the energy may be either dissipated or recovered by an alternate means circuit 924 conneted to the windings by way of diodes 926 as shown in FIG. 37b. For dissipation, the alternate means could comprise a zener diode arrangement. Either dissipation of the stored energy or recovery of the energy by the alternate means circuit would permit the power transistors 362, 364 to be of a lower voltage rating.

Figure 38:
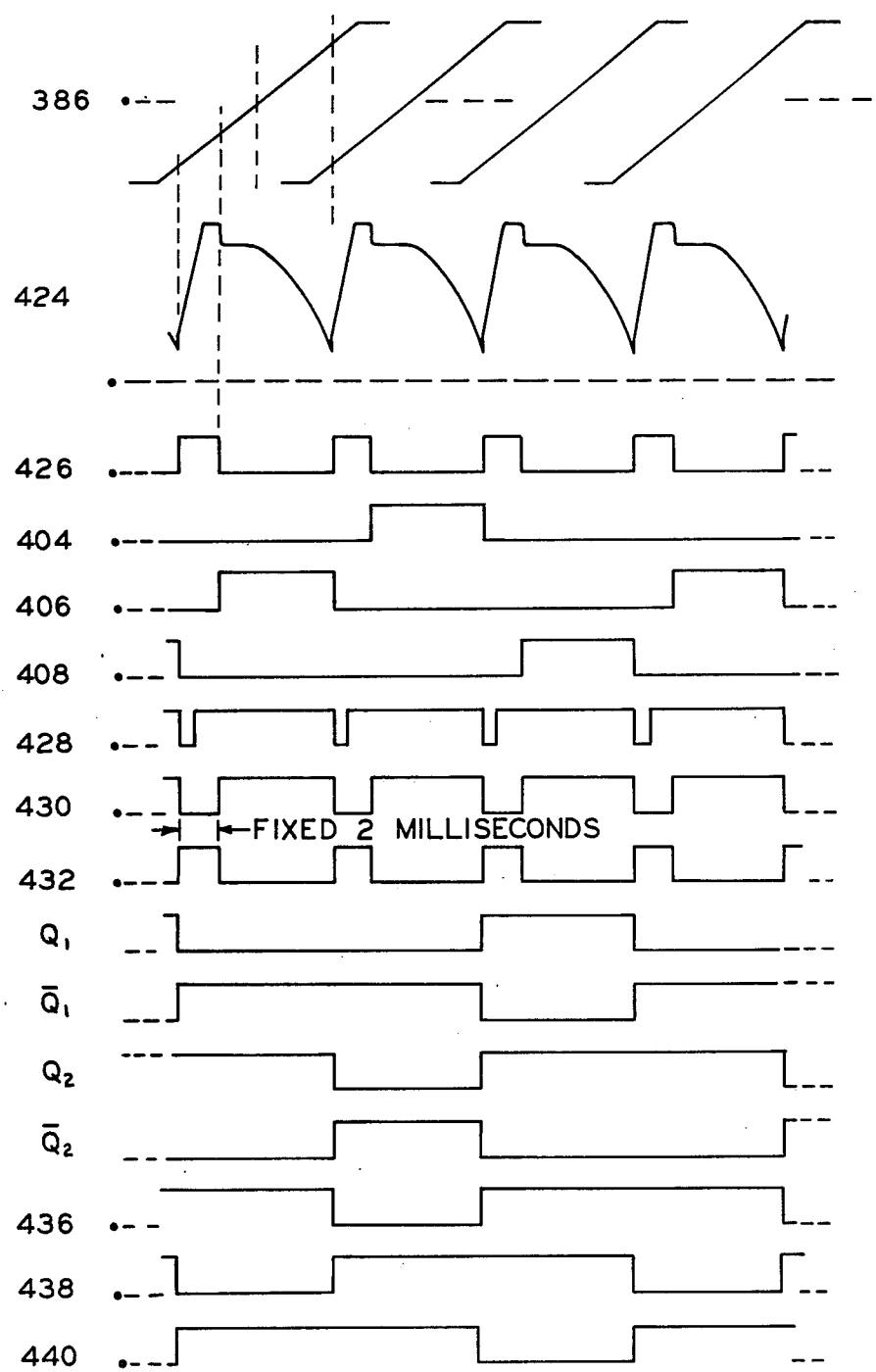
FIG. 38 illustrates various wave forms for the circuit shown in FIGS. 37a and 37b employed to control commutation of a three stage brushless DC motor.

The wave forms for the three stage motor circuits of FIGS. 37a and 37b are illustrated in FIG. 38. The wave forms are essentially the same as for the two stage motor as illustrated in FIG. 26 except for the deletion of signals on lines 402 and 434 and modifications of $Q_1$, $\overline{Q_1}$, $Q_2$ and $\overline{Q_2}$ signals.

The above-described circuits of 37a and 37b were for a three stage motor with the windings connected in a half-bridge arrangement. However, if the windings were connected in a full-bridge arrangement as shown in FIGS. 9 and 10, substantially all the energy could be recovered from each stage by utilizing the diode arrangement as shown in FIGS. 9 and 10 and energy storage capacitor such as 91.

The commutation of a four stage motor such as the one illustrated in FIG. 31, could be controlled by the circuitry shown in FIGS. 25a and 25b with the addition of the energy recovery circuit shown in FIG. 37b. However, if the four stage motor were to be provided with a permanent magnet having approximately the same arc length in electrical degrees as utilized in the two stage motor, the full potential of the magnet will not be utilized. Thus, the arc length of the magnet on the four stage motor could be reduced to achieve the same torque as emf curve illustrated in FIG. 26 as that achieved with the two stage motor.

Figure 39:
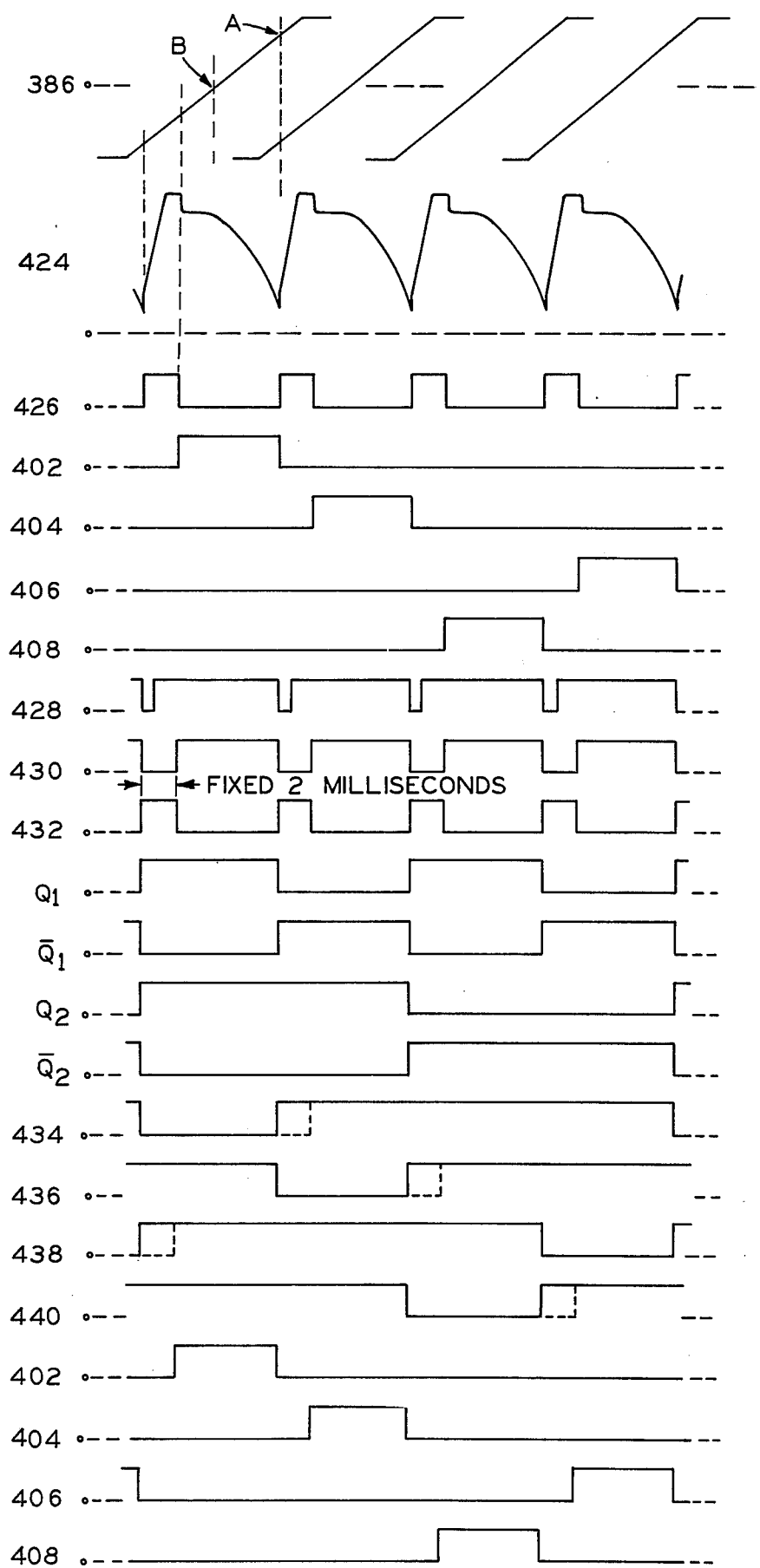
FIG. 39 illustrates various wave forms for the circuit shown in FIGS. 25a and 25b when the circuit has been modified to control commutation of a fourstage brushless DC motor.

On the other hand, it is believed that it would be more desirable to retain magnets of approximately equal arc length in both the two stage and four stage motors, and provide an overlap in "on" times of the windings. This overlapping of "on" times and full magnet utilization would provide a motor with an increased total torque output because during the overlapping periods, the windings energized would be producing torques which are additive. This overlap in "on" time can be provided by addition of additional logic in lines 434, 436, 438 and 440 of FIG. 25b to enable the signals on these lines to be extended in duration. The wave forms resulting from modification of the FIG. 25b circuit for a four stage motor are shown in FIG. 39 with the changes in the signals on lines 434, 436, 438, and 440 being depicted with dashed lines. The remaining signals are identical to those illustrated in FIG. 26.

In addition, the coupling between windings of a four stage motor is lower than the coupling for the two stage bifilarly wound motor of the type shown in FIGS. 1 and 2. Thus, an alternate means circuit as shown in FIG. 35b and described hereinabove for a three stage motor could be utilized for a four stage motor or the stored energy could be dissipated by the power transistors 362 and 364.

It is believed motors with an even greater number of stages and any number of poles could be constructed in accordance with the teachings of this invention. The windings for each stage could be connected in a half-bridge circuit configuration and commutated with circuitry similar to that which would be employed with the above-discussed three stage and four stage motors. Although it is believed that the emf voltage of two or more windings could be combined for simulating rotor position, it would generally be preferable to provide a detector circuit having provision for emf voltage sensing for each winding. If a motor were to be constructed with five or more stages, the position determining disclosed hereinabove may be employed to simulate the rotor position; however as the stages are increased, a shorter reset time may be required for the position determining circuit in order to assure that the circuit is reset prior to the previously discussed zero crossing point or point "B" of the emf voltage. Further, the logic circuitry generating A, B, A, etc. would require modification in order to produce output signals equal in number to the number of windings to be sequentially energized. And of course, each winding would be provided with a separate power transistor arrangement for effecting energization.

Still further variations could be implemented using the teachings of this invention. For example, the windings of multi-stage motors constructed as shown herein could be connected in a full-bridge circuit configuration as disclosed in FIGS. 9 and 10 to provide more efficient utilization of winding material but of course, at the expense of additional circuitry. With this approach, a detector circuit similar to detector circuit 814 of FIG. 25a, could be provided either with a half-wave rectifier arrangement including element 163 as disclosed in FIG. 8 of hereinabove-referenced application Ser. No. 729,804 or with two switches for each winding to reverse the polarity of the emf voltage when it is negative so that a positive voltage is always being provided to the position determining circuit. Four logic signals such as A, B, $\overline{A}$, etc., and four power transistor sets would have to be provided for each winding connected in a full-bridge arrangement with the exception of a three stage motor where the windings could be connected as shown in FIG. 8 of the hereinabove-referenced application Ser. No. 729,804 with six power transistor sets being utilized.

While the invention has been described in connection with different embodiments thereof, variations will be readily apparent to those skilled in the art from reading the foregoing description. Thus, in accordance with the Patent Statutes, I have described what at present is considered to be preferred embodiments of my invention, but it is to be clearly understood that this description is made only by way of example and not for purposes of limitation.

What I claim as new and desire to secure by Letters Patent of the United States is:

1. A DC motor comprising a stationary armature having a core and at least two winding stages each comprising at least one effective winding; each winding comprising at least two coils of winding turns accommodated by the core and arranged to establish a predetermined number of magnetic poles, and the winding turns of each winding having a number of sets of axially extending conductor portions with such member being equal in number to the predetermined number of poles; the axially extending conductor portions within each given set being comprised generally of about one half of the conductor side turn portions of at least two different coils, and such conductors being disposed to conduct current instantaneously in the same axial direction along the core thereby contributing to the establishment of magnetic poles when the winding containing such given set is energized; the arcuate spread of any given set of axially extending conductors being less than about 120 electrical degrees; a rotor having constant magnetic polarity polar regions equal in number to the predetermined number of poles, said rotor being adapted to rotate relative to the armature in response to the magnetic poles established by the winding turns; and commutation means for energizing the windings in a predetermined manner to establish the magnetic poles on said armature for causing rotational movement of the rotor.

2. A DC motor as set forth in claim 1 wherein the arcuate spread of each set of axially extending conductors is in a preferred range of from about 30 electrical degrees to about 120 electrical degrees.

3. A DC motor as set forth in claim 1 wherein the windings are arranged in winding coil pairs and each winding coil is formed of bifilar strands that share common armature slots.

4. A DC motor as set forth in claim 1 wherein said windings are connected in a half bridge configuration.

5. A DC motor as set forth in claim 1 wherein the constant magnetic polarity polar regions established by said rotor are created by permanent magnets disposed on the rotor.

6. A DC motor as set forth in claim 1 wherein the commutation means includes a light source, a light sensitive device, and a light interrupting shutter mounted to the rotor for rotation therewith to block the light pathway between the light source and light sensitive device for at least a portion of each revolution of the rotor.

7. A DC motor as set forth in claim 1 wherein the commutation means includes detector circuit means responsive to the current flow in the windings to provide an output signal indicative of rotor speed, and energizing circuit means responsive to the output of said detector circuit means for providing a plurality of armature winding energizing signals displaced in a predetermined temporal sequence.

8. A DC motor comprising a stationary armature having a core and at least two winding stages each comprising at least one effective winding; each winding comprising concentric winding turns accommodated by said core and arranged to establish a predetermined number of magnetic poles and the winding turns of each winding having a number of sets of axially extending conductor portions with such number equal to the predetermined number of magnetic poles; the axially extending conductor portions within each set being disposed in said armature to conduct current instantaneously in the same axial direction along the core thereby contributing to the establishment of magnetic poles when the winding containing the given set is energized; the arcuate spread of any given set of axially extending conductors being less than about 120 electrical degrees; a rotor having constant magnetic polar regions equal in number to the predetermined number of poles, said rotor being adapted to rotate in response to the magnetic poles established by the winding turns; and a commutation circuit for energizing the windings in a predetermined manner wherein said commutation circuit includes a detector circuit for sensing a back emf signal indicative of the back emf condition of at least one winding, position determining circuit means for conditioning the back emf signal sensed by the detector circuit and for producing a simulated relative position output that is indicative of the relative angular position of the rotor and armature, with such relative position output determined by the back emf condition of a winding, and circuit means interconnected with the position determining circuit means for supplying an output signal for energizing a selected one of the windings.

9. The DC motor circuit of claim 8 wherein the position determining circuit means of the commutation circuit includes a circuit for producing a signal as a measure of flux in a winding not then being energized and for producing said simulated relative position output.

10. The DC motor of claim 8 wherein the position determining circuit is operative to cause advancement of commutation of the windings by an angle alpha of from about five to about thirty electrical degrees to aid the build up of current when the windings are energized during running condition.

11. The DC motor of claim 10 wherein the position determining circuit includes means to vary the advancement of commutation angle alpha.

12. The DC motor of claim 8 wherein the position determining circuit means of the commutation circuit includes an integration means for integrating the back emf signal from said detector circuit to a predetermined value of volt-seconds whereupon the position determining circuit means produces an output signal to the circuit means.

13. The DC motor of claim 12 wherein the predetermined value of volt-seconds attained by said position determining circuit means occurs at an angular rotor position relative to the armature corresponding to an advancement of commutation angle alpha.

14. The DC motor of claim 8 wherein the position determining circuit means of the commutation circuit comprises a voltage controlled oscillator responsive to the output of said detector circuit, for producing output pulses at a frequency indicative of said detector output signal and a counter means responsive to the oscillator for producing an output signal after a predetermined number of pulses have been counted.

15. The DC motor of claim 8 wherein the detector circuit of the commutation circuit senses the back emf of only one winding at a time and wherein the circuit further comprises switching means that sequentially gate back emf signals from the different windings to the detector circuit.

16. The DC motor of claim 8, wherein the back emf condition sensed by the detector circuit of the commutation circuit includes a characteristic signal generated by means for aiding starting and wherein the characteristic signal is associated with the emf condition of the motor at low motor speed.

17. The DC motor of claim 8 wherein the commutation circuit further includes means for resetting the position determining circuit means after the simulated relative position output is produced.

18. The DC motor of claim 8 wherein the circuit means of the commutation circuit includes logic circuit means responsive to the output of the position determining circuit means for the purpose of selecting an energization sequence for the windings.

19. The DC motor of claim 8, wherein the circuit means of commutation circuit comprises indexing means responsive to the output of the position determining circuit means for producing an energization sequence for the windings.

20. The DC motor of claim 8, wherein the circuit means of the commutation circuit comprises first and second flip-flops, the input of said first flip-flop being coupled to the output of the position determining circuit means to provide first and second complementary signals, said second flip-flop having an input coupled to one of the outputs of said first flip-flop for providing third and fourth complementary signals.

21. The DC motor circuit of claim 8 wherein the commutation circuit further includes protection means operative to prevent damage to the commutation circuit and motor due to reverse polarity of a direct current source supplying power to the commutation circuit and motor.

22. The DC motor of claim 8 wherein the commutation circuit includes power driving means for applying power to the windings and unidirectional conducting means connected thereto for conducting stored energy from a winding after deenergization of the winding.

23. A DC motor comprising a stationary armature having a slotted core and at least two winding stages each comprising at least one effective winding; each winding comprising at least one coil of winding turns accommodated in nonadjacent slots disposed around a bore of the core and arranged to establish a predetermined number of magnetic poles, and the winding turns of each winding having a number of sets of axially extending conductor portions with such number being equal in number to the predetermined number of poles; the axially extending conductor portions within each given set being comprised generally of one half of the conductor portions of the at least one coil, and such conductors being disposed to conduct current instantaneously in the same axial direction along the core thereby contributing to the establishment of magnetic poles when the winding containing such given set is energized; the arcuate spread of any given set of axially extending conductors being less than 120 electrical degrees; a rotor having constant magentic polarity polar regions equal in number to the predetermined number of poles, said rotor being adapted to rotate relative to the armature in response to the magnetic poles established by the winding turns; and commutation means for energizing the windings in a predetermined manner to establish the magnetic poles on said armature for causing rotational movement of the rotor.

24. A DC motor comprising a stationary armature having a core and at least two winding stages each comprising at least one effective winding; each winding comprising concentric winding turns accommodated by the core and arranged to establish a predetermined number of magnetic poles, and the winding turns of each winding having a number of sets of axially extending conductor portions with such number being equl in number to the predetermined number of poles; the side turn axially extending conductor portions within each given set being disposed to conduct current instantaneously in the same axial direction along the core thereby establishing a predetermined spread and contributing to the establishment of magnetic poles when the winding containing each given set is energized; a rotor having a plurality of permanent magnet segments disposed thereon and adapted to rotate in response to the magnetic poles established by the armature; a commutation circuit for energizing the windings in a predetermined manner and at a predetermined angle of advance $\alpha$; and wherein each permanent magnet segment establishes a constant magnetic polar region about said rotor which is about equal in electrical degrees to the winding spread plus $180(N-1)/N$ minus $2\alpha$ where N equals the number of winding stages of the motor.

25. The DC motor as set forth in claim 24 wherein the preferred predetermined angle of advance $\alpha$ is from about 5 electrical degrees to about 30 electrical degrees.

26. The DC motor of claim 24 wherein $180(N-1)/N$ with N equal to the number of stages of the motor corresponds to the energization time in electrical degrees of each winding of the motor.

27. The DC motor of claim 24 wherein the preferred value of spread with all slots of the stationary armature being utilized and with no shared slots between windings being about equal to $180/N$ where N equals the number of winding stages of the motor.

28. A DC motor comprising a stationary armature comprising a core having a longitudinal axis and at least two different energizable windings each including concentrically disposed winding turns, the windings supported on said core to produce at least two spaced apart magnetic poles, a rotor having a predetermined number of constant polarity magnetic regions adapted to rotate about said longitudinal axis in response to magnetic fields established by said armature, commutation means for energizing said armature windings in a predetermined manner, at least two groups of winding turns each having a predetermined span of at least about 180 electrical degrees and wherein conductive turn segments in adjacent slots of the core arranged to carry current in the same relative axial direction have a predetermined spread less than 120 electrical degrees.

29. A brushless DC motor comprising a stationary armature having a core and at least two winding stages each comprising at least one effective winding, each winding comprising concentric winding turns accommodated by the core and arranged to produce a predetermined number of magnetic poles, a rotor adapted to rotate about said longitudinal axis in response to the magnetic poles established by said armature, and a commutation circuit for energizing the windings in a predetermined manner wherein said commutation circuit includes a detector circuit comprising: means responsive to the current drawn by the armature windings to provide an output signal indicative thereof, means for scaling the output signal by a factor corresponding to the resistance of the armature windings, means for substracting the resulting scaled signal from the voltage applied to the armature windings to provide a signal indicative of the back emf of the brushless DC motor, and wherein the commutation circuit further includes a frequency circuit means responsive to the back emf signal for generating a signal of a frequency proportional thereto indicative of the rotor speed and with said frequency circuit means having a minimum frequency output signal to aid starting of the brushless DC motor.

30. The brushless DC motor of claim 29 wherein said frequency circuit means comprises a voltage controlled oscillator for generating a signal of a frequency proportional thereto indicative of rotor speed and wherein the voltage controlled oscillator has a minimum frequency output signal to aid starting of the brushless DC motor.

31. The brushless DC motor of claim 29 wherein the commutation circuit further comprising means for selectively preventing the application of the detector circuit signal indicative of back emf to the frequency circuit means and means operative therewith for selectively substituting a signal proportional to motor load to be applied to the frequency circuit means.

32. The brushless DC motor of claim 31 wherein the means for substituting a signal proportional to motor load comprises means for sampling a first portion of the motor winding current, means for sampling a second portion of the motor winding current, means for comparing the first and second sampled portions, for modifying the frequency of the frequency circuit means output.

33. A commutation circuit for a brushless DC motor having a stationary armature with a longitudinal axis, a plurality of windings disposed on said armature to produce magnetic fields, a rotor adapted to rotate about said longitudinal axis in response to the magnetic fields established by the armature, said commutation circuit comprising: a detector circuit for sensing the current drawn through the armature windings and for scaling the sensed current signal in accordance with the resistance of the windings, for sensing voltage applied to the winding, and for generating an output signal indicative of rotor speed; an indexing means responsive to the detector circuit output signal for generating a plurality of output signals indicative of a relative position of said rotor with respect to said armature; an energizing circuit means responsive to said plurality of output signals from said indexing means for energizing said windings in a predetermined sequence in accordance with the relative position of said rotor.

34. The commutation circuit as claimed in claim 33, wherein said detector circuit includes a voltage-controlled oscillator circuit for generating a signal of a frequency proportional to the rotor speed of the brushless DC motor.

35. A brushless DC motor having a stationary armature with at least two different energizable windings disposed thereon for producing spaced apart magnetic fields and a rotor adapted to rotate about a longitudinal axis in response to the magnetic fields, said motor further comprising: a rotor position sensor for producing pulse output signals indicative of rotor position relative the stationary armature; stepping logic circuitry responsive to the pulse output signals from the rotor position sensor for inhibiting continuous winding commutation in a predetermined sequence; mode control circuitry responsive to the pulse output signals from the rotor position sensor, to rotational direction command signals, and to continuous and stepping operational command signals for producing an output for use in selecting a winding for energization; a pulse modulating circuit responsive to the mode control circuitry for supplying an output signal for energizing a selected one of the windings; and a current sensor responsive to the current flow through the windings of the motor for producing an output signal to said pulse modulating circuit for inhibiting the modulating circuit output signal for a predetermined period of time when the motor current exceeds a predetermined value so as to limit the magnitude of current supplied to the motor windings.

36. The brushless DC motor of claim 35 wherein the rotor position sensor includes stationary exciter and pick up coils and a rotating shutter supported by the rotor for sequentially coupling and decoupling the coils to produce output signals indicative of rotor position relative the stationary armature.

37. A brushless DC motor having a stationary armature with at least two different energizable windings for producing spaced apart magnetic fields in time sequence, a rotor adapted to rotate about a longitudinal axis in response to the magnetic fields, and a commutation circuit for controlling commutation of the windings wherein said commutation circuit comprises: a position circuit for simulating rotor position in accordance with the back emf condition of at least one winding; a circuit for energizing a selected one of the windings in accordance with the simulated rotor position; and an under speed protection circuit operable to prevent the circuit for energizing a selected one of the windings from energizing any of the windings when the motor speed is less than a predetermined minimum value for a predetermined length of time.

38. The brushless DC motor of claim 37 wherein said under speed protection circuit includes means for varying said predetermined minimum value of motor speed.

39. The brushless DC motor of claim 37 wherein said under speed protection circuit includes reset means for allowing energization of the motor windings after a predetermined period of time.

40. A brushless DC motor having a stationary armature with at least two different energizable windings disposed on said armature and energizable from a voltage source for producing spaced apart magnetic fields in time sequence, a rotor adapted to rotate about a longitudinal axis in response to the magnetic fields and a commutation circuit for controlling commutation of the windings wherein said commutation circuit comprises: a position circuit for simulating rotor position in accordance with the back emf condition of at least one winding; a circuit for energizing a selected one of the windings with power from the voltage source in accordance with the simulated rotor position; and an undervoltage protection circuit operable to prevent the circuit for energizing a selected one of the windings from energizing any of the windings when the voltage source output is less than a predetermined minimum value.

41. A brushless DC motor having a stationary armature with at least two different energizable windings disposed on said armature and energizable from a voltage source for producing spaced apart magnetic fields in time sequence, a rotor adapted to rotate about a longitudinal axis in response to the magnetic fields and a commutation circuit for controlling commutation of the windings wherein said commutation circuit comprises: a position circuit for simulating rotor position in accordance with the back emf condition of at least one winding; a circuit for energizing a selected one of the windings with power from the voltage source in accordance with the simulated rotor position; and an overvoltage circuit operable to prevent the circuit for energizing a selected one of the windings from energizing any of the windings when the voltage source output is greater than a predetermined maximum value.

42. A commutation circuit for a brushless DC motor having a stationary armature with at least two energizable windings disposed on said armature for producing spaced apart magnetic fields in time sequence, a rotor adapted to rotate about a longitudinal axis in response to the magnetic fields established by the armature and a commutation circuit for controlling commutation of the windings at a predetermined angle of advancement and wherein said commutation circuit includes means for aiding starting of the motor by generating a characteristic signal that is associated with an emf condition of the motor at low motor speed and wherein the characteristic signal is substantially less in magnitude than emf associated with the motor at full operating speed.

43. A DC motor comprising a stationary armature having a core and at least two winding stages each comprising at least one effective winding; each winding comprising concentric winding turns accommodated by said core and arranged to establish a predetermined number of magnetic poles and the winding turns of each winding having a number of sets of axially extending conductor portions with such number equal to the predetermined number of magnetic poles; the axially extending conductor portions within each set being disposed in said armature to conduct current instantaneously in the same axial direction along the core thereby to establish a magnetic pole when the winding containing the given set is energized; a rotor having constant magnetic polar regions equal in number to the predetermined number of poles, said rotor being adapted to rotate in response to the magnetic poles established by the winding turns; and a commutation circuit for energizing the windings in a predetermined manner wherein said commutation circuit includes a detector circuit for sensing a back emf signal indicative of the back emf condition of at least one winding, position determining circuit means responsive to only a positive polarity portion of the emf signal from the detector circuit for integrating said positive polarity portion of the emf signal to a predetermined value of a volt-seconds whereupon the position determining circuit means produces a simulated relative position output for establishing a predetermined advancement of commutation angle alpha of from about 5 electrical degrees to about 30 electrical degrees, and a circuit means responsive to the simulated relative position output from the position determining circuit means for supplying an output signal for energizing a selected one of the windings.

44. A DC motor comprising a stationary armature comprising a core having a longitudinal axis and at least two windings disposed on said core to produce differently directed magnetic fields, a rotor adapted to rotate about said longitudinal axis in response to magnetic fields established by said armature, means for providing signals indicative of the relative rotational position of said rotor, and circuit means responsive to said signals for energizing said stator windings in a predetermined sequence, said means for providing being operative to cause advancement of commutation of the windings by an angle alpha of from about five to about twenty-five electrical degrees to aid the build-up of current when the windings are energized during running condition, wherein said means for providing signals indicative of the relative rotational position of said rotor includes a detector circuit for sensing a back emf signal indicative of the back emf condition of at least one winding and a means responsive to the back emf signal from the detector circuit for integrating the emf signal to a predetermined value of volt-seconds and for producing said signal indicative of the relative rotational position of the rotor.

* * * * *

UNITED STATES PATENT AND TRADEMARK OFFICE
CERTIFICATE OF CORRECTION

PATENT NO. : 4,169,990
DATED : October 2, 1979
INVENTOR(S) : David M. Erdman

It is certified that error appears in the above-identified patent and that said Letters Patent are hereby corrected as shown below:

Inventor's last name, at all occurrences, change "Lerdman" to --Erdman--.
Col. 1, line 50, change "It" to --I--.
Col. 2, line 20, change "inventionis" to --invention is--;
        lines 66 & 67, change "commucated" to --commutated--.
Col. 3, lines 5 & 6, change "commucated" to --commutated--;
        line 14, change "commucated" to --commutated--;
        line 23, change "commucated" to --commutated--.
Col. 5, line 2, change "predeterined" to --predetermined--;
        line 45, insert --a-- before "half-bridge".
Col. 6, line 30, after "of" insert --the--.
Col. 6, lines 63-68, and Col. 7, lines 1 & 2, should be inserted after line 48 of Col. 6 and deleted from their present location.
Col. 7, line 12, change "fourstage" to --four stage--.
Col. 8, line 51, change "opposite" to --oppositely--.
Col. 9, line 2, change "constrution" to --construction--;
        lines 27 & 28, change "communication" to --commutation--;
        line 38, after "With" delete "the";
        line 59, after "magnets" delete "A".
Col. 10, line 9, change "efficiencyl" to --efficiency--;
        line 17, change "pertinet" to --pertinent--;
        line 62, before "diode" insert --emitting--.
Col. 11, line 19, change "communication" to --commutation--.
Col. 12, line 7, change "B" (second occurrence) to --$\bar{B}$-- and change "$\bar{B}$" to --B--;
        line 59, change "A" to --$\bar{A}$--.
Col. 15, line 47, change "arch" to --arc--.
Col. 16, line 16, change "expense" to --expanse--.
        line 37, change "torqur" to --torque--.

UNITED STATES PATENT AND TRADEMARK OFFICE
CERTIFICATE OF CORRECTION

PATENT NO. : 4,169,990  
DATED : October 2, 1979  
INVENTOR(S) : David M. Erdman Page 2 of 3

It is certified that error appears in the above–identified patent and that said Letters Patent are hereby corrected as shown below:

```
Col. 21, line 11, change "to" to --as--;
         line 15, change "of" to --or--;
         line 16, change "106" to --306--.
Col. 24, line  1, change "therotation" to --the rotation--.
Col. 25, line 61, after "at" change "the" to --that--.
Col. 26, line 51, after "ciency" delete "," (the comma).
Col. 27, line 27, change "of" to --for--;
         line 29, change "plux" to --plus--;
         line 32, change "negaive" to --negative--.
Col. 28, line 13, change "sequencing" to --sequence--;
         line 28, change "he" to --the--.
Col. 33, line 15, change "poentiometer" to --potentiometer--.
Col. 35, line  6, change "preferably" to --preferable--.
Col. 39, line 12, change "man" to --MAN--;
         line 53, change "expenses" to --expense--;
         line 53, change "cores" to --core--.
Col. 40, line 63, change "interconnectd" to --interconnected--.
Col. 41, line  8, change "of" to --or--;
         line 62, change "for" (second occurrence) to --from--.
Col. 42, line 68, change "Theorectically" to --Theoretically--.
Col. 43, line 28, after "870-" delete "14".
Col. 45, line  6, change "commutatiion" to --commutation--;
         line 53, change "conneted" to --connected--.
Col. 46, line 63, change "A" (second occurrence) to --A--.
Col. 47, line 42, (claim 1), change "member" to --number--;
```

UNITED STATES PATENT AND TRADEMARK OFFICE
CERTIFICATE OF CORRECTION

PATENT NO. : 4,169,990

DATED : October 2, 1979

INVENTOR(S) : David M. Erdman

It is certified that error appears in the above-identified patent and that said Letters Patent are hereby corrected as shown below:

```
Col. 47, line 67, (claim 3), after "coil" insert --pair--.
Col. 50, line 20, (claim 23), change "magentic" to --magnetic--.
Col. 50, line 35, (claim 24), change "equl" to --equal--.
Col. 51, line 44, (claim 31), change "comprising" to
        --comprises--.
Col. 54, line 20, (claim 43), after "of" (second occurrence)
        delete "a".
```

Signed and Sealed this

Sixth Day of October 1981

[SEAL]

Attest:

Attesting Officer

GERALD J. MOSSINGHOFF

Commissioner of Patents and Trademarks